July 18, 1950  R. E. BOYDEN ET AL  2,515,692
PARTIAL PRODUCT MULTIPLYING CALCULATOR
Filed Nov. 19, 1946  35 Sheets-Sheet 1

INVENTORS
ROBERT E. BOYDEN
EDWARD P. DRAKE
BY
ATTORNEY

July 18, 1950 R. E. BOYDEN ET AL 2,515,692
PARTIAL PRODUCT MULTIPLYING CALCULATOR
Filed Nov. 19, 1946 35 Sheets-Sheet 3

INVENTORS
ROBERT E. BOYDEN
EDWARD P. DRAKE
BY
Fred M. Schwarz
ATTORNEY

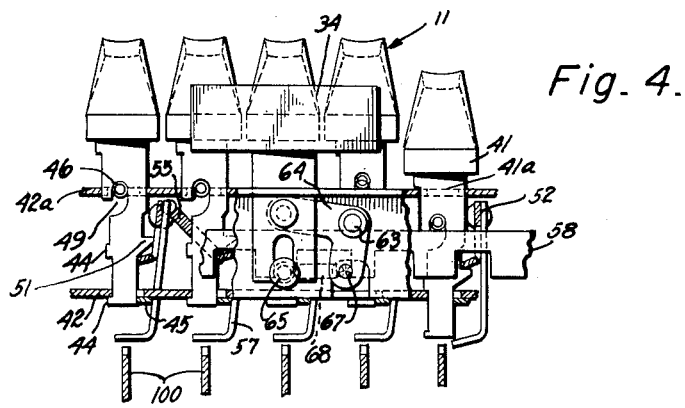
Fig. 4.
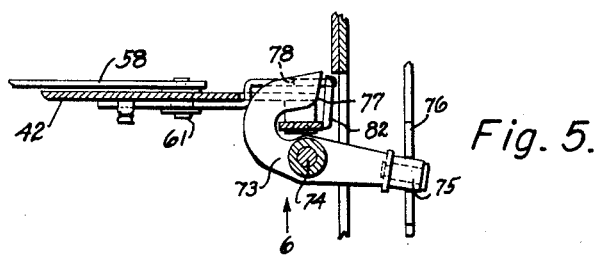
Fig. 5.
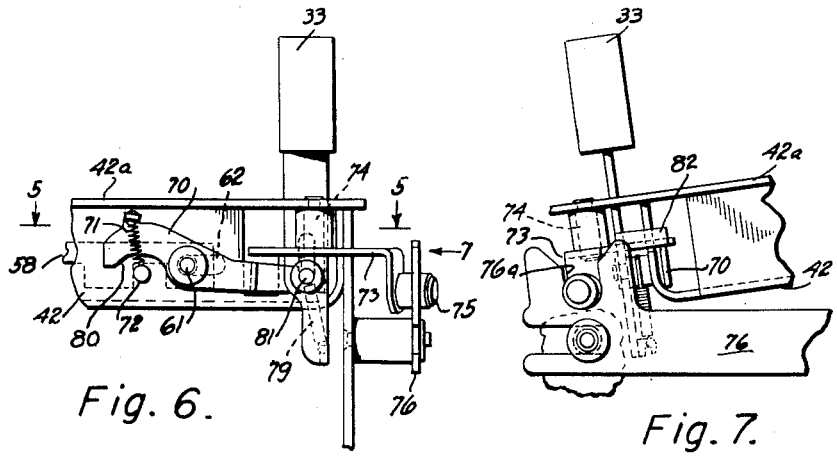
Fig. 6.
Fig. 7.

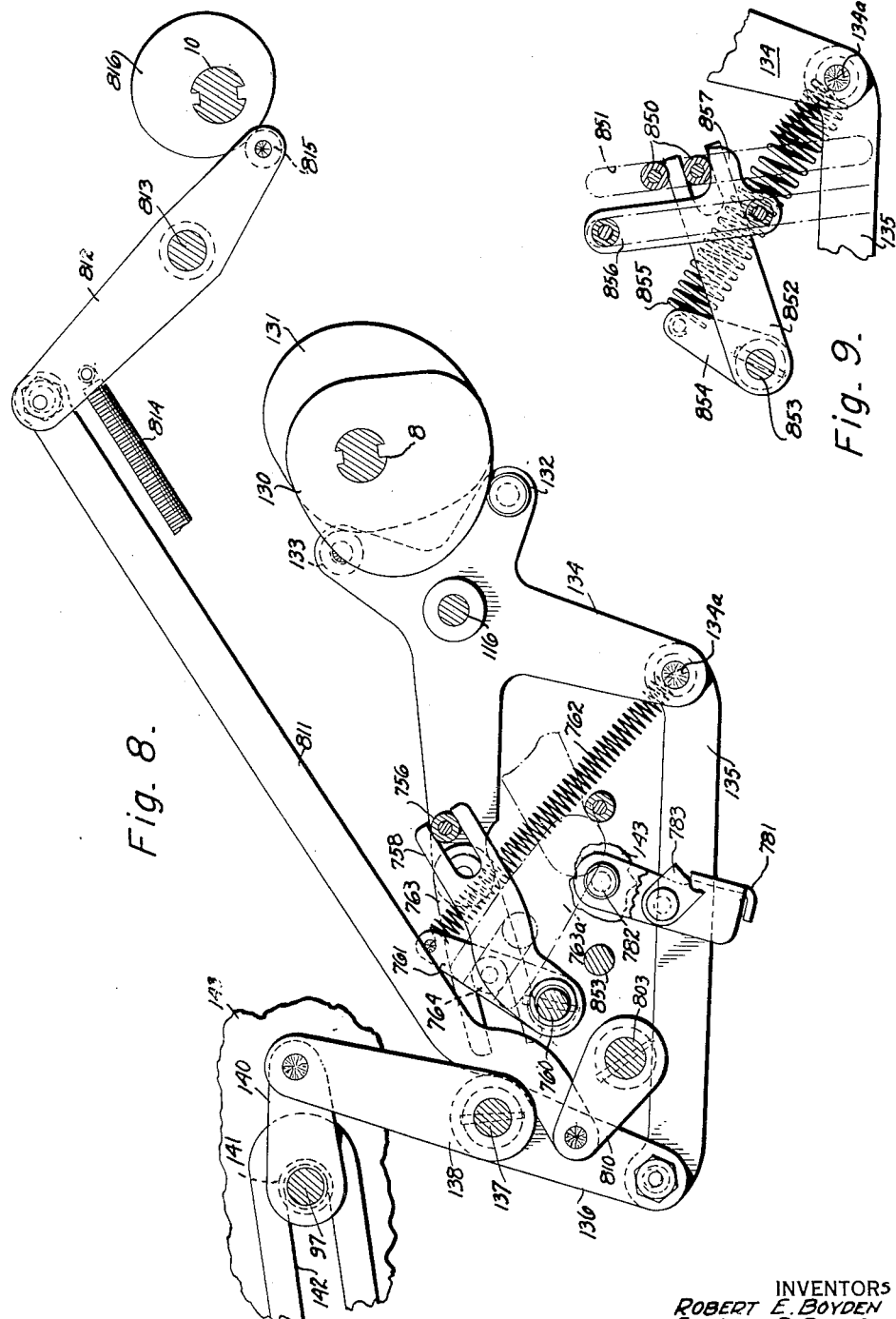

July 18, 1950    R. E. BOYDEN ET AL    2,515,692
PARTIAL PRODUCT MULTIPLYING CALCULATOR
Filed Nov. 19, 1946    35 Sheets-Sheet 7

INVENTORS
ROBERT E. BOYDEN
EDWARD P. DRAKE
BY
ATTORNEY

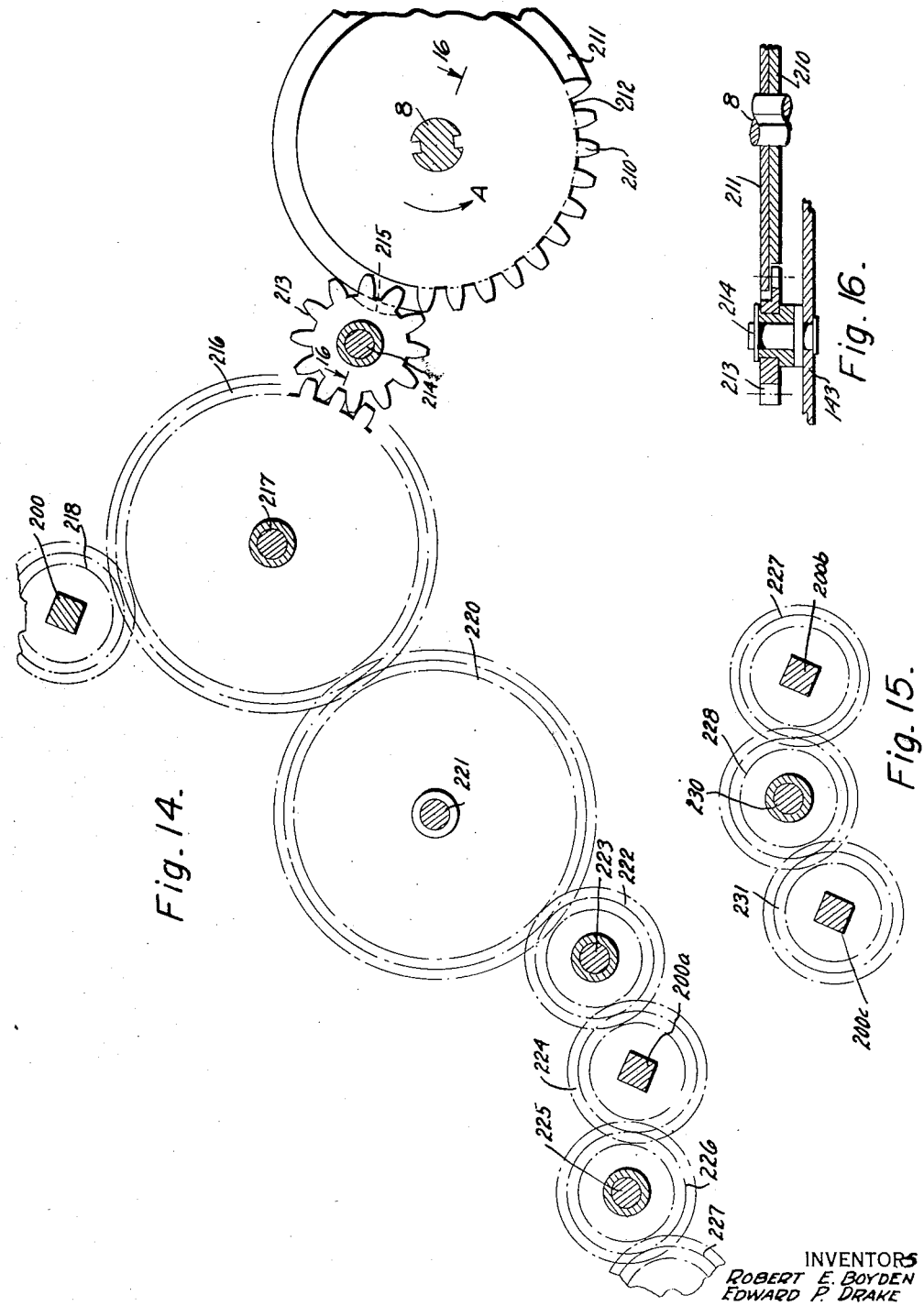

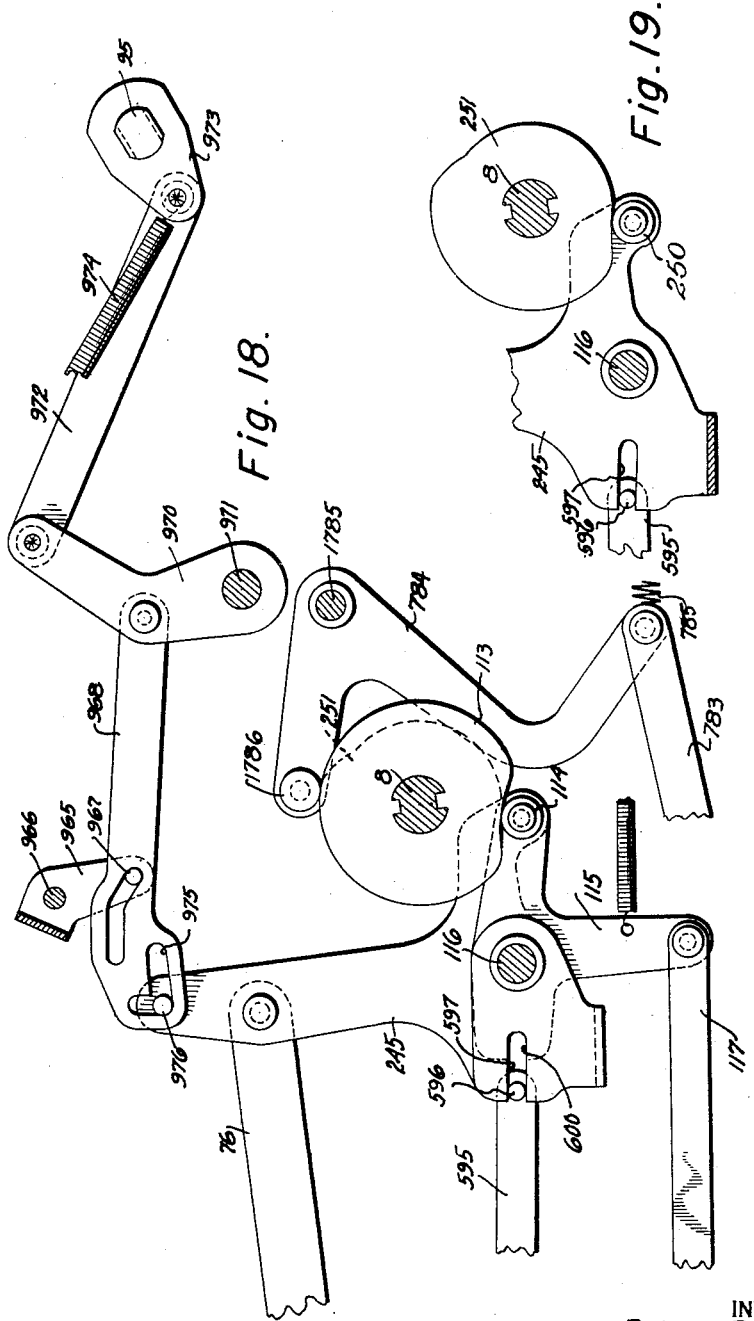

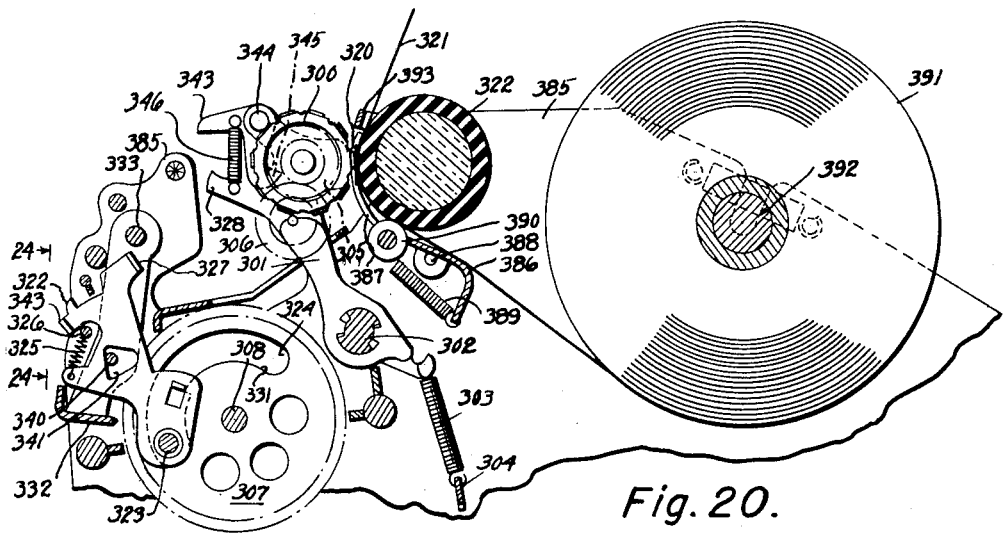
Fig. 20.
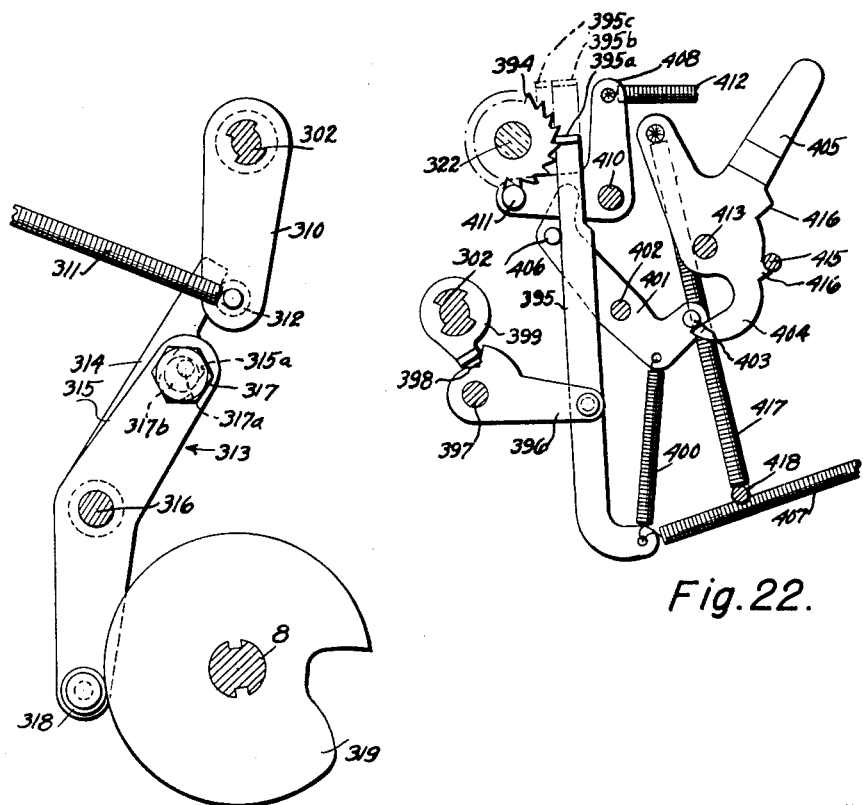
Fig. 21.
Fig. 22.
INVENTORS
ROBERT E. BOYDEN
EDWARD P. DRAKE
ATTORNEY July 18, 1950 R. E. BOYDEN ET AL 2,515,692
PARTIAL PRODUCT MULTIPLYING CALCULATOR
Filed Nov. 19, 1946 35 Sheets-Sheet 12
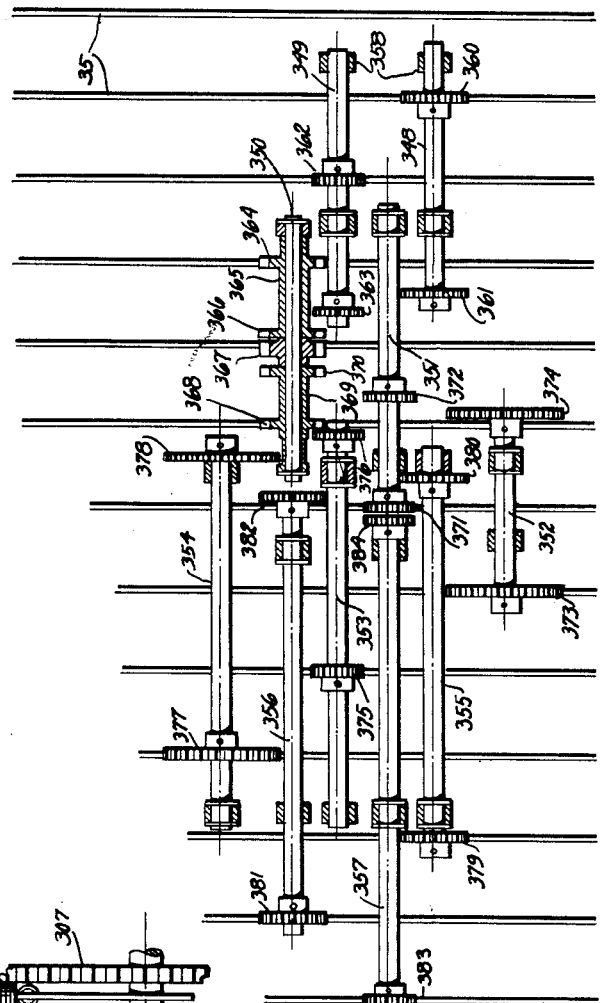
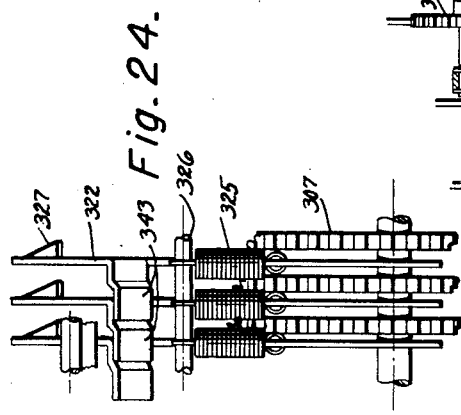
INVENTORS
ROBERT E. BOYDEN
EDWARD P. DRAKE
BY
ATTORNEY July 18, 1950

R. E. BOYDEN ET AL 2,515,692

PARTIAL PRODUCT MULTIPLYING CALCULATOR

Filed Nov. 19, 1946

INVENTORS
ROBERT E. BOYDEN
EDWARD P. DRAKE

BY

*Fred N. Schwartz*
ATTORNEY

July 18, 1950   R. E. BOYDEN ET AL   2,515,692
PARTIAL PRODUCT MULTIPLYING CALCULATOR Filed Nov. 19, 1946   35 Sheets-Sheet 14

INVENTORS
ROBERT E. BOYDEN
EDWARD P. DRAKE
BY
ATTORNEY

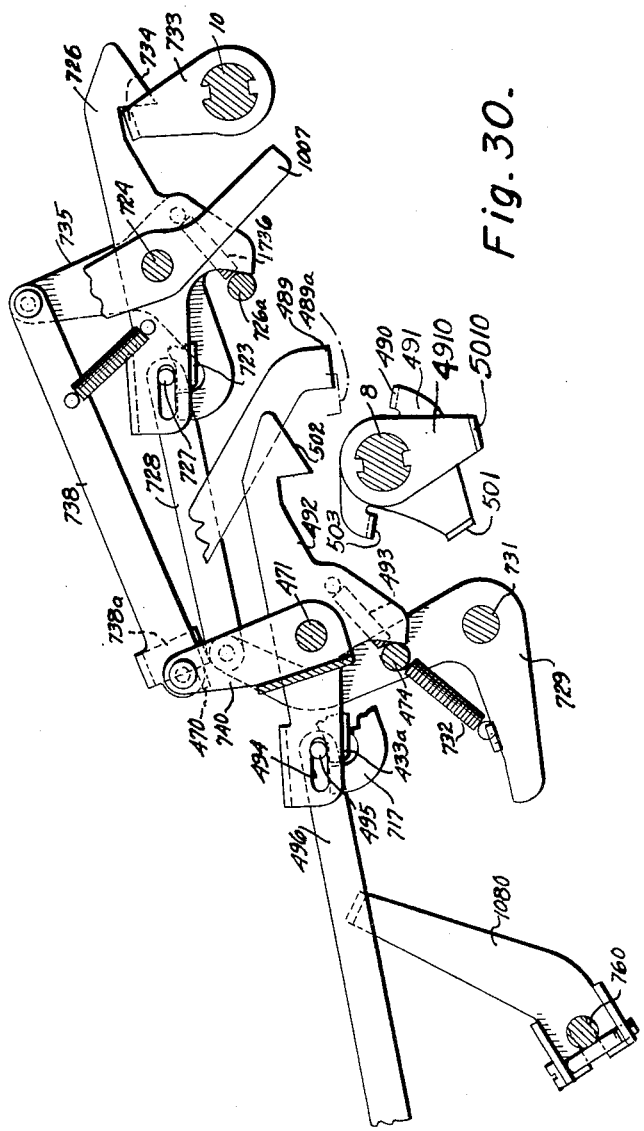

July 18, 1950
R. E. BOYDEN ET AL
2,515,692
PARTIAL PRODUCT MULTIPLYING CALCULATOR
Filed Nov. 19, 1946
35 Sheets-Sheet 16
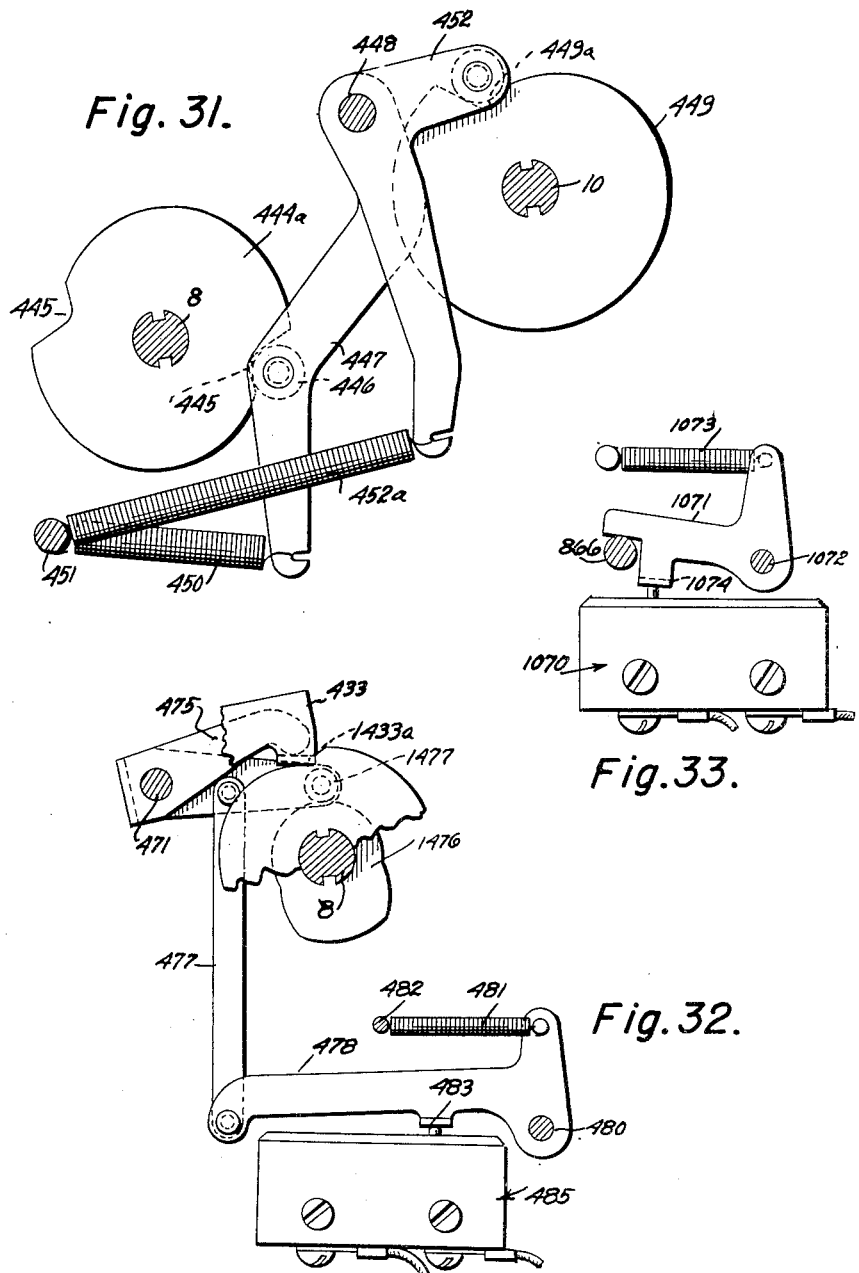
INVENTORS
ROBERT E. BOYDEN
EDWARD P. DRAKE
BY
ATTORNEY July 18, 1950  R. E. BOYDEN ET AL  2,515,692
PARTIAL PRODUCT MULTIPLYING CALCULATOR Filed Nov. 19, 1946  35 Sheets-Sheet 19

INVENTORS
ROBERT E. BOYDEN
EDWARD P. DRAKE
BY
ATTORNEY

July 18, 1950 R. E. BOYDEN ET AL 2,515,692
PARTIAL PRODUCT MULTIPLYING CALCULATOR
Filed Nov. 19, 1946 35 Sheets-Sheet 20

INVENTORS
ROBERT E. BOYDEN
EDWARD P. DRAKE
BY
Fred M. Schwan
ATTORNEY

INVENTORS
ROBERT E. BOYDEN
EDWARD P. DRAKE
ATTORNEY

July 18, 1950  R. E. BOYDEN ET AL  2,515,692
PARTIAL PRODUCT MULTIPLYING CALCULATOR Filed Nov. 19, 1946  35 Sheets-Sheet 25

INVENTORS
ROBERT E. BOYDEN
EDWARD P. DRAKE
BY
ATTORNEY

July 18, 1950   R. E. BOYDEN ET AL   2,515,692
PARTIAL PRODUCT MULTIPLYING CALCULATOR Filed Nov. 19, 1946   35 Sheets-Sheet 26

INVENTORS
ROBERT E. BOYDEN
EDWARD P. DRAKE
BY
ATTORNEY

July 18, 1950  R. E. BOYDEN ET AL  2,515,692
PARTIAL PRODUCT MULTIPLYING CALCULATOR
Filed Nov. 19, 1946  35 Sheets-Sheet 27

INVENTORS
ROBERT E. BOYDEN
EDWARD P. DRAKE
BY
ATTORNEY

July 18, 1950   R. E. BOYDEN ET AL   2,515,692
PARTIAL PRODUCT MULTIPLYING CALCULATOR
Filed Nov. 19, 1946   35 Sheets-Sheet 28

INVENTORS
ROBERT E. BOYDEN
EDWARD P. DRAKE
BY
ATTORNEY

July 18, 1950   R. E. BOYDEN ET AL   2,515,692
PARTIAL PRODUCT MULTIPLYING CALCULATOR
Filed Nov. 19, 1946   35 Sheets-Sheet 31

INVENTORS
ROBERT E. BOYDEN
EDWARD P. DRAKE
BY
ATTORNEY

July 18, 1950  R. E. BOYDEN ET AL  2,515,692
PARTIAL PRODUCT MULTIPLYING CALCULATOR
Filed Nov. 19, 1946  35 Sheets-Sheet 32

INVENTORS
ROBERT E. BOYDEN
EDWARD P. DRAKE
BY
ATTORNEY

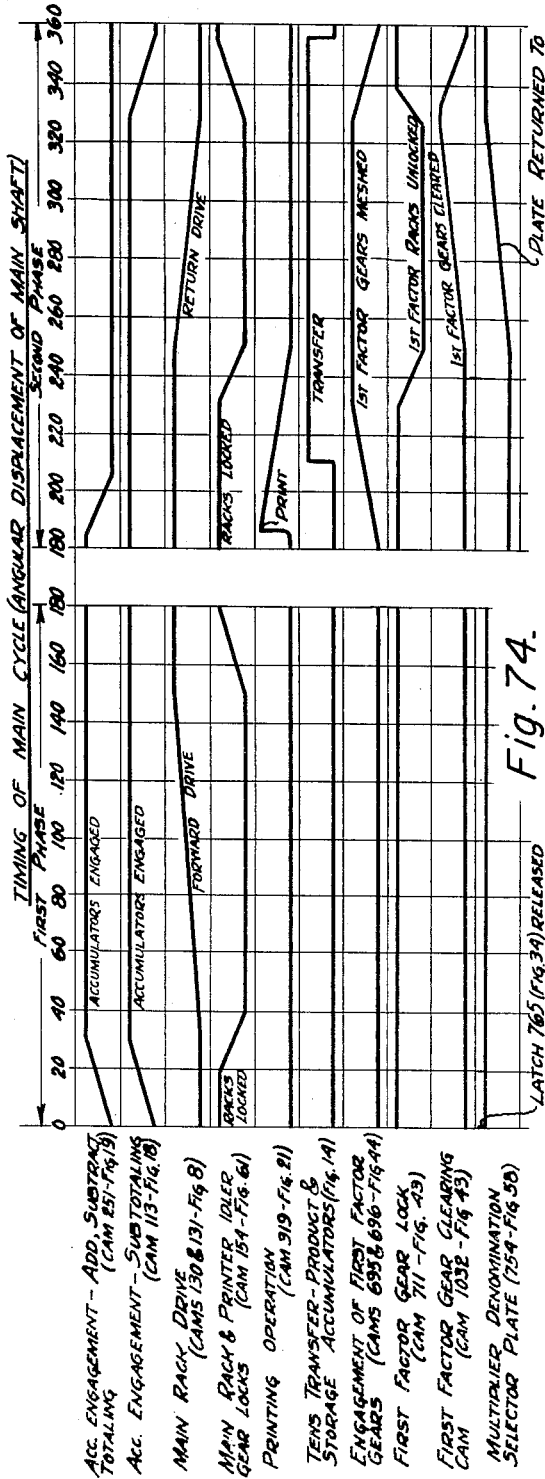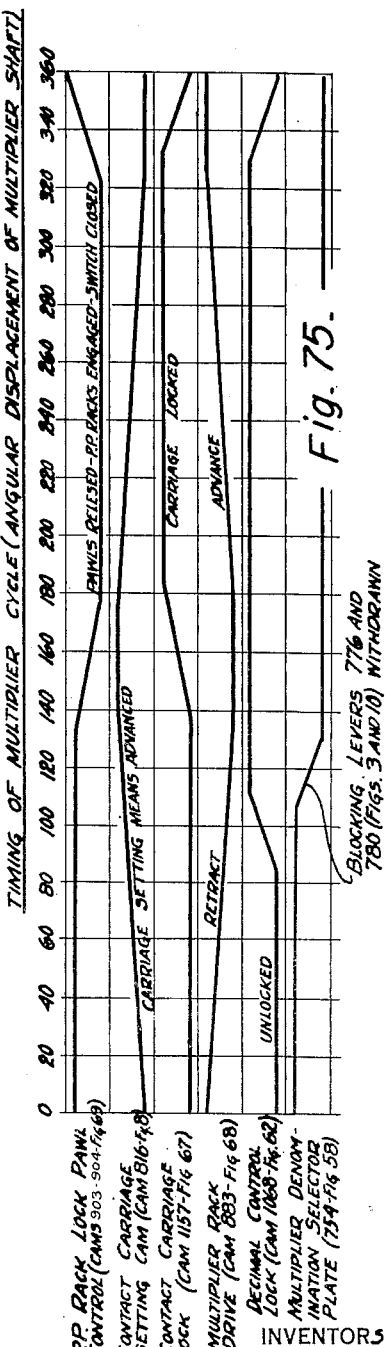

Patented July 18, 1950

2,515,692

UNITED STATES PATENT OFFICE 2,515,692

PARTIAL PRODUCT MULTIPLYING CALCULATOR

Robert E. Boyden, Los Angeles, and Edward P. Drake, Glendale, Calif., assignors to Clary Multiplier Corporation, Los Angeles, Calif., a corporation of California Application November 19, 1946, Serial No. 710,880

26 Claims. (Cl. 235—61)

This invention relates to calculating machines of the type capable of performing multiplication as well as addition and subtraction, and has particular reference to the type adapted to perform multiplication by the partial products method, that is, by summing the products resulting from the separate multiplication of all digits of the multiplicand by each digit of the multiplier.

An important and principal object of the invention is to provide a calculating machine capable of rapidly performing multiplication problems and printing the results as well as the various factors.

Other important but more specific objects of the invention are:

1. To reduce the number of machine cycles required to perform a multiplication problem.
2. To enter one factor of a multiplication problem while a preceding multiplication problem is being solved by the machine.
3. To reduce the time as well as wear incurred in adjusting a factor representing device to successively represent different factors.
4. To selectively accumulate either multiplier or multiplicand factors of a multiplication in a single accumulator.
5. To provide common control keys to condition any selected ones of a plurality of accumulators.
6. To provide an improved and simple form of coupling device between two movable elements, as for example, to couple the multiplicand entering mechanism to the main racks of a machine of this type.
7. To reduce the amount of wiring required for an electrically controlled calculating machine.
8. To provide an improved form of accumulator actuating mechanism.
9. To lessen the number of sequential functions in a multiplication cycle.
10. To facilitate cross footing from one accumulator to another.
11. To utilize addition control mechanism in performing certain phases of a multiplication operation.
12. The simple design of the various elements, the compact arrangement of said elements and the provision of simple, effective and compact controls for said elements thereby providing a light and portable machine.

The manner in which the above and other objects of the invention are accomplished will be readily understood on reference to the following specification when read in conjunction with the accompanying drawings, wherein:

Fig. 1 is a plan view, partly broken away, of a calculating machine embodying the present invention.

Figs. 2 and 3 jointly illustrate a longitudinal sectional elevation view through the machine.

Fig. 4 is a transverse sectional view through a portion of the keyboard.

Fig. 5 is a sectional plan view illustrating the automatic key release and repeat key mechanism and is taken along the line 5—5 of Fig. 6.

Fig. 6 is a front view illustrating the automatic key release and repeat key mechanism and is taken in the direction of the arrow 6 in Fig. 5.

Fig. 7 is a side view of the automatic key release and repeat key mechanism and is taken in the direction of the arrow 7 of Fig. 6.

Fig. 8 is a side elevation showing the mechanism for driving the main racks and for controlling the multiplier digit selection mechanism.

Fig. 9 is a detailed side elevation showing devices for controlling the denomination shift switch devices.

Figs. 14 and 15 are side elevational views which jointly illustrate the gear train for driving the tens transfer shafts for the various main and storage accumualtors.

Fig. 16 is a detailed sectional plan view of the geneva gear drive for the tens transfer shafts and is taken along the line 16—16 of Fig. 14.

Fig. 18 is a side elevation illustrating part of the accumulator controls and the means for coupling the main racks to the partial products accumulator.

Fig. 19 is a detailed view supplementing part of Fig. 18.

Fig. 20 is a side elevation illustrating the printing mechanism during a printing operation.

Fig. 21 is a side elevation of the printer drive mechanism.

Fig. 22 is a side elevation of the paper feed mechanism.

Fig. 23 is a sectional plan view of the condensing arrangement for transmitting a drive from the main racks to the printer mechanism and is taken substantially along the line 23—23 of Fig. 3.

Fig. 24 is a detailed front view of part of the printer mechanism and is taken along the line 24—24 of Fig. 20.

Fig. 30 is a side elevation illustrating further controls for the main and multiplier clutches.

Fig. 31 is a side elevation of the centralizing devices for the main and multiplier drive shafts.

Fig. 32 is a detail view showing the controls for the main switch.

Fig. 33 is a detail view illustrating the controls for the multiplier circuit switch.

Figures 47, 48:
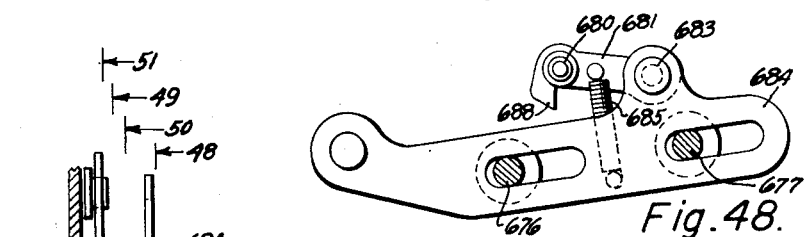
Fig. 47 is a sectional plan view of the multiplicand factor entry controls.
Figure 49:
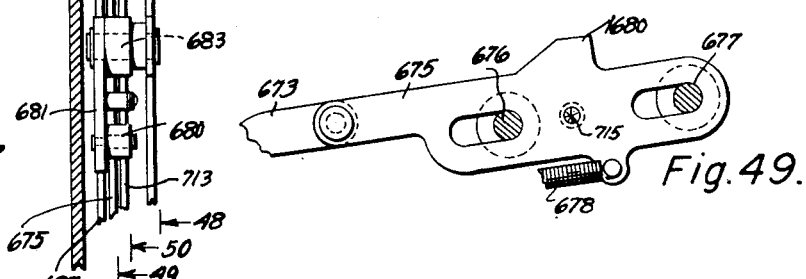
Figure 50:
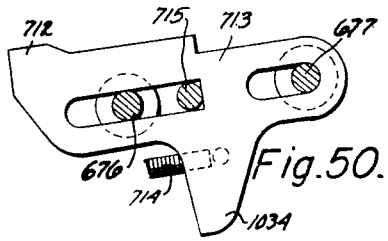
Figure 51:
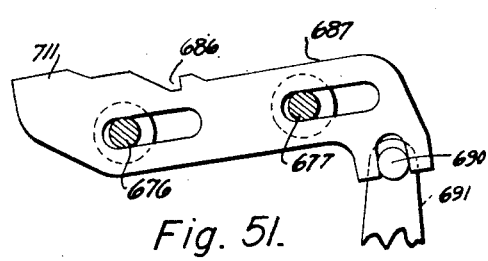

Figs. 48 to 51, inclusive, are detailed side elevational views taken along the lines 48—48 to 51—51, respectively, in Fig. 47.

Figure 52:
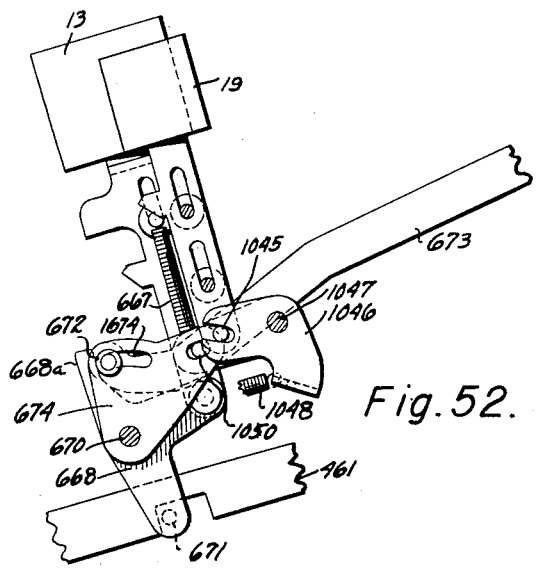

Fig. 52 is a detailed side elevation of part of the controls operable by the first factor bar and the reset as first factor bar.

Figure 53:
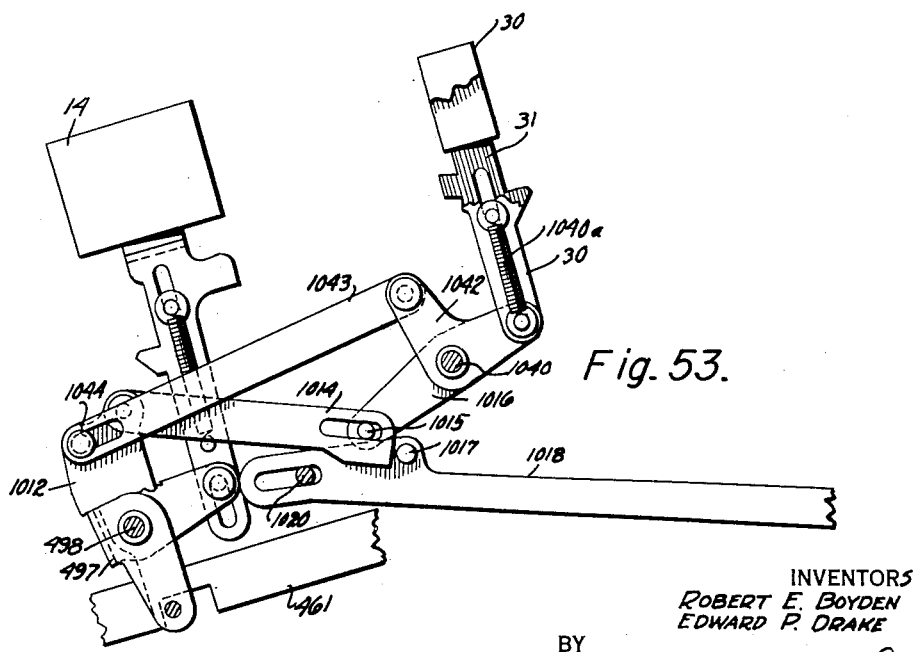

Fig. 53 is a side elevation illustrating part of the controls operable by the clear first factor bar, the constant first factor bar and the second factor bar.

Figure 54:
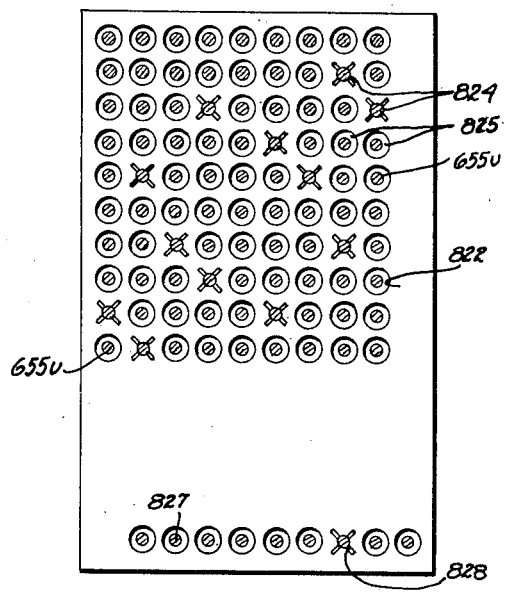
Figure 56:
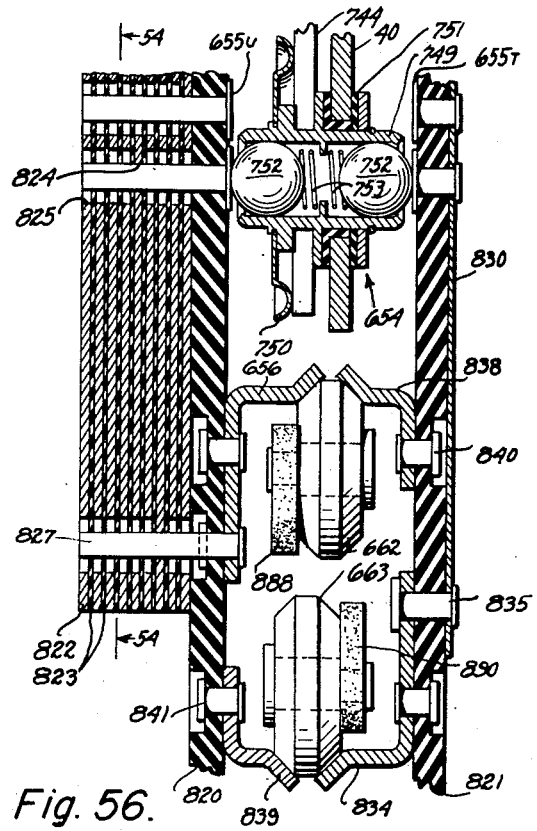

Fig. 54 is a sectional view through a units component partial product plate assembly and is taken along the line 54—54 of Fig. 56.

Figure 55:
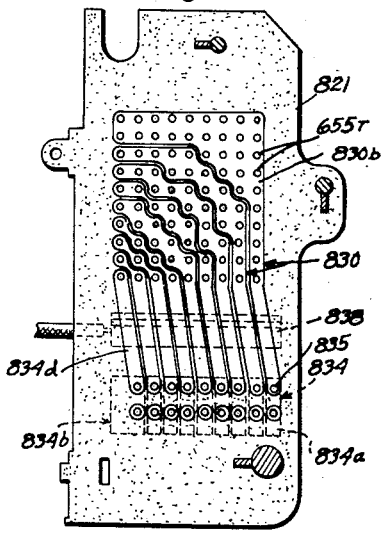

Fig. 55 is a rear view of a tens component partial product plate assembly.

Fig. 56 is a transverse sectional view through one order of units and tens component partial product plate assemblies.

Figure 57:
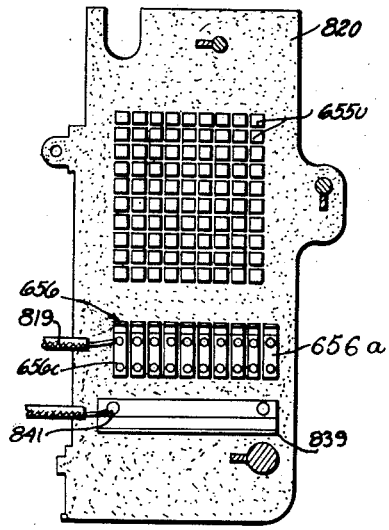

Fig. 57 is a front view of a units component partial product plate assembly.

Figures 58, 59, 60:
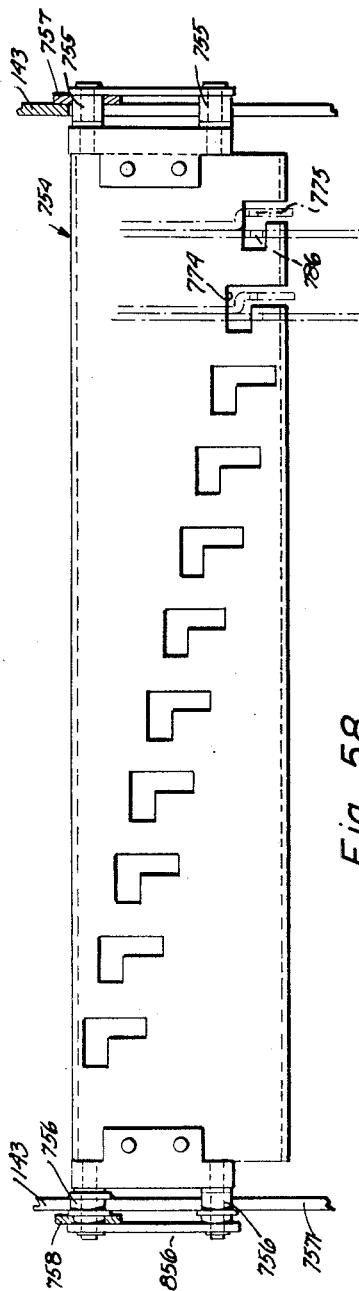

Fig. 58 is a front view of the multiplier digit selection control plate.

Fig. 59 is a front view, partly broken away, of a portion of the denomination shift switch mechanism.

Fig. 60 is an enlarged fragmentary sectional view through the diagonal bar supporting plate and is taken along the line 60—60 of Fig. 59.

Figure 61:
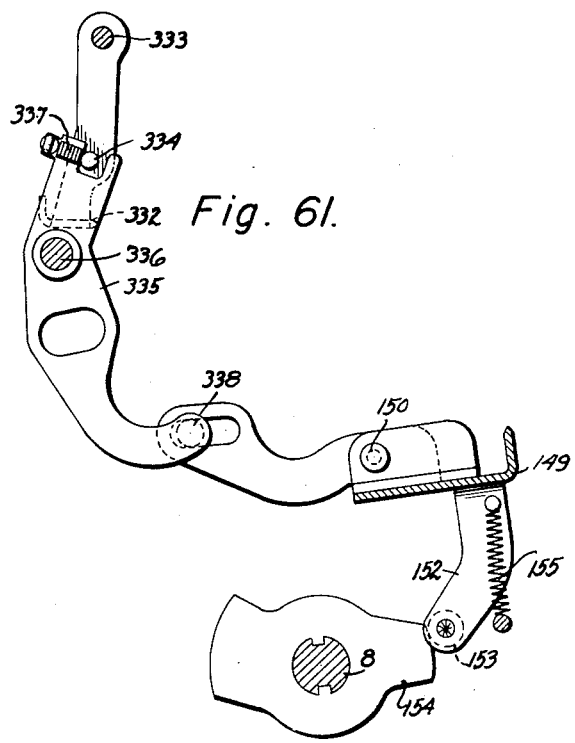

Fig. 61 is a side elevational view of the operating mechanism for the main rack lock and the printer idler gear lock.

Figure 62:
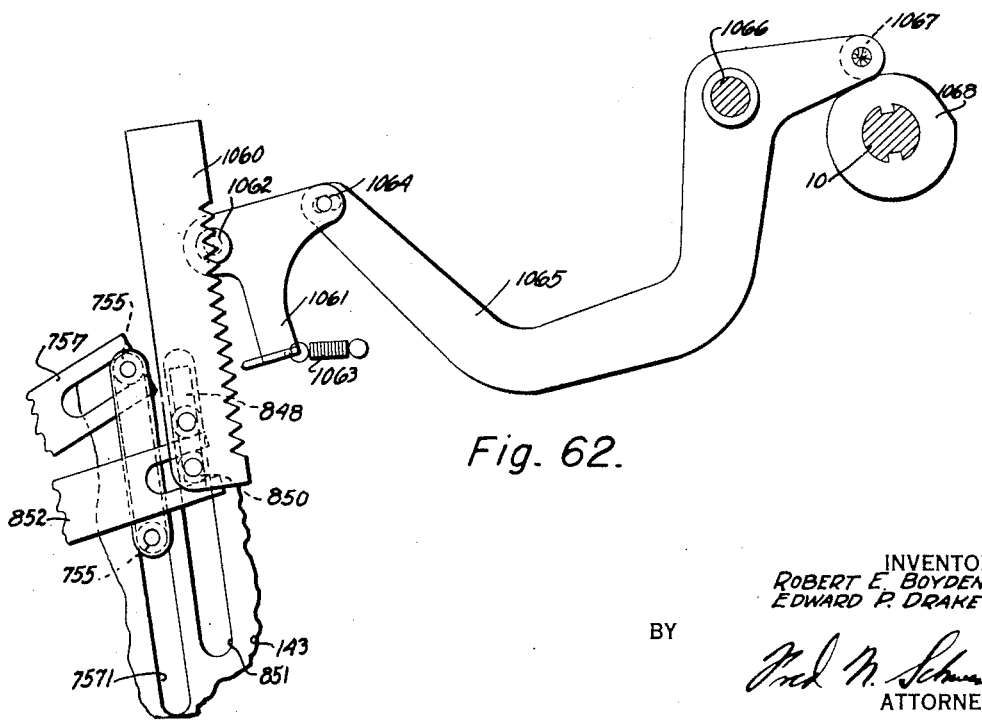

Fig. 62 is a side elevation of the mechanism for holding the denomination shift switch bar in any of its adjusted positions.

Figure 63:
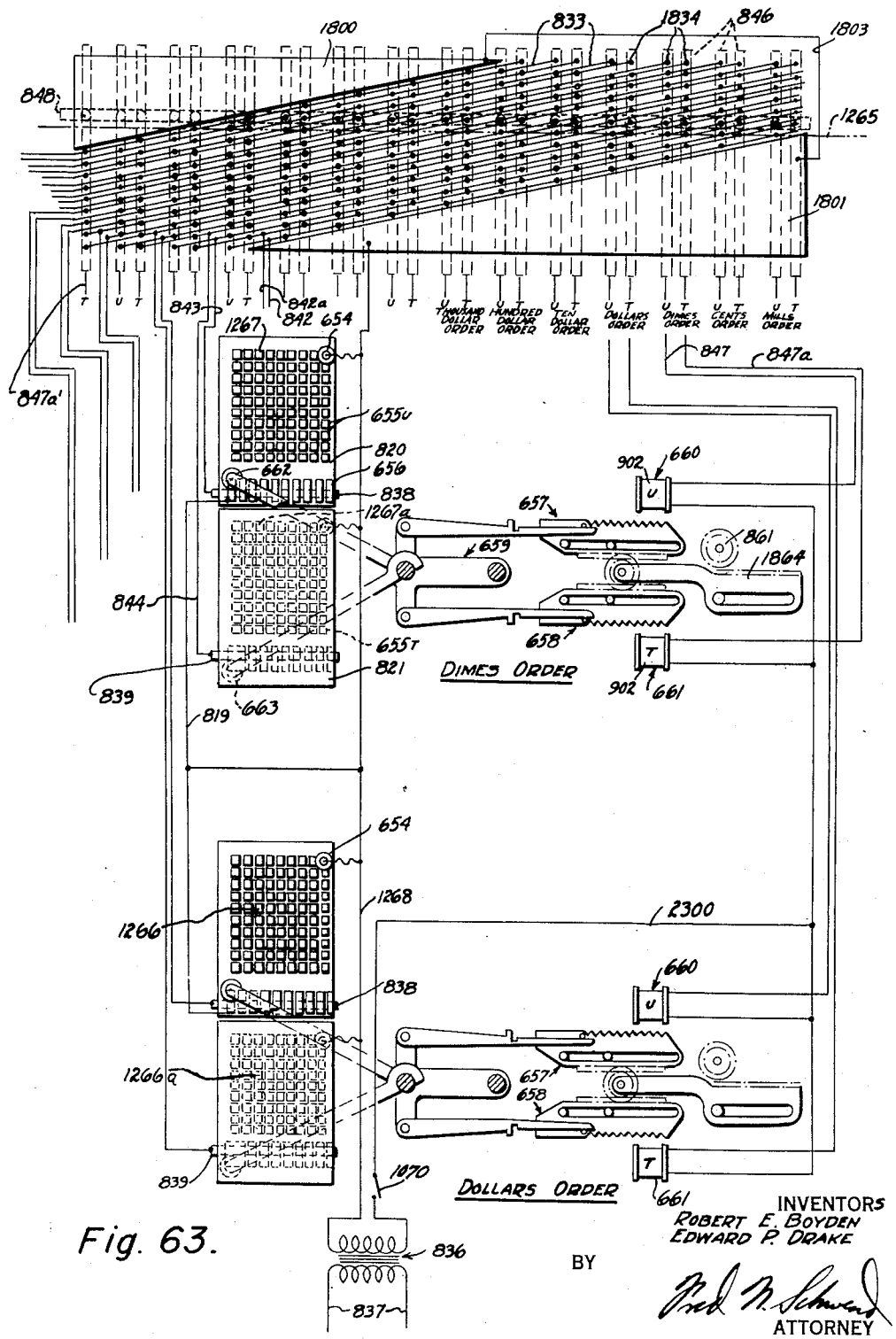

Fig. 63 is a diagram showing the relationship between the circuits and the mechanism of the multiplier instrumentalities.

Figure 64:
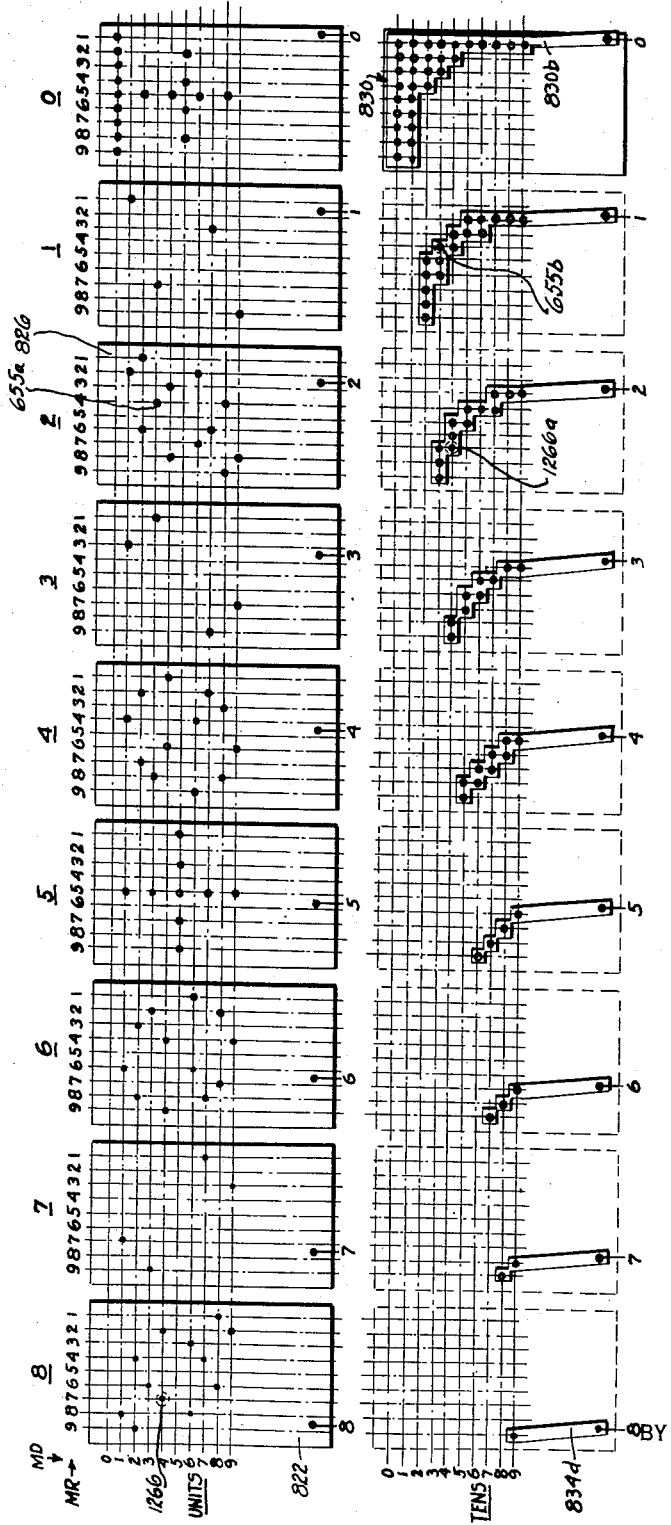

Fig. 64 is a diagram illustrating the disposition of the partial products circuits of the various partial product plate assemblies.

Figure 65:
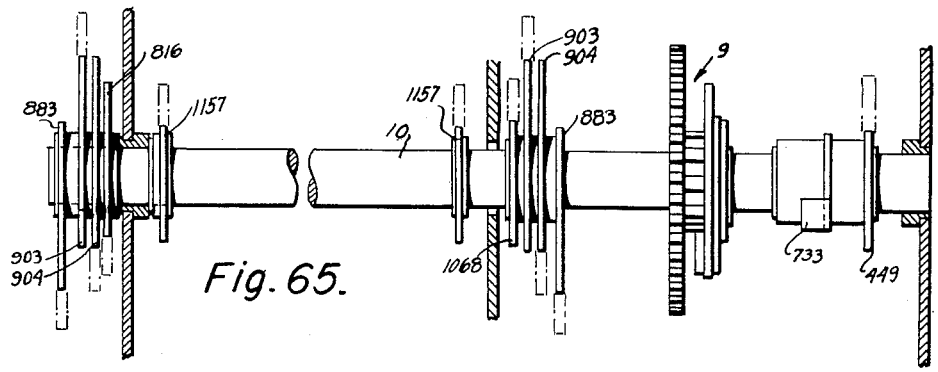

Fig. 65 is a front view illustrating the multiplier control shaft.

Figure 66:
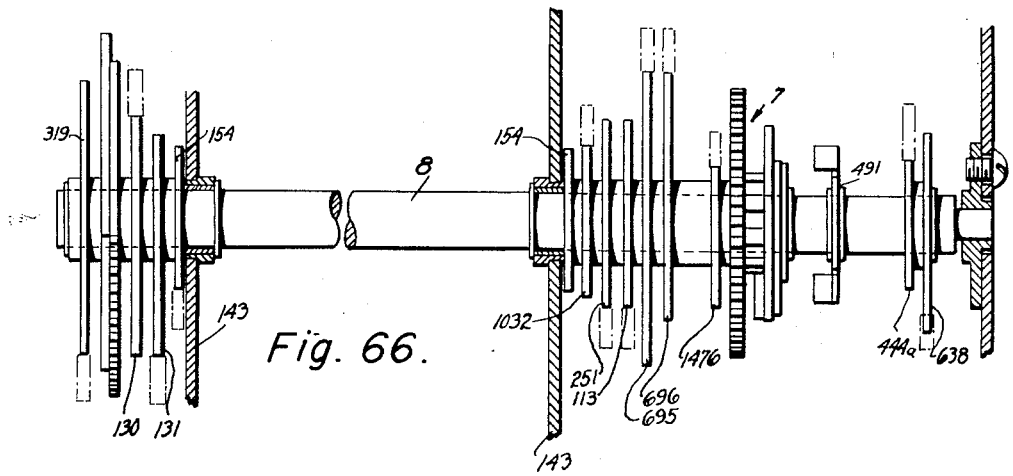

Fig. 66 is a front view illustrating the main shaft.

Figure 67:
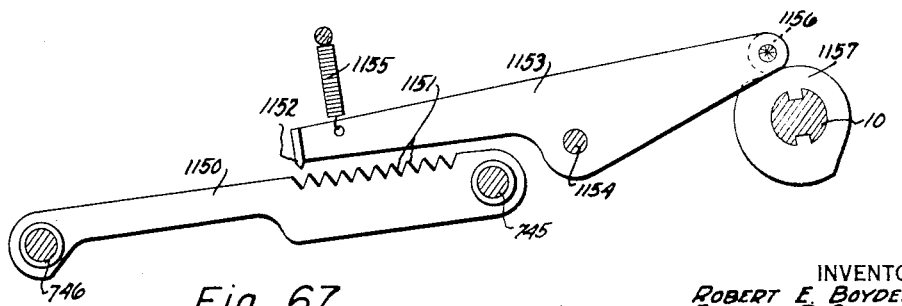

Fig. 67 is a side elevation of the means for locking the contact carriage in any of its adjusted positions.

Figure 68:
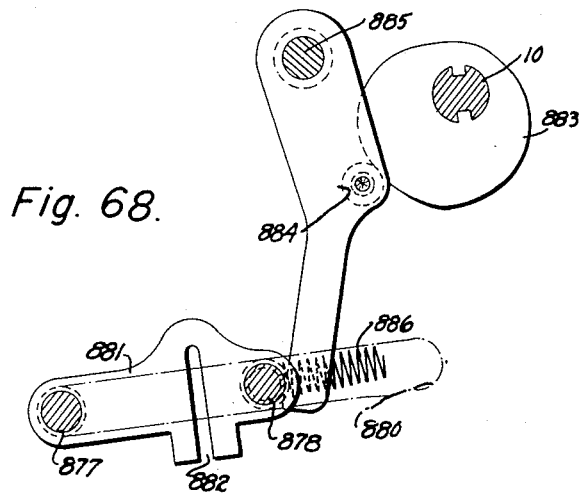

Fig. 68 is a detailed view illustrating the drive means for the partial product actuators.

Figure 69:
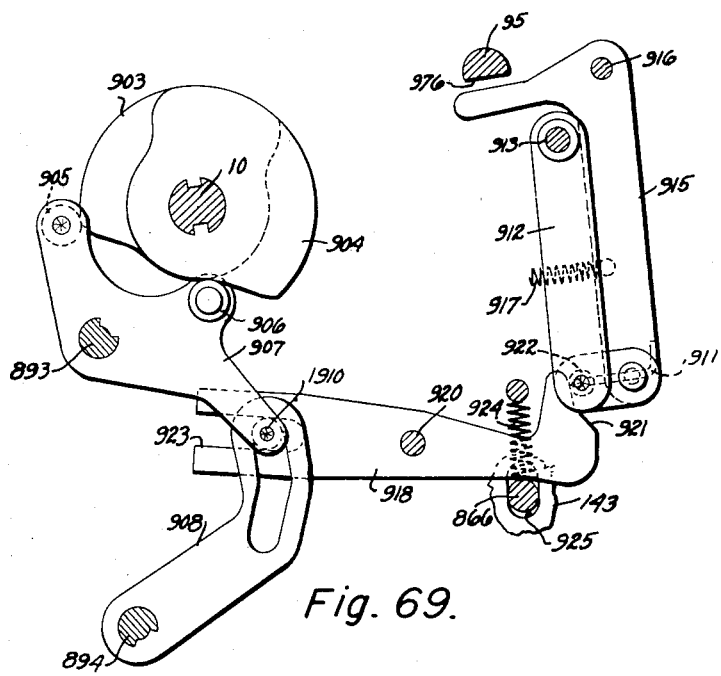

Fig. 69 is a side elevation illustrating part of the controls for the partial product actuators.

Figure 70:
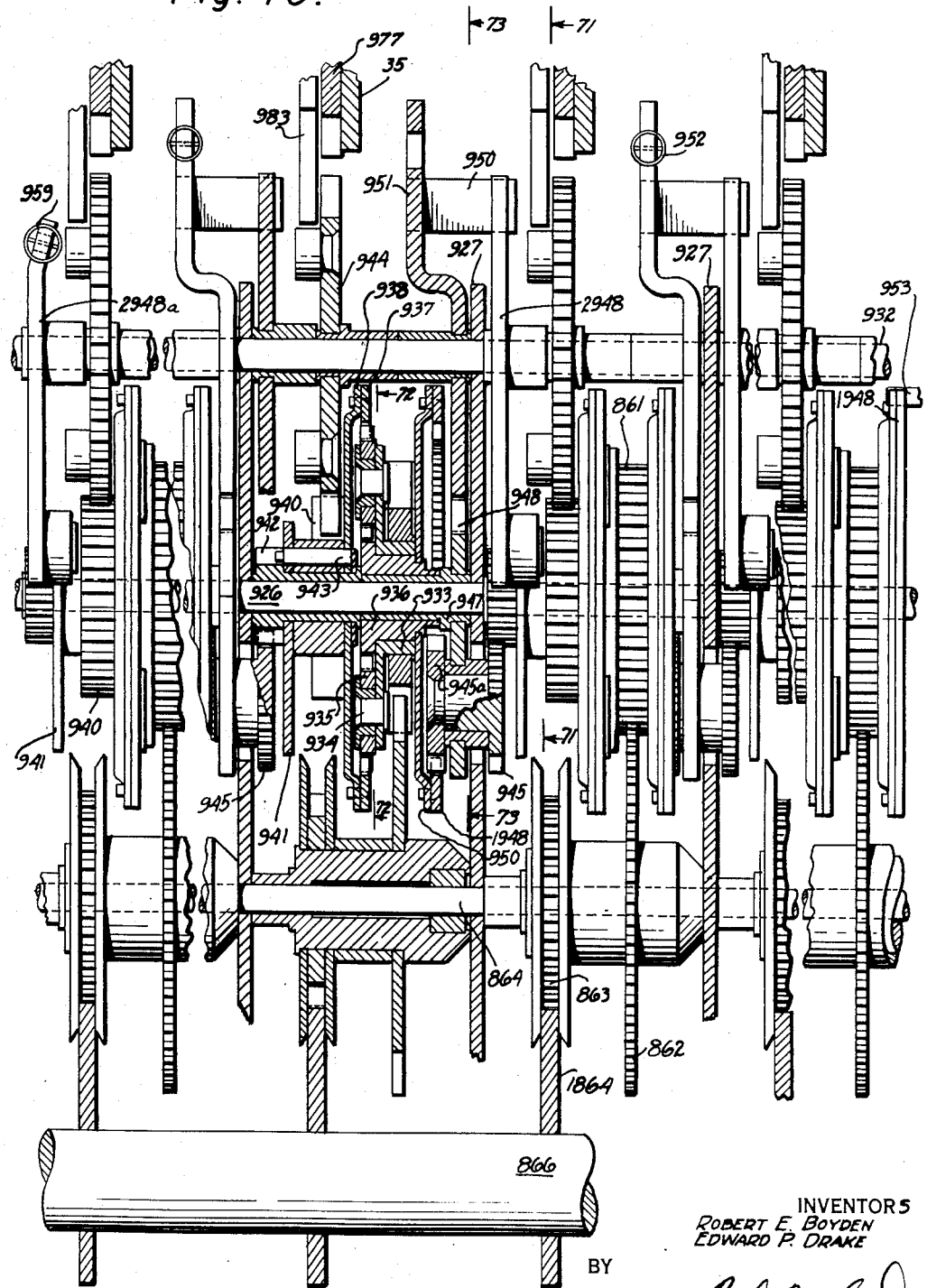

Fig. 70 is a sectional view through a plurality of orders of the partial product accumulator.

Figure 71:
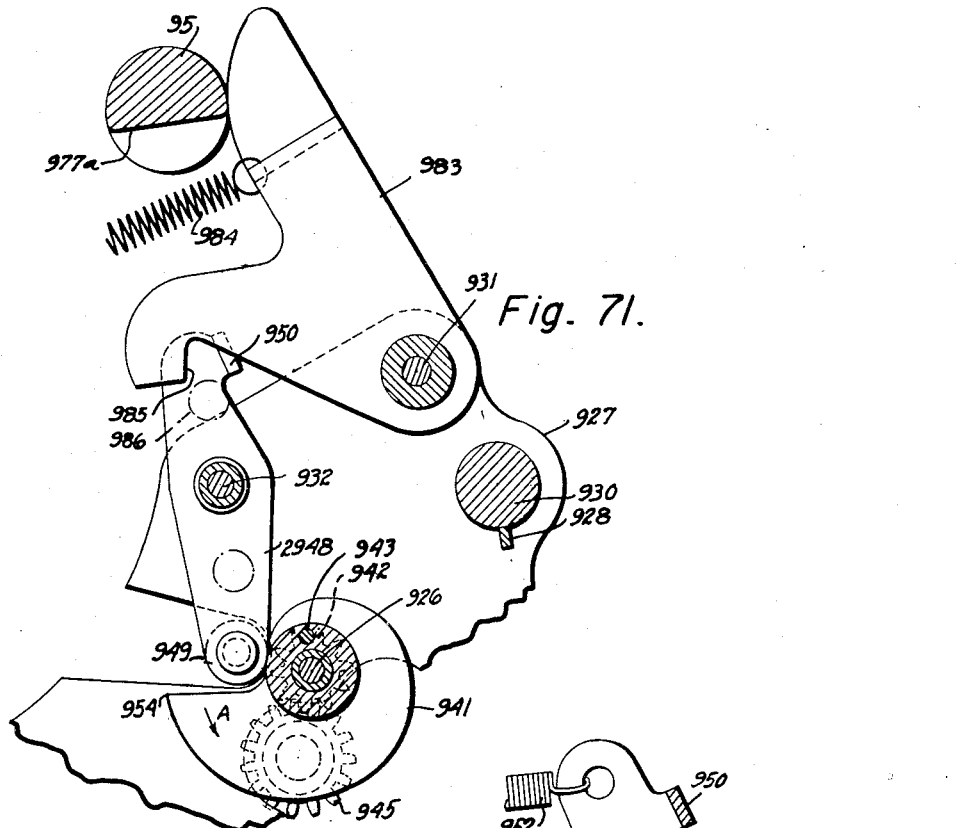

Fig. 71 is a detailed side view of a portion of the compensating devices of the partial product accumulator and is taken along the line 71—71 of Fig. 70.

Figure 72:
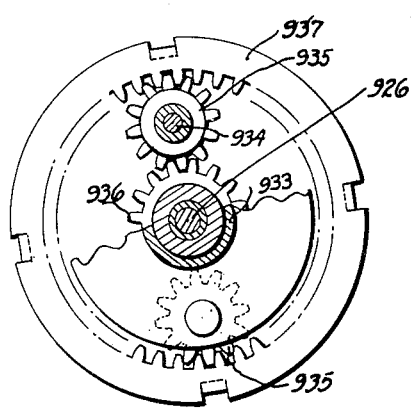

Fig. 72 is a detailed side view of the planetary mechanism of the partial product accumulator and is taken along the line 72—72 of Fig. 70.

Figure 73:
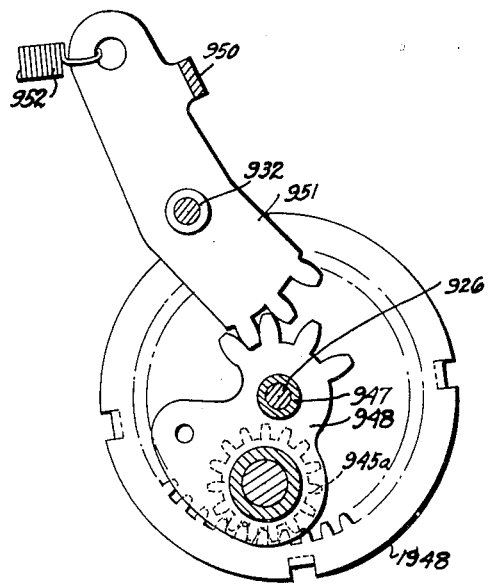

Fig. 73 is a detailed sectional view of other portions of the compensating devices and is taken along the line 73—73 of Fig. 70.

Fig. 74 is a timing diagram of the main operating mechanisms of the machine.

Fig. 75 is a timing diagram of the multiplying instrumentalites of the machine.

*Sections*

In order to facilitate reference to different ones of the sections in the specification, the titles of such sections are catalogued as follows:

1. General description
2. Keyboard
3. Keyboard release
4. Racks and rack drive
5. Main and storage accumulators
6. Accumulator controls
7. Printing mechanism
8. Paper feed
9. Power drive
10. Clutch construction
11. Addition controls
12. Superseding of automatic accumulator selection during addition 13. Subtraction controls
14. Non-add controls
15. Totaling controls
16. Sub-total controls
17. Control key locks
18. Multiplication control mechanism
19. Multiplicand entering means
20. Multiplier entering means
21. Engagement of multiplier clutch
22. Contact carriage
23. Means for sequentially setting contact carriage in accordance with different multiplier digits
24. Partial products electrical system
25. Denomination shift switch
26. Actuator for partial product accumulator
27. Partial products accumulator
28. Entry of new factor during multiplication
29. Operation of multiplication control mechanism
30. Partial product accumulator totaling controls
31. Automatic product controls
32. Automatic clearance of first factor
33. Constant first factor control means
34. Manually controlled clear first factor mechanism
35. Storage of first or second factors
36. Reset first factor mechanism

1. General description

The machine in which the present invention is embodied is of the reciprocation rack type, utilizing differentially operable reciprocating racks to transmit mechanical representations of values between different operating units of the machine, such as the keyboard, accumulators, multiplying mechanism, etc. A printing mechanism is provided for printing the factors and result of a problem, the latter also being operatively connected to the racks. Visible dials are also associated with a main accumulator whereby the results or totals entered into the accumulator may be visibly determined.

The machine is primarily a multiplying machine, utilizing electrical circuits selectable in accordance with the two factors of a multiplication problem. The circuits are arranged to control actuation of an accumulator in accordance with the partial products of the multiplication tables while means are provided for simultaneously registering both the units and tens partial products components so that the number of cycles of operation of the machine for each multiplier digit is maintained at a minimum of one in contradistinction to a machine performing multiplication by repeated addition in which the number of cycles per multiplier digit is proportional to the value of such digit. This reduction in time and mend wear incurred in operating the machine to perform multiplication problems is further increased by eliminating machine cycles for multiplier digits of zero value.

The accumulator for receiving and summing the various partial products of a multiplication problem is differentially driven by what we will term the "timed declutching" system basically disclosed and claimed in the patent to H. L. Clary, No. 2,167,827, in which the accumulator is driven by ordinal actuators which are coupled to a constant excursion drive means and uncoupled therefrom under control of the associated partial product circuits when the accumulator registers the value of the partial products being entered therein.

Figure 1:
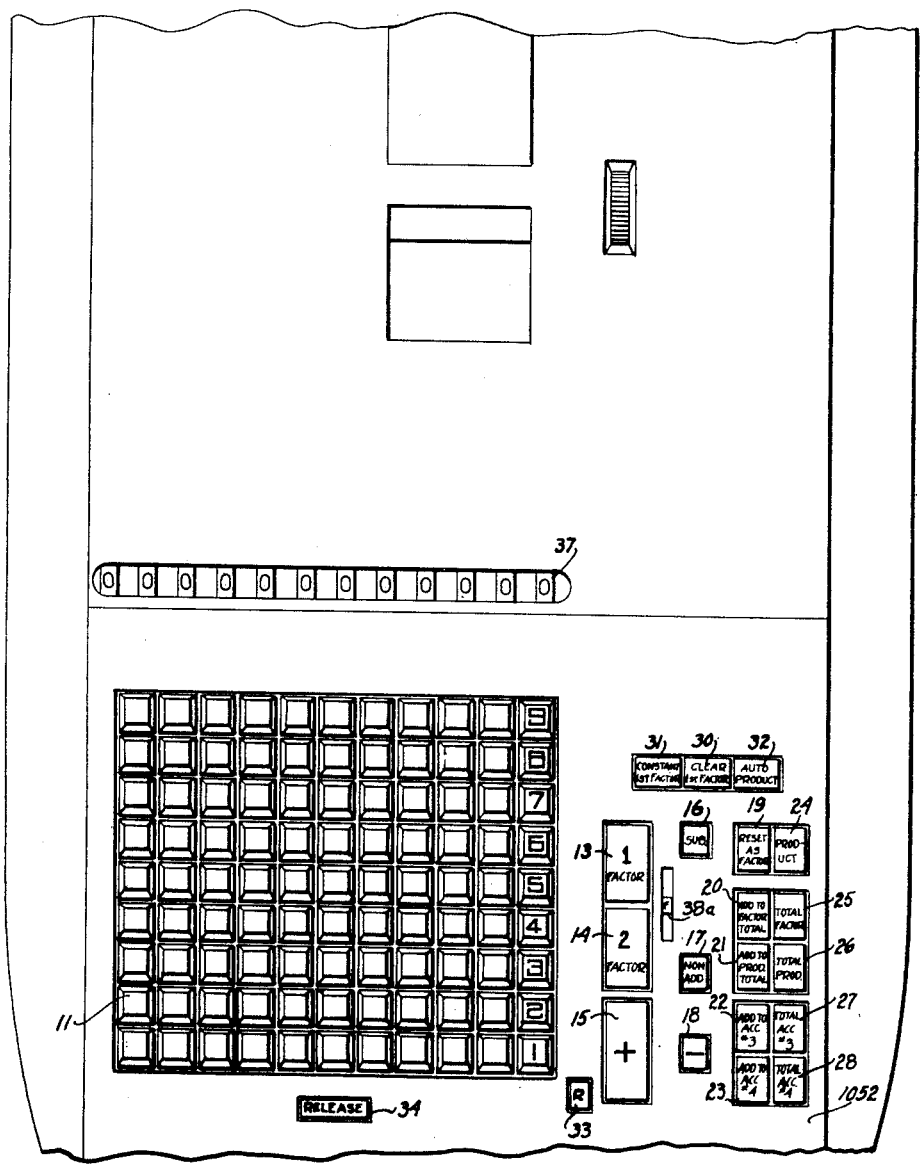

Describing first the general arrangement of the controls for the machine, attention is directed to Fig. 1 wherein it will be noted that the machine is of the full key keyboard type comprising a plurality of rows of value keys 11 in which may be set the various factors of a calculation, such as the multiplicand and multiplier factors of a multiplication.

At the right of the keyboard is a group of control bars and keys which are arranged to facilitate control of the machine by the operator's right hand. Included in this group is a longitudinally extending row of depressible motorized bars comprising a first factor (multiplicand) entering bar 13, a second factor (multiplier) entering bar 14 and an add bar 15, each adapted to cause operation of the machine. In a second row are located settable conditioning keys comprising a sub-total key 16, a non-add key 17 and a subtract key 18. These keys, when depressed, are latched down and are automatically released during or at the end of the following machine operation. In a third row are a second set of settable conditioning keys comprising a "reset as factor" key 19, an "add to factor total" key 20, an "add to the product total" key 21, an "add to accumulator #3" key 22, and an "add to accumulator #4" key 23. In a fourth row are located a second set of motorized bars comprising a "product" bar 24, a "total factor" bar 25, a "total product" bar 26, a "total-accumulator #3" bar 27, and a "total-accumulator #4" bar 28.

At the rear of the series of above mentioned conditioning keys and bars are located a "clear first factor" motorized bar 30 and two latch down keys comprising a "constant first factor" key 31 and an "automatic product" key 32. The latter keys 31 and 32 when depressed are latched down until subsequently manually released in a manner to be described later.

The value keys 11, when depressed, are normally released during a subsequent machine operation. However, to provide for repeat operations, a repeat key 33 is provided, which, when held depressed, prevents automatic release of the value keys. A key release key 34 is provided to manually release depressed ones of the value keys in the event of an erroneous entry into the keyboard.

The keys 16 to 23, inclusive, are latch-down keys, any of which may be depressed previous to a machine operation and are automatically released at the end of the operation but in case of an error in setting said keys, which would be noticed before the operation is commenced, the erroneous key may be automatically released by simply depressing the correct key in the respective row.

The machine and its operation in performing the different types of calculations will be described in detail later on, but to facilitate understanding of the general operation of the machine in performing these different calculations, the general operation will now be outlined.

In performing addition, each factor to be added is set up in the keyboard and the add bar 15 is depressed, causing the power mechanism to drive ordinally arranged racks 35 (Figs. 2 and 3) forward amounts differentially limited by the depressed amount keys 11. During normal addition problems, a main accumulator generally indicated at 36 is automatically coupled to the racks, thus entering the value set up in the keyboard into the accumulator. Dials 37 operatively connected to the different orders of the accumulator 36 indicate the values registered thereon.

In lieu of the normal entry of amounts into the main accumulator 36, such amounts may instead be entered into either of two storage accumulators generally indicated at 3 and 4 by first depressing either of the "add to accumulator" keys 22 and 23, respectively, and thereafter depressing the add bar 15. These amounts may also, if desired, be simultaneously entered into both accumulators 3 and 4 by first setting both keys 22 and 23. Furthermore, the amounts may be entered into the third storage accumulator (termed the factor accumulator), generally indicated at 38, by first depressing the "add to factor total" key 20 which controls entry into such accumulator.

Depression of the "total product" bar 26 totals or clears the amount registered by the main accumulator 36 therefrom and into the printing mechanism where it is printed onto a paper tape in a manner to be described later.

In the event it is desired to total out amounts from any one of the storage accumulators instead of from the main accumulator, their respective total bars may be depressed, i. e. the "total factor" bar 25 controls totaling of the factor storage accumulator 38, the "total accumulator #3" bar 27 controls totaling of the accumulator 3 and the "total accumulator #4" bar 28 controls totaling of the accumulator 4.

Subtraction is generally performed by setting up the minuend in the keyboard and then transferring the same into the main accumulator 36 by depressing the add bar 15 as in addition. The subtrahend is then set up in the keyboard, after which the subtract key 18 is depressed and latched down. Thereafter, the add bar 15 is depressed to institute a machine operation to negatively transfer the subtrahend into the main accumulator so that the subtrahend is subtracted from the minuend and the difference is indicated in the dials 37. Totaling and printing of the difference thus obtained may be done by depressing the "total product" bar 26 or other total bars exactly as in addition.

In performing multiplication, the first factor (multiplicand) is set up in the keyboard and the first factor bar 13 is depressed causing the power drive means to drive the racks 35 forward amounts determined by the values of the depressed value keys 11. During this forward stroke the racks 35 vertically adjust associated multiplicand racks 40 (Fig. 2) through coupling means, to be described in detail later on, to positions mechanically representing the values of the multiplicand digits. The multiplicand racks thus form a multiplicand receiving device and remain in their adjusted positions throughout the multiplication operation. Thereafter, the multiplier or second factor is set up in the keyboard and the second factor bar 14 is depressed. The latter bar institutes operation of the multiplying mechanism and also causes the power drive to differentially advance the racks 35 forward amounts controlled by the depressed value keys. The racks are retained in their forward key limited positions throughout the multiplication operation, thus forming multiplier value receiving devices.

Although the racks, or rather those racks in orders wherein value keys have been depressed to represent significant digits, are all simultaneously moved forward to mechanically represent the multiplier factor, only one of such racks affects control of the multiplication mechanism at a time. For this purpose multiplier denomination control means are provided to successively set a multiplier or contact control carriage generally indicated at 5 (Fig. 2) to positions corresponding to the settings of the different racks, the carriage being first set to correspond to the setting of the lowermost order rack containing a significant digit. After multiplication by the multiplier or second factor digit thus represented by the multiplier carriage, the latter is set to correspond to the setting of the next higher order rack containing a significant digit.

The conjoint positioning of the various multiplicand racks 40 and the multiplier carriage 5 conditions certain of a plurality of ordinally arranged groups of circuits arranged in accordance with the partial products of the multiplication tables. The latter circuits control actuation of a partial product accumulator generally indicated at 6 (Fig. 3) by declutching the drive therefor when the latter registers the various partial products of the different multiplicand digits when multiplied by the multiplier digit determined by the current position of the multiplier carriage.

A denomination distributing device in the form of a circuit shifting switch is controlled by the above mentioned multiplier denomination determining mechanism for determining the particular orders of the partial product accumulator 6 into which the separate partial products of the multiplication are to be entered.

In order to total a product out of the partial product accumulator 6, i. e. to clear the latter and print the product, the "product" bar 24 is depressed causing the racks and an entrained gearing to transfer the product from the accumulator to the printing mechanism. If desired this latter operation may be performed automatically by previously depressing and latching down the "automatic product" key 32 which causes the machine to automatically total and print a product as an incident to a multiplication operation.

The first factors (multiplicand) or the second factors (multiplier) of a series of multiplications may, if desired, be automatically entered into the factor storage accumulator 38 (Fig. 2) by selectively setting a selection control knob 38a (Figs. 1 and 37) in position beside either the 1st factor bar 13 or the 2nd factor bar 14. If desired, the first factor or multiplicand of a multiplication may be retained as a constant first factor for any of a series of multiplications by entering such first factor as described above and thereafter depressing and latching down the "constant 1st factor" key 31.

Whenever it is desired to remove the constant first factor the "clear first factor" bar 30 is depressed which in itself causes a motor operation to return the various multiplicand racks 40 (Fig. 2) to their uppermost home positions.

At times, for example in chain multiplication, it is desired to utilize a product registered in the partial product accumulator 6 (Fig. 3) or an amount registered in any of the other accumulators as a factor for a succeeding multiplication. For this purpose, the "reset as factor" key 19 may be employed to obviate the necessity of setting up such value in the keyboard. For such proceedings, the key 19 is depressed and latched down thus, conditioning the drive racks 35 (Fig. 2) to be coupled to and drive the multiplicand racks 40. Thereafter, the accumulator registering the amount which it is desired to reset as a first factor is totaled out in the manner described before and during such transfer the multiplicand racks 40 are set to represent that amount.

Amounts may be sub-totaled out of all accumulators except the partial product accumulator 6 and for this purpose the sub-total key 16 (common to the main and storage accumulators) is depressed and latched down. Thereafter, the total bar for the particular accumulator, out of which it is desired to sub-total an amount is depressed.

Non-add operations are performed by first depressing and latching down the non-add key 17 and thereafter operating the machine in the normal manner.

The machine is driven by two separate power units operable by a single motor. One power unit comprises a cyclically operable main clutch 7 (Fig. 29) which is operatively connected to a main drive shaft 8 for the purpose of operating the main units of the machine during addition, subtraction and totaling operations as well as during the first and last phases of a multiplication operation. The second power unit comprises a cyclically operable multiplier clutch 9 (Fig. 29) which drives a multiplier drive shaft 10 to operate the multiplier portion of the machine during multiplication operations. Operation of this second clutch is initiated by the main clutch only under control of the second factor bar 14 as an incident to a multiplication operation as will be described in detail hereinafter.

2. Keyboard

The keyboard is of the flexible type and each amount key 11, when depressed, serves as a stop to differentially limit the movement of an aligned drive rack 35 to an amount depending upon the value of the key. Each key comprises a keytop 41 of plastic or similar material and a key stem 41a guided in aligned slots formed in a keyboard frame comprising a bottom frame 42 and a top plate 42a secured to the side walls of the bottom frame.

Figure 2:
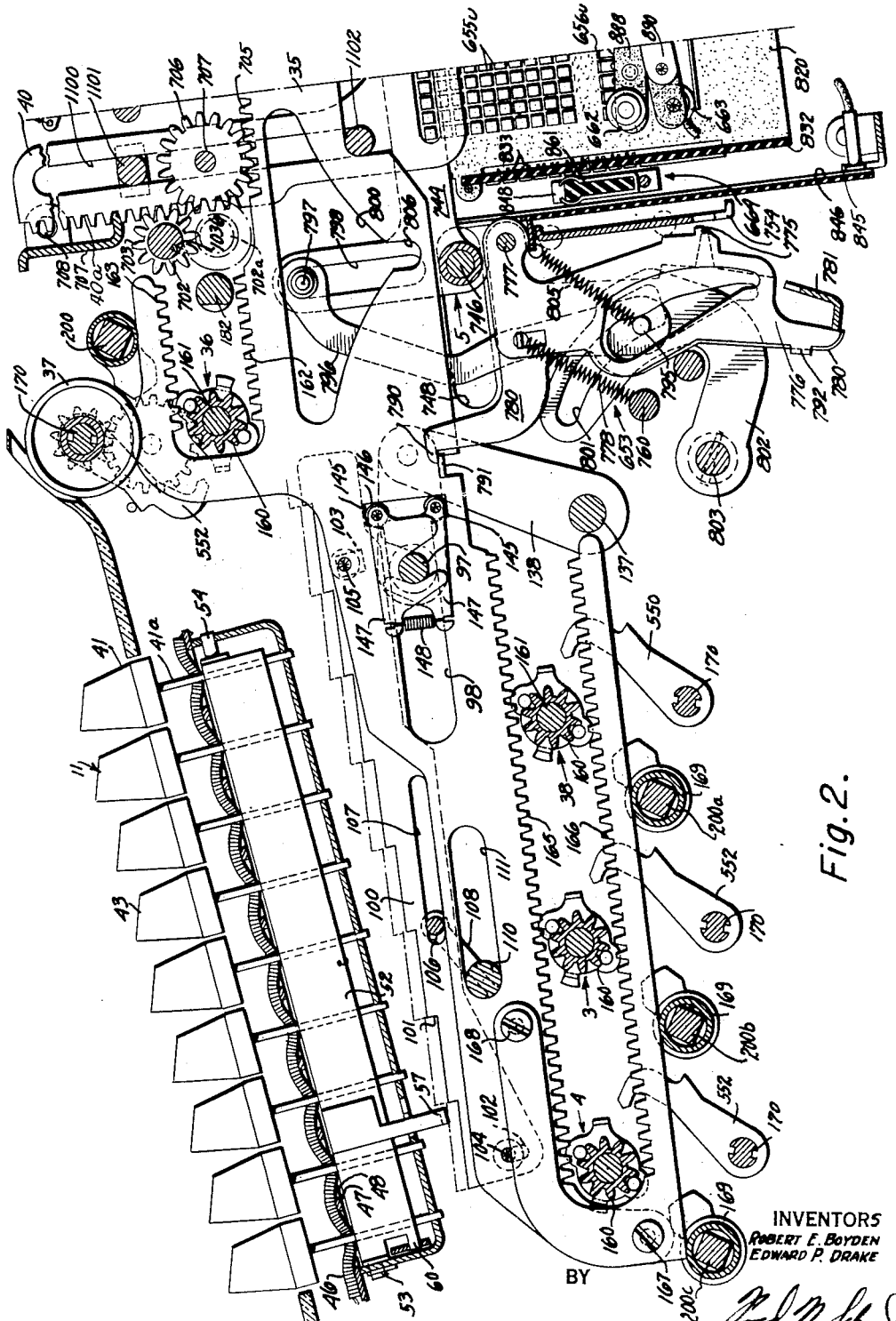

As shown in Figs. 1, 2 and 4, each amount keytop 41 has a pyramidal shape, and the rectangular bases of the various keytops are so proportioned that each base lies closely adjacent the base of a neighboring key. The sides of each key converge upwardly from the base to a sloping top surface 43 having considerably smaller area than the base. This reduction in the area of the top surface reduces the tendency of an operator's finger to span two adjacent keys if his finger were not correctly positioned over the desired key.

The key stem of each amount key has a pair of spaced shoulders 44 which limit the stroke of the key, while a retainer strip 45 extending along each bank of key stems and suitably secured to the bottom of the frame 42 retains the keys in each row within their slots.

The keys in each bank are yieldably pressed upward by a tension spring 46 extending along the length of the keyboard and suitably attached at opposite ends to the keyboard top plate 42a. Said spring rests upon cross ribs 47 formed across slots 48 in the plate 42a and extends within open slots 49 in each of the key stems. Upon depression of a key the adjacent portions of the spring are stretched and extend downward through the slots 48.

Means are provided for latching the keys 11 in their depressed positions and for releasing any previously latched key upon depression of another key in the same row or bank. Each key stem has a cam lobe 51 formed thereon which, when the key is pressed downward, rocks a locking bail 52 outward. Each bail is pivoted on each end thereof to the front and rear walls of the key frame 42 by trunnion bearings 53 and 54. A spring 55 presses the bail against the series of key stems in any one bank, and when the key is depressed, the cam lobe 51 thereon cams the bail outwardly to release any previously depressed key in the same bank. At the bottom of the key stroke the cam lobe 51 passes below the bail, enabling the latter to retract partially to a position where it latches the key depressed.

A zero stop is provided for preventing any appreciable driving movement of the rack 35 in any order when no keys in that order are depressed. These stops, indicated at 57, are integrally attached to the locking bails 52, and when no key 11 in any one bank is depressed, the bail 52 for that bank will be spring held in an extreme clockwise rocked position as illustrated in the four lefthand banks in Fig. 4 in which the bottom extremity of each zero stop lies directly in front of one of the steps of a member 100 forming part of the associated rack 35. However, when any amount key is depressed and latched down, the locking bail will be held outwardly sufficiently to retain the associated zero stop out of the path of the aligned member 100 as illustrated in the right hand bank in Fig. 4.

3. Keyboard release

Means are provided for simultaneously releasing all of the keys of the keyboard either under manual control in order to selectively clear an erroneous setup or under automatic control during a machine operation so as to clear the keyboard for a set-up for a new problem. Arranged across the various locking bails 52 adjacent the front of the machine is a notched release bar 58 (Figs. 4, 5 and 6). The notches in the bar 58 embrace extensions 60 (Fig. 2) formed on the forward ends of the locking bails. The bar 58 is movable laterally of the machine, being guided on each end by a stud, one of which is illustrated at 61, fixed thereto and movable in horizontally extending slots, one of which is shown at 62 (Fig. 6) formed in the keyboard frame 42. Thus, movement of the bar 58 to the right on Fig. 4 will rock all of the locking bails 52 counterclockwise to release any keys which have been previously held latched down.

A keyboard release key 34 is provided at the front of the keyboard to manually release the various keys which have been depressed. The stem of the release key has a vertically extending slot therein embracing a pin 65 fixed to the keyboard frame 42, while above the slot the key stem is pivotally connected to a bellcrank 64 pivoted on a stud 63 also extending outward from the front wall of the keyboard frame 42. A downwardly extending leg of the bellcrank carries a pin 67 extending into one of the notches on the key release bar 58 so that depression of the key release key will rock the bellcrank 64 against the action of a tension spring 68 extending between the pins 67 and 65 so as to force the bar 58 to the right to release all depressed value keys.

Referring in particular to Figs. 5, 6 and 7, means are provided for automatically releasing the keyboard during a machine operation while means are also provided to selectively prevent such automatic release. Pivotally connected to the hereinbefore mentioned pin 61 at the right of the bar 58 is a hook member 70 urged counterclockwise by a spring 71 extending between an ear on the hook and a stud 72 mounted on the front wall of the keyboard frame. The hook member 70 is normally held in a clockwise rocked position as illustrated in Fig. 6 by an operating lever 73 which overlies the hooked right hand end thereof. The lever 73 extends in a horizontal plane and is pivoted on a vertical pin 74. A roller 75 mounted on the lever 73 is fitted within a slot 76a in a reciprocating link 76, the operation of which will be described hereinafter. It is sufficient to note at present that the link 76 moves longitudinally rearward (to the right in Fig. 7) at the start of a machine operation an amount sufficient to rock the operating lever 73 counter-clockwise as seen in Fig. 5 to move an engaging shoulder 77 thereon to the left and past a hook or shoulder 78 formed on the hook member 70 so as to allow the latter to rock counter-clockwise under the action of its spring 71 to interlock the shoulders 77 and 78.

During a machine operation the link 76 is returned forward (to the left in Fig. 7) to its illustrated position and since the shoulders 77 and 78 are at this time interlocked, the operating lever 73 will force the hook member 70 and consequently the key release bar 58 toward the right of the machine so as to release all depressed value keys. As the hook member 70 moves rightward, a camming surface 80 thereon engages the stud 72, camming the hook clockwise until the shoulder 78 thereon becomes disengaged from the shoulder 77 of the lever 73. Therefore, the bar 58 will be free to return to its normal illustrated position under the pull applied by the various lock bail springs 55.

A repeat key 33 is provided in order to selectively prevent automatic release of the keyboard in the event it is desired to perform repeat operations. The stem of the key 33 is guided adjacent its upper end in a slot formed in the key top plate 42a and is provided with a vertically extending slot embracing a stud 81 fixed to the keyboard frame 42. A spring 79 tensioned between the stud 81 and an ear on the bottom of the repeat key stem normally retains the key in its upper illustrated position wherein it is ineffective to prevent automatic release of the keyboard.

An ear 82 extending from the stem of key 33 overlies the right hand end of hook member 70 so that depression of the key 33 will rock the hook member 70 clockwise to maintain the hook 78 thereon below the plane of the operating lever 73. Thus, during reciprocation of the link 76 as an incident to machine operation the key release bar 58 will remain unaffected.

4. Racks and rack drive

Figure 3:
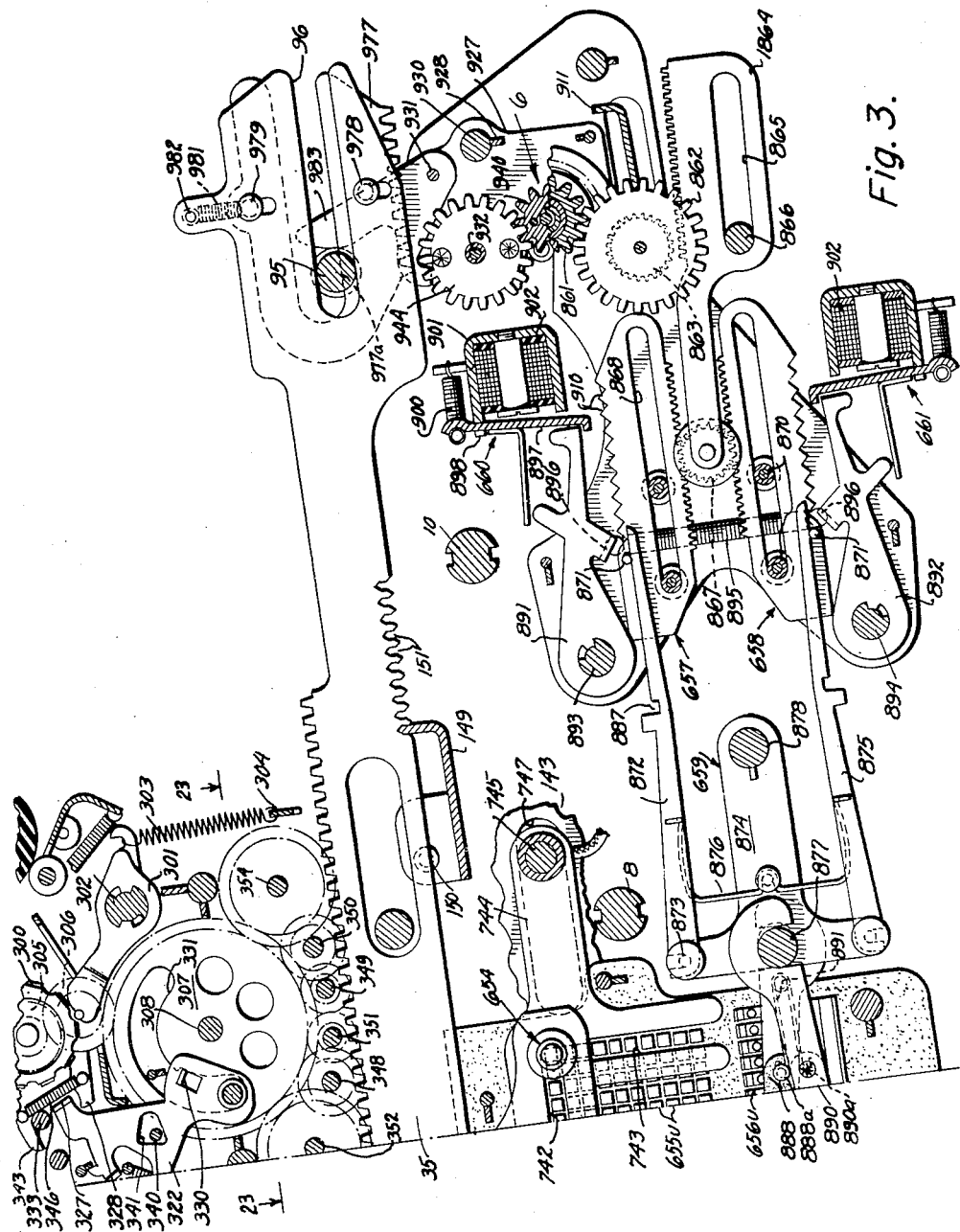

Referring to Figs. 2 and 3 in particular, each of the various ordinally arranged drive racks 35 is supported for fore and aft movement at the rear by a cross shaft 95 embraced by an open slot 96 formed in the rack. At its forward end, each rack is supported by a rack drive shaft 97 suitably guided for fore and aft movement in the machine frames (as will be described in detail later on) and movable along a longitudinally extending slot 98 formed in the rack.

For the purpose of differentially controlling the extent of travel of the racks 35, there is provided in operative relationship to each rack, a stepped rack stop bar 100 formed with equally spaced shoulders 101. The spacings of the shoulders are slightly larger than the spacings of the stems of the amount keys 11 (measured longitudinally of the racks) so that the bar 100, when advanced toward the front of the machine by its respective rack in a manner to be described presently, will strike the lower end of a depressed key after the rack has moved a number of increments equal to the value of the depressed key.

Each rack stop bar 100 may be moved vertically relative to its drive rack 35 into and out of cooperative relationship with the lower ends of depressed ones of the value key stems. For this purpose, each bar 100 is provided with slots 102 and 103 guided over pins 104 and 105, respectively, extending from the associated rack 35.

A cross rod 106 extends through slots 107 formed in the various bars 100 and is carried by a plurality of arms 108 secured to a rockable shaft 110 which is rotatably mounted in a suitable manner not shown in the side frames of the machine. The shaft 110 extends through elongated slots 111 formed in the main racks 35.

Means are provided under control of the main drive shaft 8 (Figs. 18 and 40) for raising and lowering the rack stop bars 100 in timed relation with the operation of the machine. The timing of this movement is such that the bars 100 are lowered out of cooperative relationship with the keys when the machine is at rest but are raised at the start of a main cycle and lowered toward the end of such main cycle in addition, subtraction and first factor entering operations. However, during multiplication operations the bars 100 are raised at the start of a main cycle and lowered at the end of the first phase (180°) of the main cycle so as to enable a new factor to be set up in the keyboard while a current multiplication operation is being performed by the machine.

Figure 11:
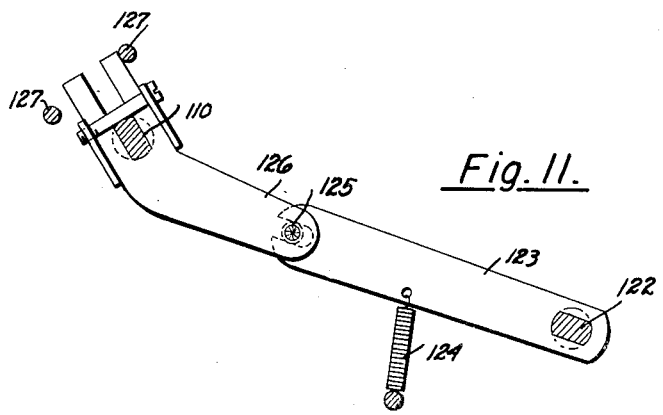
Fig. 11 is a detailed view illustrating part of the linkage for controlling the rack stop bars.
Figure 40:
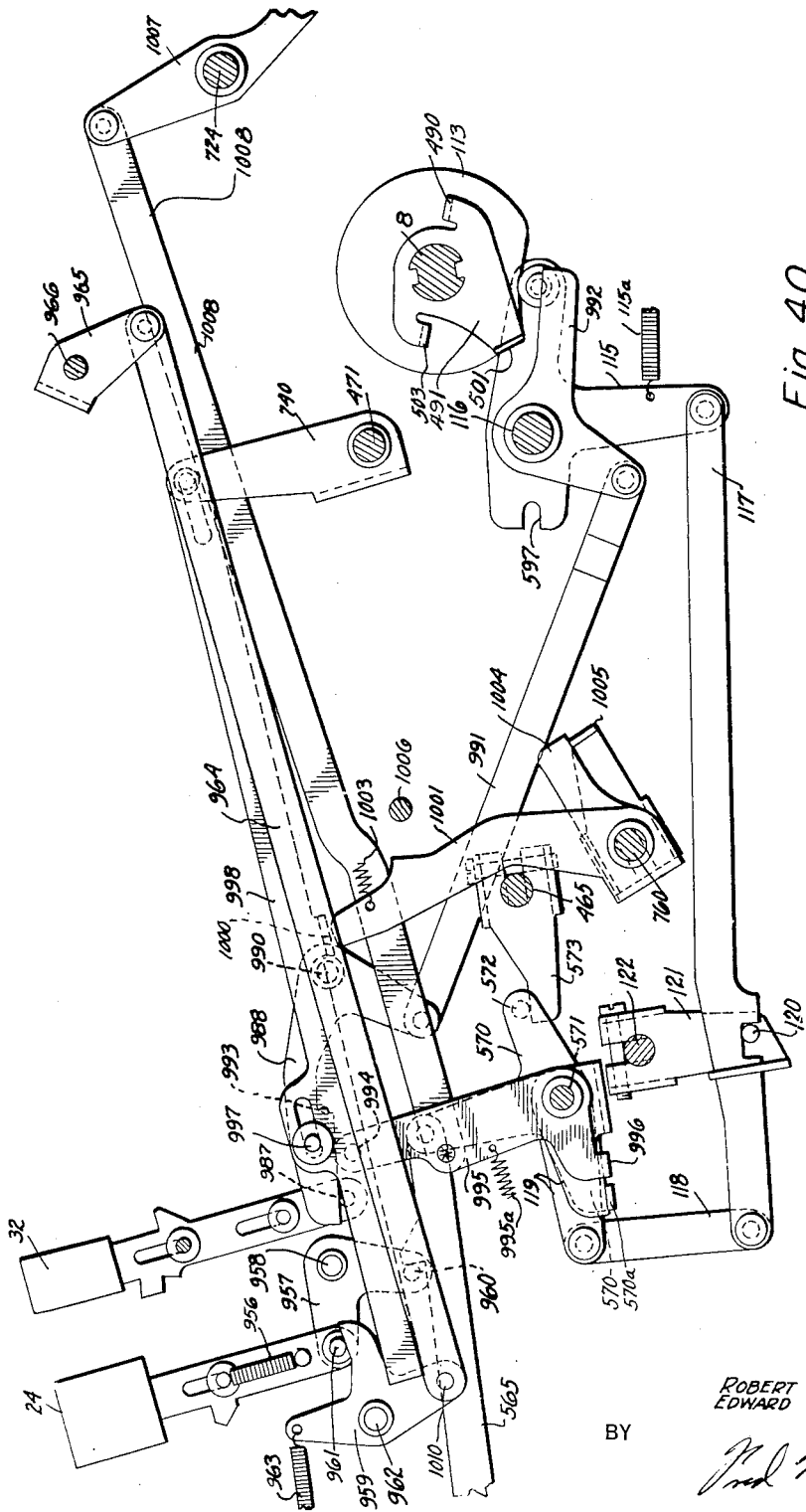
Fig. 40 is a side elevation of the controls for effecting an "automatic product" operation.

Referring to Figs. 18 and 40, a cam 113, keyed to the main drive shaft 8, is engaged by a roller 114 mounted on a cam follower 115 which is pivoted on a cross shaft 116. The cam follower is pivotally connected to one end of a link 117 the other end of which is supported by a link 118. The link 117 has a notch therein normally embracing a pin 120 carried by an arm 121 which is fastened to a rockable cross shaft 122. As shown in Fig. 11, the shaft 122 is fastened to an arm 123 normally urged in a counterclockwise direction by a spring 124. The arm 123 is connected by a pin and slot connection 125 to an arm 126 secured to the shaft 110 (see also Fig. 2) which supports the rack stop bar control rod 106. The upper portion of the arm 126 extending above the shaft 110 moves between a pair of stationary limit pins 127 which, through the arm 126 and shaft 110 limit the vertical positioning of the various stop bars 100.

Means are provided for yieldably transmitting a drive from the main shaft 8 to the various drive racks 35 so as to drive the same forward until arrested by depressed value keys and thereafter to return the racks to their illustrated home positions representative of zero registration. Referring to Fig. 8, a pair of complementary rack drive cams 130 and 131 are keyed to the shaft 8 adjacent the left hand end thereof (see also Fig. 66). These cams are engaged by rollers 132 and 133, respectively, mounted on a four armed cam follower 134 pivoted on the above mentioned pivot shaft 116. A link 135 is pivotally connected between the follower 134 and an arm 136 fastened to a rockable cross shaft 137 which is rotatably mounted in the machine side frames 143 (Fig. 66) in a suitable manner not shown. Also, secured to the shaft 137 are plurality of spaced arms one of which is shown at 138 each connected to a link 140 which in turn is pivoted to the above mentioned rack drive shaft 97. A roller 141 is mounted on each end of the drive shaft 97 and is guided along a longitudinally extended slot 142 in an associated side frame 143. The provision of spaced arms 138 and links 140 on opposite sides of the machine insure parallel movement of the rack drive shaft 97 as it moves fore and aft.

Referring to Fig. 2, the elongated slot 98 in each drive rack 35 terminates at its rear end in opposed laterally disposed notches 145. Each of these notches is normally engaged by a roller 146 mounted on a carrier or drive element 147 which is rockably fitted within a groove formed in the shaft 97. The two drive elements 147 associated with any one rack 35 are located in juxtaposition with each other and are spring urged in opposite directions about shaft 97 by a tension spring 148 connected between the tails of the two elements. This assembly, by yieldably forcing the rollers 146 outward in the notches 145 forms a yieldable connection between the drive shaft 97 and each of the different drive racks 35.

During the forward movement of the drive shaft 97, each drive rack 35 when stopped due either to striking a keystem of a depressed value key 11 or an associated zero stop 57, will cause the rollers 146 to ride out of the notches 145 against the action of the spring 148, thus breaking the connection between the shaft 97 and the rack. The shaft 97 will continue the full extent of its travel and thereafter will return. During this return the contracted elements 147 and their rollers 146 will move along the slot 98 in the associated rack until the rollers 146 snap into the notches 145 whereupon the connection between the drive shaft and the rack will be reconstituted.

The various drive racks 35 are normally locked in their rearmost home positions illustrated in Figs. 2 and 3. The racks are also locked in any of their other nine positions, representative of the values of one to nine, after having been advanced thereto during the machine operation. For this purpose, a rack lock bail 149 (Figs. 3 and 61) is provided, extending across the entire series of racks 35 and supported on the machine side frames at opposite ends thereof by a pair of trunnion pins, one of which is shown at 150. The bail 149 is adapted to engage any of ten notches 151 formed in each of the racks 35, depending upon the longitudinal adjustment thereof.

A depending leg 152 of the bail carries a cam follower roller 153 which rides on the surface of a rack lock control cam 154 which is securely keyed to the main shaft 8 whereby the bail 149 may be raised and lowered against the action of a spring 155 into and out of locking relation with the racks.

5. *Main and storage accumulators*

As mentioned hereinbefore, the machine includes a main accumulator generally indicated at 36 (Fig. 2) and three storage accumulators generally indicated at 3, 4 and 38. These accumulators are all of similar construction; however, the main accumulator is operatively connected to the dials 37 whereby the amount registered in this accumulator is visibly indicated. These accumulators are all of the two direction subsequent transfer type capable of receiving additions and subtractions.

Figure 12:
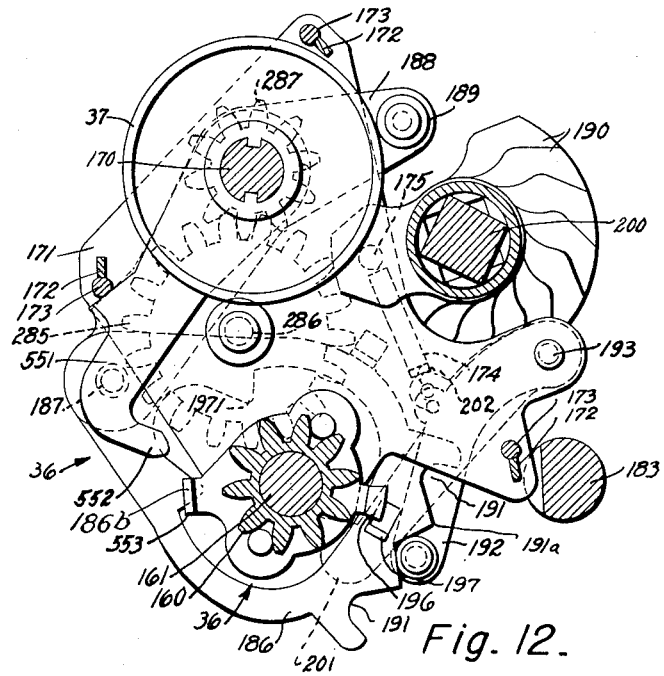
Fig. 12 is a transverse sectional view through the main accumulator and is taken substantially along the line 12—12 of Fig. 13.
Figure 13:
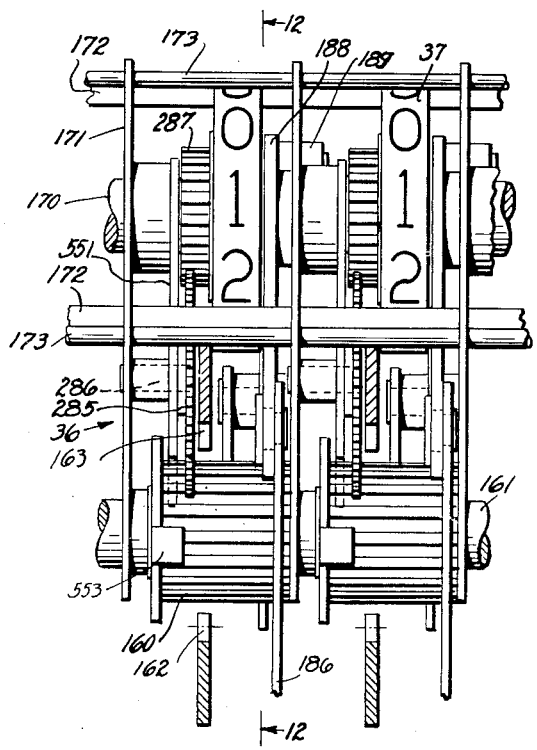
Fig. 13 is a front view illustrating two adjacent orders of the main accumulator.

Describing now the construction of the main accumulator 36, reference is had to Figs. 2, 12, and 13 in particular wherein it will be noted that the accumulator comprises a plurality of ordinally arranged accumulator gears 160 rotatably mounted on a shaft 161 which may be raised or lowered along with the rest of the accumulator to selectively mesh the gears 160 with either upper rack gear sections 163 of the racks 35 or lower rack gear sections 162 in accordance with the type of problem to be performed.

During an operation in which amounts are to be additively entered into the accumulator, the latter is lowered to mesh the gears 160 with the lower rack sections 162 whereby the gears will be rotated in a clockwise direction during the subsequent forward movements of the various racks 35, while, during an operation in which amounts are to be subtracted from the accumulator, the latter is raised to mesh the gears 160 with the sections 163 so that the subsequent forward movement of the racks will drive the gears in a counter-clockwise direction.

The main accumulator comprises in general the hereinbefore mentioned accumulator shaft 161 and a second shaft 170, both rotatably mounted in bearings formed in a series of ordinally spaced brace plates 171 rigidly held in spaced relation to each other by suitable interlocking combs 172 well known in the art. A rod 173 is passed through the various plates 171 adjacent each comb to hold the latter in locking position.

The shafts 161 and 170 are guided for vertical movement in vertically extending slots 174 and 174a, respectively (Fig. 17), formed in accumulator side plates 175 located at opposite ends of the accumulator. The latter plates are secured by clamp screws 176 to the machine side frames 143. For the purpose of adjusting the accumulator relative to the machine the threaded portion of each of the clamp screws 176 extends through an enlarged aperture in the accumulator side plate whereby the accumulator may be clamped in different adjusted positions.

For the purpose of raising or lowering the accumulator unit in accordance with the type of problem being performed, there is provided at opposite ends of the accumulator a box cam 177. Each cam is pivoted on a stationary frame stud 178 mounted on the associated accumulator side plate and has a cam groove 178a therein embracing a roller 179 rotatably mounted on the corresponding end of the shaft 161.

Clockwise rocking movement of the cam in a manner described in detail hereinafter and beyond its central illustrated position, will lower the accumulator into its additive position while counter-clockwise rocking of the cam will raise the accumulator into its subtractive position. In order to insure parallel movement of the box cams on opposite sides of the accumulator, a shaft 182 is rockably mounted in the accumulator side plates 175 and has fastened on opposite ends thereof arms, one of which is shown at 183. Rollers 184 mounted on the arms 183 move in elongated slots 185 in the box cams and insure like movement between the cams and parallel motion of the accumulator.

The above noted meshing operation is performed in addition and subtraction operations in advance of the forward strokes of the racks 35 so that, as each of the racks is driven forward the associated gear 160 is rotated a number of increments determined by the extent of travel of the rack. Since there are ten teeth in each gear 160, each tooth advance of the gear will represent one digit entered into the particular order of the accumulator in which said gear is located. At the end of the forward travel of the racks in addition, subtraction, totaling and entry of factors, the gears 160 will be demeshed from the racks 35 and located in their neutral positions illustrated in Fig. 2 to permit the return of the racks without affecting the accumulator.

As each gear 160 moves through one revolution or ten spaces as a result of accumulating ten digits it conditions a transfer mechanism to subsequently enter one digit into the gear 160 of the next arithmetically higher order. For this purpose, a transfer pawl 186 is provided, being capable of rotating its associated gear an increment of one tooth space in either direction.

Each pawl 186 surrounds its associated gear 160 and is pivoted to one side of the gear at 187 to a cam follower lever 188 rotatably supported on the shaft 170. The lever 188 is provided with a roller 189 adapted to be engaged and moved by an aligned one of a series of transfer cams 190 to be described presently.

The pawl 186 is provided with three detents 191, the central one of which is normally engaged by the roller of a centralizing lever 192 pivoted on a stud 193 which is mounted on the associated brace plate 171. The lever 192 is pressed against the pawl by a spring 174 tensioned between the centralizer lever and a stud 175, also mounted on the brace plate 171.

In addition to holding the pawl 191 in any of three positions, the centralizer lever 192 also normally maintains the pawl in a rearward position as illustrated in Fig. 12 wherein the lever 188 rests against the adjacent comb retaining rod 173, and is capable of returning the pawl to that position after the associated cam 190 has rocked the lever 188 counter-clockwise.

Each gear 160, as it rotates in an additive or clockwise direction from its nine position to its illustrated zero position illustrated in Fig. 12, carries a tooth 196 integrally attached thereto into engagement with an ear 197 formed on the pawl 186 associated with the next higher order gear 160. The tooth 196 thus rocks the next higher order pawl 186 downwardly about its pivotal support 187. Substantially halfway through the downward movement of the pawl, the centralizer lever 192 moves over the tip 191a located on the pawl between the upper and central detents 191. The spring 174 therefore becomes effective to cam the pawl fully into its detented position wherein the ear 197 will be moved out of the path of the tooth 196. Upon movement of the pawl 186 into its described transfer position a transfer tooth 197 thereon is located directly behind a tooth of the gear 160 so that in a subsequent transfer phase of the operation, at which time the cam follower levers 188 are sequentially rocked by the cams 190 to advance the pawl 186, the tooth 197' will engage and drive the gear 160 one tooth space in a clockwise or additive direction thereby entering into this next higher order the tens component of the value entered into the lower order.

Likewise, during a subtractive operation and when an accumulator gear 160 rotates counter-clockwise from a zero position to a nine position the tooth 196 thereof will strike the ear 197 of the transfer pawl 186 associated with the next higher order gear 160, moving the latter into an upper position in which the centralizer lever 192 will engage the lower detent 191. Since the transfer pawl 186 is symmetrical, exactly the same action will occur as in the additive transfer operation except that the gear 160 will subsequently be rotated one tooth space in a counter-clockwise or subtractive direction by means of a transfer tooth 186b on the pawl 186.

It will be noted that during additive, subtractive, factor entry, and totaling operations the accumulator gears 160 will be disengaged from the main racks 35 and returned to their neutral positions illustrated in Fig. 2 prior to the transfer phase which occurs late in the machine cycle, as indicated in the timing diagram of Fig. 74. Therefore, at the end of the digitizing phase of a cycle, the pawls 186 in all of the orders which are to receive a tens transfer will be located in an upper or lower position depending on the type of operation, and the gears 160 will be completely demeshed from the racks.

Means are provided for effecting a tens transfer in the various orders of the accumulator beginning at the next to the lowermost order and progressing to the highermost order. For this purpose, a transfer shaft 200, rotatably mounted on the accumulator side plates 175, has fixedly mounted thereon the various transfer cams 190. It will be noted that the cams 190 are all arranged in a helical row about the shaft 200 so as to sequentially operate the various transfer levers 188 during rotation of the shaft 200.

A yieldable centralizer pawl 201 is also mounted on the pivot stud 193 and is pressed into engagement between adjacent teeth of the gears 160 by a spring 202 tensioned between the pawl and the aforementioned stud 175.

The above described construction of the accumulator is disclosed in detail and claimed in the copending application of E. P. Drake, Serial No. 582,554, filed March 13, 1945, and since matured into Patent No. 2,472,696, issued June 7, 1949. Each of the gears 161 is connected to a respective one of the dials 37 through an idler 285 pivoted at 286 to the associated brace plate 171. The idler 285 meshes with a gear 287 fixed to the aligned dial 37, the gear 287 being a ten toothed gear so as to be driven in direct ratio to the shaft 160.

The storage accumulators 3, 4 and 38 (Fig. 2) are similar in construction to the main accumulator with the exception of the visible dials. That is, each of these various accumulators is provided with ordinally arranged accumulator gears 160 adapted to be raised or lowered along with the rest of the accumulator to selectively mesh the gears with either an upper rack gear section 165 or a lower rack gear section 166 in the same manner as does the main accumulator. The rack section 165 is formed on the main rack and extends into cooperative relation with the gears of the three storage accumulators. The lower rack gear section 166 extends into cooperative relation with the gears of the three accumulators and is removably secured to the main section of the rack by screws 167 and 168. For the purpose of laterally aligning each lower rack section 166 during fore and aft movement of the rack 35, the latter is located within grooved sections of sleeves 169 fitted over the transfer shafts 200a, 200b and 200c for the three accumulators. Means are provided for simultaneously rotating the various transfer shafts 200, 200a, 200b, and 200c of the accumulators 36, 38, 3 and 4, respectively, during the latter part of the machine cycle and after the digitizing phase thereof has been completed. As illustrated in Figs. 14 and 16, a Geneva gear arrangement comprising a mutilated gear 210 and a disc 211 are keyed in juxtaposition with each other on the main shaft 8. The disc 211 has a depression 212 formed in the edge thereof in alignment with the toothed section of the gear 210. The gear 210 is adapted to mesh with a pinion 213 rotatably mounted on a frame stud 214 and extending across both the gear 210 and the disc 211.

The portion of the pinion 213 in alignment with the gear 210 is fully toothed, while the portion thereof which is in alignment with the disc 211 has a pair of adjacent teeth cut away to form a concave surface 215 through which the outer periphery of the disc 211 may pass. The disc thus normally rides along the opposed faces of the teeth of the pinion 213 on either side of the cutout portion 215, whereby to prevent rotation of the pinion whenever the teeth of the gear 210 are out of mesh with the teeth of the pinion as illustrated in Fig. 14.

During approximately two-thirds of a revolution of the main shaft 8 in the direction the arrow A, the disc 211 will merely ride against the bearing surface provided by the cut away portion of pinion 213 until the teeth of gear 210 begin to mesh with the fully toothed portion of the pinion at which time the depression 212 in the disc 211 will be opposite the pinion teeth, permitting a full rotation of the latter.

The pinion 213 is arranged to drive the transfer shaft 200 of the main accumulator 36 through an idler 216 journaled on a frame stud 217 and meshing with a pinion 218 fixed to the shaft 200. The arrangement of the gearing between the main shaft 8 and the transfer shaft 200 is such that during the transfer phase of an operation the shaft 200 will be rotated one complete revolution and will then come to rest in its normal position shown in Figs. 2 and 14.

The remaining transfer shafts 200a, 200b and 200c are likewise driven by the above mentioned Geneva gear mechanism through a train of gears comprising idler 220 rotatably mounted on a frame stud 221 and meshing with the idler 216 and with a small idler 222. The latter is rotatably mounted on frame stud 223 and meshes with pinion 224 fixed on the transfer shaft 200a of the storage accumulator 38. The pinion 224 transmits rotation to the transfer shaft 200b of the storage accumulator 3 through an idler 226 rotatably mounted on frame stud 225, the latter idler meshing with a gear 227 fixed to the shaft 200b. The gear 227 transmits rotation to the transfer shaft 200c of the storage accumulator 4 through an idler gear 228 rotatably supported on a frame stud 230 and meshing with a gear 231 fixed to the transfer shaft 200c.

It will be noted that the gears 218, 224, 227 and 231, fixed to the transfer shafts 200, 200a, 200b, 200c, respectively, are all of the same size whereby to transmit an equal rotation of one revolution to each of the transfer shafts during the transfer phase of a main cycle.

The storage accumulators 38, 3 and 4 are supported in the machine between the machine frames 143 in a manner similar to that of the main accumulator by accumulator side plates 230 (Fig. 17), the latter being adjustably secured to the machine frames by clamp screws 231 in a manner similar to that of the accumulator side plates 175. However, the storage accumulators are each supported in a position rotated 180 degrees relative to that of the main accumulators so that the gear support shaft 161 of each accumulator is located above the corresponding shaft 170.

As in the case of the main accumulator, the storage accumulators are adapted to be raised and lowered along guide slots 237 and 238 in their accumulator side plates by box 232, 233 and 234, each having a cam slot 235 embracing a roller 179 on the gear shaft 161 thereof. Each cam is pivoted on a stud 239 extending from the respective accumulator support plate 230.

As in the case of the main accumulator, each of the storage accumulator cams 232 to 234, inclusive, has a duplicate cam on the opposite side of the respective accumulator (not shown) and aligned therewith. A shaft 182a rotatably mounted in the accumulator side plates 230 has fixed at opposite ends thereof arms 183a carrying rollers 184a which are located in slots 185a formed in the box cams whereby to insure like movement of the two cams for each accumulator and consequent parallel movement of the accumulator.

6. *Accumulator controls*

The machine of the present invention is intended to provide considerable flexibility of control, particularly in the selection of the accumulators for entering various values. In some operations, as will be described in detail later on, certain accumulators are automatically selected to receive the results of computations, but these selections may be superseded by depressing certain accumulator control keys individual to the different accumulators.

The present description will be directed to the means for effecting the selection of the accumulators while the means for determining the selection will be taken up hereinafter at the different points of the specification which pertain to different types of controls for the machine.

Figure 17:
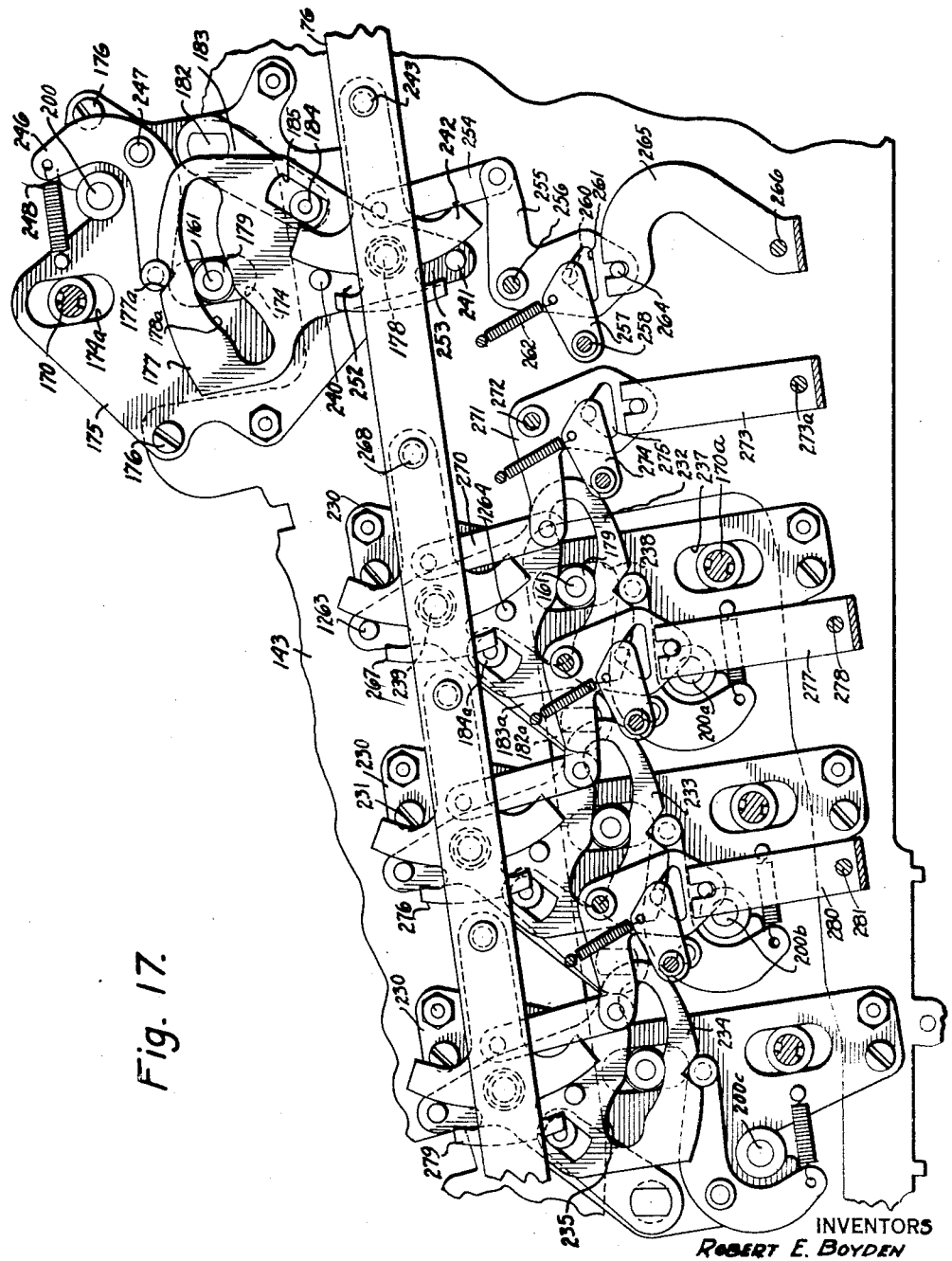
Fig. 17 is a side elevation illustrating part of the accumulator controls.

Referring to Fig. 17, the main accumulator control cam 177 is normally maintained in its centralized position illustrated by a centralizer lever 246 having a roller thereon which normally fits into a notch 177a on the periphery of an arcuate surface formed on the upper edge of the cam. The centralizer is pivoted at 247 and is urged counterclockwise by the spring 248. Two pins 240 and 241 are mounted on the cam 177 and are equally spaced on opposite sides of the pivot stud 178 of the cam. Located intermediate the pins 240 and 241 is a double hook 242 pivoted at 243 to the bar 76 which, it will be recalled in reference to Fig. 7, operates to automatically release the keyboard during a machine operation. The link 76 extends rearward as illustrated in Fig. 18 and is pivotally connected to a cam follower arm in the form of a bail 245 pivoted on the stationary shaft 116 (see also Fig. 19). The latter arm is provided with a roller 250 which normally rides on the surface of a cam 251 keyed on the main shaft 8. The cam 251 is provided with a rise extending approximately halfway around the periphery thereof and thus operates to normally rock the cam follower 245 clockwise and consequently draw the link 76 into a rearward position throughout the first phase or approximately 180 degrees of the main cycle as indicated in the timing chart (Fig. 74). However, as explained hereinafter, during sub-total operations, the cam follower 245 is controlled by the aforementioned cam 113 in which case the link 76 is held rearward throughout the major portion of the cycle as also indicated in the timing chart.

The hook 242 is provided with opposed notches 252 and 253 capable of embracing the pins 240 and 241, respectively, and thus rock the cam 177 either clockwise or counter-lockwise during rearward movement of the link 76 depending on the vertical rocked position of the hook 242 during operation of the machine. The hook 242 is connected by a link 254 to a bellcrank 255 pivoted at 256 and normally held in its illustrated position by a centralizer 257 pivoted at 258 and provided with a pin 260 located within a triangular aperture in the bellcrank. The centralizer is pressed upwardly by a spring 262.

It will be seen from the above that rocking of the bellcrank 255 counter-clockwise of its illustrated position will cause the hook 242 to engage the pin 240 of the cam 177 so that during the insuing rearward movement of the link 76 the main accumulator will be lowered to additively enter therein any values transmitted thereto by the main racks. Conversely, clockwise rocking of the bellcrank 255 will cause the hook 242 to engage the lower pin 241 of the cam 177 and thereby later raise the accumulator into a subtractive position during the machine operation.

The bellcrank 255 is connected by pin slot connection 264 to one leg of a bail 265 pivotally mounted on a stationary rod 266. The manner in which the bail 265 is rocked to select the main accumulator will be described in one of the succeeding sections.

The control cam 232 of the rearmost storage accumulator is controlled through a linkage similar to that provided for the main accumulator and comprises a hook 267 pivoted at 268 to the link 76 and adapted to selectively engage either of two pins 1263 and 1264 mounted on the cam 232 on opposite sides of the pivot stud 239. The hook 239 is connected through a link 270, and a bellcrank 271 (pivoted at 272) to a bail 273 and normally held in a central position by a spring pressed centralizer 274 having a pin thereon located within triangular aperture 275 in the bellcrank. The bail 273 is pivotally mounted on a stationary rod 273a and the control thereof will also be described in a succeeding section.

The cams 233 and 234 for the two forward storage accumulators 3 and 4, respectively, are controlled in exactly the same manner as the rear storage accumulator and therefore a detailed description thereof is deemed unnecessary, suffice it to say that the hook 276 for the cam 233 of the central storage accumulator is operatively connected to a bail 277 pivotally supported on a stationary rod 278 while the hook 279 for the cam 234 of the forward storage accumulator is operatively connected to a bail 280 pivoted on a stationary rod 281. The control of the bails 277 and 280 will likewise be described in a succeeding section.

7. Printing mechanism

A printing mechanism is provided for printing on a paper tape a record of the factors and results of different calculations, such as addition, subtraction, and multiplication as well as totals obtained from each of the main and storage accumulators. The printing type is registered by the various main racks 35 while the printing impulse is transmitted by the main shaft 8 directly after the racks have been advanced through their forward strokes.

Referring to Figs. 3 and 20, the printing mechanism comprises a series of numeral printing dials 300 equal in number to one less than the total number of drive racks 35, there being no printing dial for the lowest order or "mills" rack. In the present machine there are thirteen racks as illustrated in Fig. 23 and twelve printing dials. Each dial 300 has thereon a series of equally spaced type ranging from zero to nine, and the dials are so connected to their associated racks that they will print a digit corresponding to the value of a numeral key depressed in the associated key bank or to the numerical position to which the associated rack is moved in its forward stroke during totaling or the like.

Each dial 300 is rotatably mounted on a separate lever 301 which is loosely keyed on a printer control shaft 302 and is spring urged clockwise by a tension spring 303 extended between a tail on the lever and across piece 304. Each dial has secured thereto a gear 305 permanently meshed with a gear 306 also rotatably mounted on the associated lever 301. When a lever 301 is held in its normal position as illustrated in Fig. 3 by the shaft 302, the gear 306 is meshed with an aligned one of a series of large idler gears 307 rotatably mounted on a stationary cross shaft 308. The latter idlers are continuously entrained with respective ones of the drive racks 35 as will be described presently.

Referring to Fig. 21, the printer control shaft 302 is securely keyed to a lever 310 urged clockwise by a tension spring 311 and provided with a roller 312 held against a cam follower assembly 313. The latter comprises two parts 314 and 315, both pivotally mounted on a pivot shaft 316 and secured together for relative angular adjustment by an eccentric screw 317. The latter has an eccentric portion 317a rotatably mounted in the part 314 while the eccentric portion 317b is fitted in a slot 315a in the part 315. Suitable means such as a lock nut (not shown) is provided to hold the screw fixed relative to the follower assembly.

A roller 318 on the lower end of the follower assembly 315 engages on the periphery of a cam 319 keyed to the drive shaft 8. The cam 319 is so constructed that at the start of the second phase of the main clutch, as indicated in the timing diagram in Fig. 74, and after the racks have digitized the accumulator and printer, the printer control shaft 302 is allowed to be rocked clockwise by the spring 311, permitting the individual springs 303 to rock the printer levers 301 and thus carry the printing dials 300 rearward into contact with a printing ribbon 320 and a paper tape 321 passed around a platen 322, whereby to print the number registered on the dials onto the paper at the printing line. Immediately thereafter the dials are retracted to their home positions. Fig. 20 illustrated the printing mechanism at the moment of printing contact of the printing dials.

Means are provided for preventing printing of zeros to the left of the highest significant digit being printed while enabling all zeros to the right thereof to be printed. For example, the machine will print the value "800.00" as "800.00" instead of "0000000800.00," it being understood that means (not shown) are provided for printing the decimal point between the dimes and the dollar order. For this purpose a latch 322 (Figs. 3, 20 and 24) is provided adjacent each lever 301 and is journaled on a stationary cross rod 323 extending through arcuate control slots 324 in the various idler gears 307 and suitably mounted in printer support frames 385. The latches 322 are urged clockwise by tension springs 325 extending between the latches and a stationary cross rod 326. The latches 322 are provided with ears 327, each adapted to normally overlie a foot 328 extending from the associated printing lever 301 as is illustrated in Fig. 3.

Each latch 322 normally presents its associated printing lever 301 from moving into printing contact upon rocking of the control shaft 302 unless, as will appear presently, a signficant digit has been registered in the associated printing dial or a significant digit has been registered in any printing dial to the left thereof. For this purpose, an ear 330 on each latch extends laterally into the slot 324 of its associated idler gear 307. The slot 324 includes a raised portion 331 so arranged that it will allow the latch 322 to latch the lever 301 by virtue of its ear 327 only when the printing dial, and consequently the idler gear 307, registers zero, a condition illustrated in Fig. 3. However, when a printing dial and its idler are registering any significant digit from one to nine, the raised portion 331 will be located below the ear 330, thus holding the latch out of latching position to permit the associated printing lever to move through its printing stroke.

Means are provided to hold all of the latches 322 outward in the position illustrated in Fig. 20 during movement of the racks 35 so that the idler gears 307 will be capable of positioning the raised portion 331 relative to the ears 330. This means is operable in conjunction with an idler gear locking bail 332 pivoted on a stationary shaft 333 and movable into and out of locking engagement with the teeth of the various idler gears. Referring to Fig. 61, a pin 334 is mounted on the bail 332 and extends through a notch formed in a lever 335 pivoted at 336 and connected to the bail by a spring 337 tensioned between an ear on the lever and the pin 334. The lever 335 is connected by pin and slot connection 338 with an arm extending forwardly from the hereinbefore mentioned rack lock bail 149 whereby the bail 332 moves in unison with the bail 149 to lock the various idler gears simultaneously with the locking of the various main racks 35. On reference to the timing chart in Fig. 74 it will be seen that the locking bails are moved out of locking engagement with their respective racks and idlers during the fore and aft travel of the racks but are moved into locking engagement therewith whenever the racks are at rest.

Extending between the legs of the bail 332 is a rod 340 (Figs. 3 and 20) which passes through triangular slots 341 in the various latches 322 whereby the bail 332, when rocked outward, retracts the various latches as illustrated in Fig. 20 to permit rotation of the idler gears 307 by the drive racks 35.

As will be noted in Fig. 24 in particular, each of the latches 322 is provided with an ear 343 overlying the corresponding ear on the latch immediately to the left thereof. Therefore, when any latch is retained in an outward position by the raised portion 331 of the slot in its associated idler gear 307, all of the latches 322 to the right thereof will likewise be held outward by virtue of the overlapping ears 343.

Means are provided for retaining each printing dial 300 in its registered position after the gear 306 entrained therewith is demeshed from its idler gear 307. For this purpose, a centralizer pawl 343 is pivoted at 344 on the associated printing lever 301 and has a tooth 345 adapted to engage between two adjacent teeth of the idler gear 305. A tension spring 346 extending between the pawl and the lever urges the pawl into engagement with the dial gear. However, when the printer levers are in their normal position illustrated in Fig. 3, a tail on each of the pawls engages the stationary bar 333, thus holding the pawls out of engagement with the gears 305. During a printing operation, and when the levers 301 are rocking clockwise, the pawls 343 recede from the rod 333, thus enabling the springs 346 to rock the latter into engagement with their respective gears 305.

Describing now the means for connecting the various idler gears 307 with their associated drive racks 35 in order to register the printing dials in accordance with the numerical positions to which the main racks 35 are advanced, a series of shafts 348 to 357, inclusive (Figs. 3 and 23), are journaled in bearings 358 carried by various supporting plates (not shown) in the machine. These various shafts carry pinion assemblies which are arranged to entrain the idlers 307 with their respective drive racks 35.

For example, the "cents" rack 35 (next to the right hand rack in Fig. 23) under control of the lowest order row of value keys is meshed with a pinion 360 fixed to the shaft 348 to which is also fixed pinion 361 which meshes with the cents order idler 307 entrained with the cents column numeral dial 300. Similarly, the rack in the "dimes" order is connected by pinion 362, shaft 349 and pinion 363 to the dimes order idler. The rack in the "dollar" order is connected by pinion 364 on a sleeve 365, rotatably mounted on shaft 350 and integral with pinion 366, to the dollar order idler. The "ten dollar" rack is connected by a pinion 367 (also rotatably mounted on the shaft 350) to the ten dollar order idler. The "hundred dollar" rack is connected by pinion 368, sleeve 369 and pinion 370 to the hundred dollar order idler. The "thousand dollar" rack is connected by pinion 371, shaft 351 and pinion 372 to the "thousand dollar order" idler. The "ten thousand dollar" rack is connected by pinion 373, shaft 352 and pinion 374 to the ten thousand dollar order idler. The "hundred thousand dollar" rack is connected by pinion 375, shaft 353 and pinion 376 to the hundred thousand dollar order idler. The "million dollar" rack is connected by pinion 377, shaft 354 and pinion 378 to the million dollar order idler. The "ten million dollar" is connected by pinion 379, shaft 355 and pinion 380 with the ten million dollar order idler. The "hundred million dollar" rack is connected by pinion 381, shaft 356 and pinion 382 with the hundred million dollar idler, and the "billion dollar" rack is connected by pinion 383, shaft 357 and pinion 384 with the billion dollar order idler.

8. *Paper feed*

The paper strip or tape 321 (Fig. 20) on which the various factors and results of computations are printed is fed at increments past the printing position or point by the rotatable platen 322, the latter being rotatably mounted in printer side plates, one of which is shown at 385. In order to insure intimate contact between the platen and the paper, a guide member 386 is provided having a pair of spaced prongs one of which is shown at 387 extending partially around the surface of the platen. The member 386 is pivoted at 388 to the printer support frames 385 and is urged clockwise toward the platen by a spring 389 so as to impress a roller 390 carried by the member 386 against the paper tape.

The paper 321 is carried in a roll 391 mounted on an arbor 392 which is supported by the printer side plates 385.

A stationary paper cut-off bar 393 extends across the paper tape and is suitably secured to the printer side plates 385 for the purpose of severing the paper strip 321 which is passed thereunder.

The platen 322 is normally rotated one increment after each printing operation. For this purpose, a ratchet 394 (Fig. 22) is attached to the platen and is fed by the ear 395a of a pawl 395 pivotably connected to an arm 396 fulcrumed at 397. A shoulder 398 on the arm 396 is engaged by an ear on a feed arm 399 keyed to the aforementioned printer control shaft 302.

The pawl 395 is urged upwardly by a spring 400 tensioned between the lower end of the pawl and a spacing control arm 401 pivotally supported at 402. The latter arm is urged clockwise by said spring to maintain a pin 403 thereon against a camming finger 404 formed on a selectively settable paper spacing control lever 405. The lever 401 has a guide pin 406 thereon which lies to the left (as viewed in Fig. 22) of the pawl 395 to prevent counter-clockwise movement thereof beyond its illustrated position while permitting the same to be moved vertically under control of the arm 396.

During a printing operation, the shaft 302, as described heretofore, is rocked clockwise of its illustrated position and then returned. During such clockwise movement the arm 399 allows spring 400 to raise the pawl 395 to its dotted line position illustrated at 395b while a spring 407 tensioned between the lower end of the pawl and a suitable portion of the frame (not shown) maintains the pawl against the guide pin 406. Now, as the shaft 302 is returned to its position illustrated in Fig. 22 to retract the various printing levers to their home positions, the arm 399 will force arm 396 clockwise, drawing the pawl 395 downwardly whereupon the ear 395a strikes a tooth of the ratchet 394 to index the latter, and consequently the platen 322, one tooth space. The platen is held in its various different positions by a centralizer lever 408 pivotally supported at 410 and provided with a pin 411 which is held in engagement with certain of the teeth of the ratchet 394 by the action of a spring 412.

The paper spacing control lever 405 forms a means of varying the angular adjustment of the platen during each increment of movement thereof whereby to vary the spacing of the printed lines on the paper tape 321. For this purpose the lever is pivotally supported at 413 and is limited in its angular movement by a stationary pin 415 adapted to be engaged by either of two spaced shoulders 416 on the lever. The lever is centralized in either of its two positions by an over-center spring 417 extending between the lever and a stationary frame pin 418. When the lever 405 is moved from either position to the other, the spring passes beyond the pivot 413 and thus holds the lever in its adjusted position.

When the lever 405 is moved clockwise from its illustrated position, the camming finger 404 will cam the lever 401 counter-clockwise, causing the pin 406 to recede from the pawl 395. Now, when the pawl 395 is raised it is allowed to rock counter-clockwise under the action of spring 407 until its ear 395a reaches the dotted line position 395c. Thereafter, as the pawl is moved downward, the ear thereof will engage a tooth nearer the top of the ratchet 394 than was previously the case and thus advance the ratchet and consequently the platen three teeth instead of one.

9. *Power drive*

Power for the various mechanisms of the machine is obtained through the aforementioned clutches, i. e. the main clutch 7 (Fig. 29) and the multiplier clutch 9 which are controlled by various ones of the control keys and by each other. The main and multiplier clutches are driven by a motor 420 suitably mounted in the frame of the machine and regulated in speed by any well known form of speed control mechanism (not shown). A worm 421 mounted on the motor shaft meshes with a worm gear 422 rotatably mounted on a cross shaft 423 and suitably fixed to a spur gear 424. The latter gear meshes with a main clutch driving gear 425 and a multiplier clutch driving gear 426.

10. *Clutch construction*

The main and multiplier clutches are both of the cyclic ratchet type, and are substantially the same in structure. However, the main clutch is arranged to be selectively arrested after a complete revolution or after one-half revolution as is necessitated in multiplication operations which will be apparent hereinafter.

Figure 25:
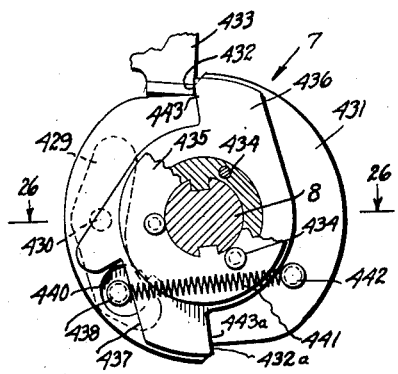
Fig. 25 is a side elevation, partly in section, of the main clutch.
Figure 26:
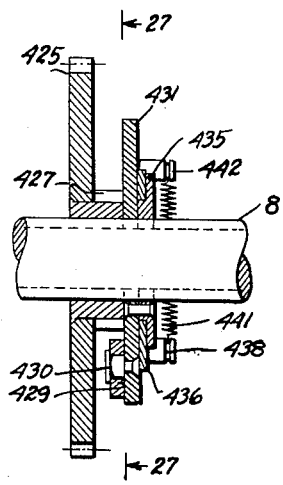
Fig. 26 is a transverse sectional view through the main clutch and is taken along the line 26—26 of Fig. 25.
Figure 27:
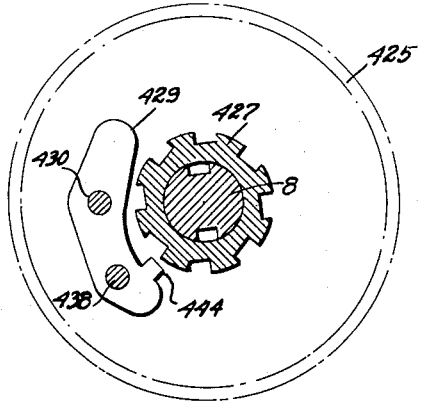
Fig. 27 is a side elevation through the driving portion of the main clutch and is taken along the line 27—27 of Fig. 26.

Describing now the main clutch construction, reference is had to Figs. 25, 26 and 27 wherein it will be seen that the driving side thereof comprises a ratchet 427 rotatably mounted on the main shaft 8 and secured to the drive gear 425 whereby the ratchet is driven in unison with the motor. The driven side of the clutch comprises a clutch dog 429 pivoted on a pin 430 mounted on a clutch disc 431. As shown in Fig. 25, the disc 431 has two diametrically opposed indentions on the periphery thereof, each forming a shoulder 432 adapted to be arrested by a clutch control lever 433 when the latter is allowed to move to its clutch disengaging position illustrated in Figs. 25 and 29.

The clutch disc 431 is keyed to the main drive shaft 8 and is fastened by means of rivets 434 to a flanged hub 435 on which is rotatably mounted a camming plate 436. Formed on the plate 436 is a camming surface 437 which underlies a stud 438 mounted on the clutch dog 429 and extending through an opening 440 on the clutch disc. The clutch dog 429 is urged toward driving engagement with the ratchet 427 by a spring 441 extending between the stud 438 and a pin 442 mounted on the clutch disc 431. However, when the clutch control lever 433 is in its illustrated clutch disengaging position a shoulder 443 on the camming plate 436 is held thereby in alignment with the shoulder 432 of the clutch disc, thus, causing the camming surface 437 to hold the clutch dog 429 out of engagement with the clutch dog 429 out of engagement with the ratchet as shown in Fig. 27.

Upon rocking the clutch control lever 423 counter-clockwise, the latter will release the camming plate 436, allowing the spring 441 to rotate the dog 429 inwardly, thus forcing its nose 444 into a dent into the ratchet, whereby to transmit rotation from the motor to the main shaft 8.

It will be noted that the diametrically opposed shoulder 432a on the disc 431 and the shoulder 443a on the camming plate 436 are identical with the shoulders 432 and 443 and thus coact with the clutch control lever 433 in the same manner as the latter shoulders.

During the rotation of the clutch, the clutch control lever 433 may be allowed to be spring pressed into contact with the periphery of the disc 431, upon which it will ride until the next indentation is reached, i. e. either the full cycle or half cycle position, at which time the lever will first strike the shoulder 443 or 443a of the camming disc 436, arresting rotation thereof. As the shaft 8 continues its rotation a short distance until the control lever strikes the shoulder 432 or 432a, the disc 431 will carry the clutch dog 429 around relative to the now stationary plate 436, causing the stud 438 to ride along the camming surface 437 until the nose 444 of the clutch dog is completely removed from the ratchet 427.

In order to insure full movement of the main clutch and shaft into their full or half cycle positions and to prevent rebound therefrom with the possibility of reengaging the clutch, a centralizing device is provided. Referring to Fig. 31 a centralizing disc 444a is keyed to the main shaft 8 and has a pair of diametrically opposed detents 445 formed therein. The periphery of the disc 444a is engaged by a roller 446 mounted on an arm 447 pivotally supported at 448 and urged clockwise by a spring 450 tensioned between the arm and a spring stud 451. As the main shaft approaches its full or half cycle position the roller 446 will be forced into one of the detents 445 to locate the shaft in said position.

Figure 28:
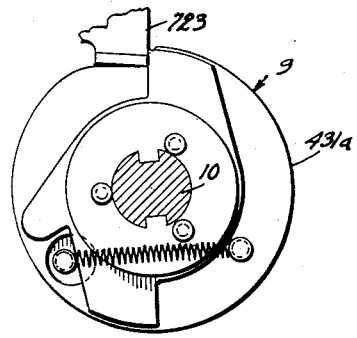
Fig. 28 is a side elevation of the multiplier clutch.

The multiplier clutch 9 (Figs. 28 and 29) is identical in construction to the main clutch except that the clutch disc 431a thereof is provided with one indentation only on its periphery so that it will be disengaged in full cycle position only by its clutch control lever 723.

A centralizing device is also provided for the multiplier clutch and comprises a centralizing disc 449 (Fig. 31) keyed on the multiplier shaft 10 and provided with a single indentation 449a on the periphery thereof. The disc is engaged by a roller carried by a centralizing lever 452 also pivoted at 448. The lever 452 is urged toward the disc by a spring 452a tensioned between the lever and the stud 451 so as to centralize the shaft in its full cycle position.

11. *Addition controls*

In the operation of the machine to perform addition, each factor is successively entered in the keyboard and the add bar 15 (Figs. 1 and 34) is depressed, causing operation of the machine through a main cycle and automatic selection of the main accumulator 36 (Fig. 2) unless manually superseded by depression of either of the two "add to accumulator" control keys 22 and 23.

Figure 34:
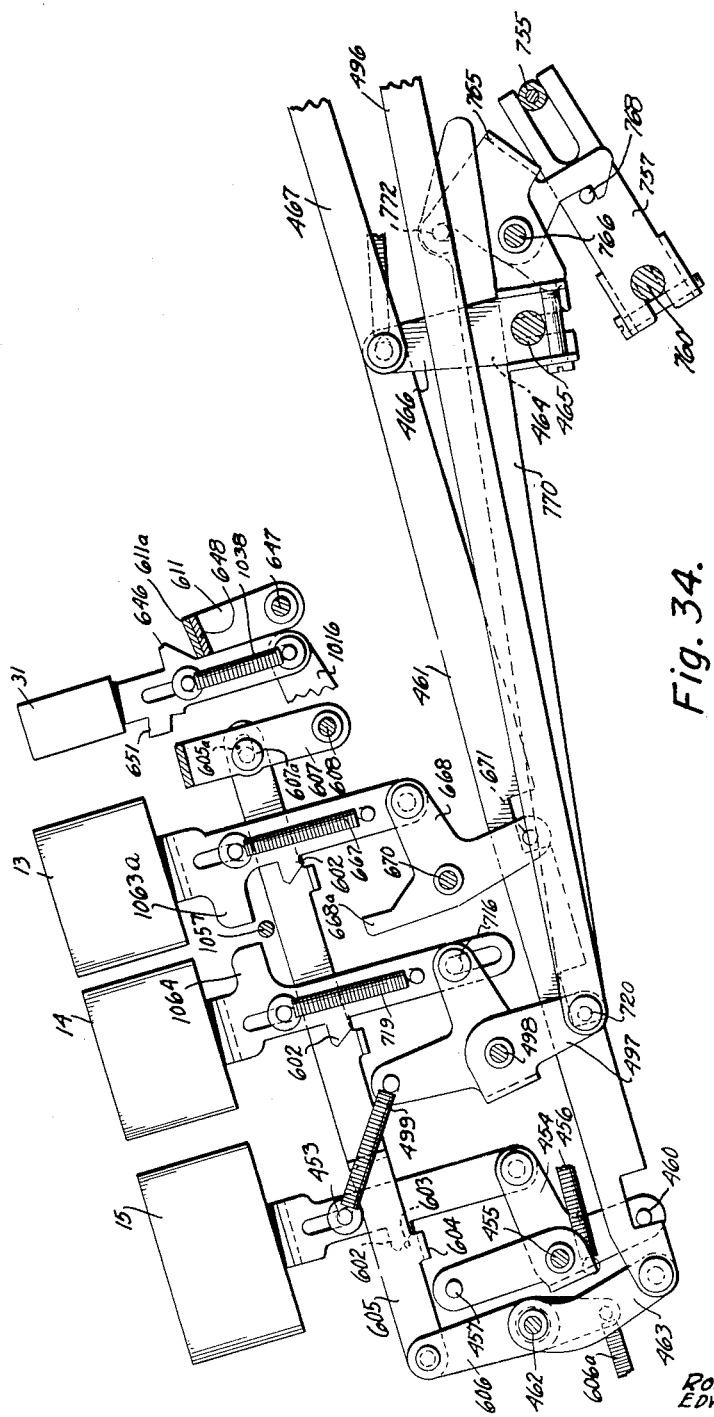
Fig. 34 is a side elevation illustrating part of the machine controls, including the add, first factor and second factor bars.

Referring now to Fig. 34, the stem of the add bar is provided with a vertical slot guided over a stationary frame pin 453. The lower end of the stem is pivotally connected to one arm of a three armed bellcrank 454 pivoted at 455 and urged counter-clockwise by a spring 456 to normally hold the add bar in its illustrated raised position. A pin 457 (see also Fig. 35) mounted on one of the arms of the bellcrank 454 normally lies in front of a shoulder 458 of an interponent 459 pivoted at 460 to a bellcrank 461 which is fulcrumed on a frame stud 462. A spring 459a is tensioned between the interponent 459 and bellcrank 461 to normally maintain the interponent in its illustrated position wherein the shoulder 458 is located directly behind the pin 457 of the bellcrank 454. The bellcrank 461 is pivotally connected at 463 to both the stem of the "add to product total" key 21 and a link 464. A link 465 is connected between the lower end of the link 464 and the upper end of a leg of the bail 265 (see also Fig. 17) described in the preceding section titled "Accumulator controls."

Extending from the link 464 is a pin 466 located within a triangular aperture 467 formed in a cam plate 468 which for the present description may be considered stationary relative to the machine.

From the above it will be seen that depression of the add bar will cause the bellcrank 454 to force the interponent 459 rearward, depressing the key 21 as well as link 464 to force the pin 466 along the forward inclined edge of the aperture 467. Thus, the link 465 will be moved rearward to rock the bail 265 clockwise so as to condition the main accumulator for an add operation in the previously described manner.

In addition to the normal automatic selection of the main accumulator as described above, depression of the add bar 15 causes engagement of the main clutch 7 and operation of the machine. Referring to Fig. 34 the lower arm of the bellcrank 454 is provided with a pin 460 located within a notch in a clutch control bar 461. The latter is supported at its forward end from a stationary pivot rod 462 by a link 463, while at its rear end the bar is pivotally supported by an arm 464 fastened to a rockable shaft 465. A second arm 466 identical to the arm 464 and in line therewith is also fixed to the shaft 465 and is connected to a link 467 (see also Fig. 29), the latter having a notch 468 normally embracing an ear 470 on the main clutch control lever 433. The latter is pivoted on a stationary frame stud 471 and is urged clockwise into engagement with the main clutch by a spring 472 tensioned between a pin 473 on the clutch control lever and a frame stud 474. However, upon depression of the add bar, the bellcrank 454 (Fig. 34) will draw the links 461 and 467 forward to rock the lever 433 and thus cause engagement of the main clutch.

Figure 29:
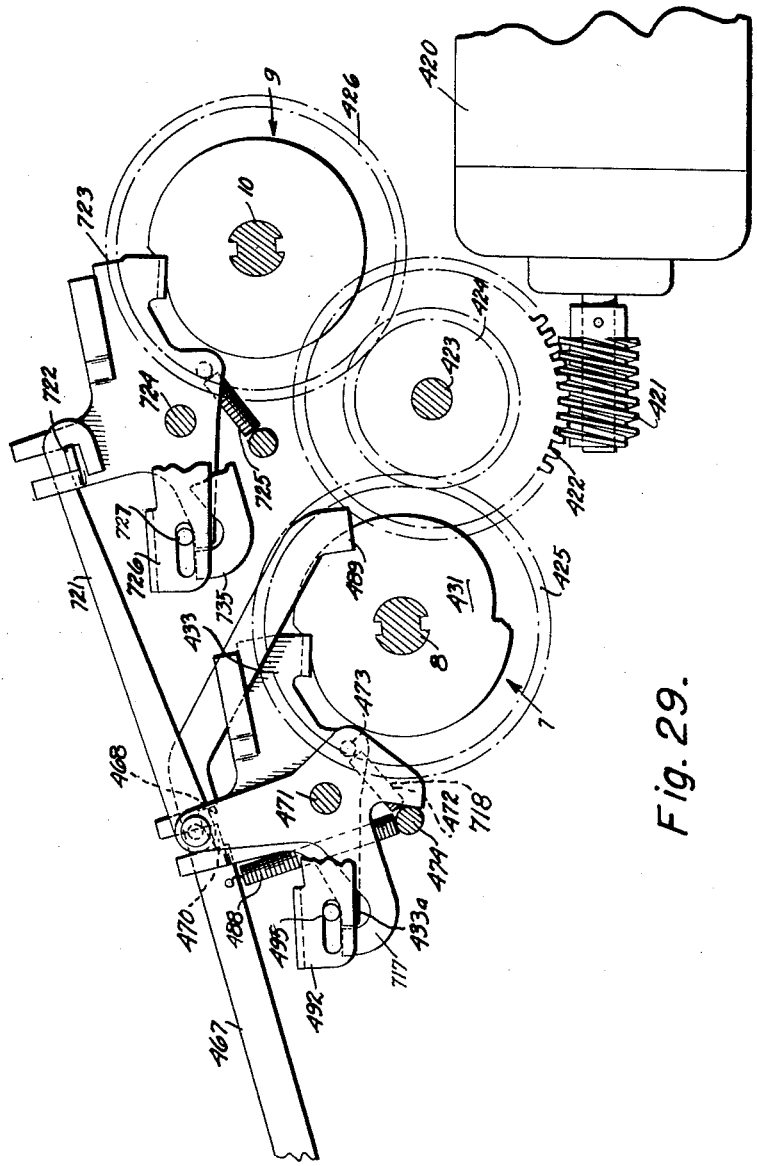
Fig. 29 is a side elevation illustrating part of the controls for the main and multiplier clutches and the motor drive therefore.

Means operable in response to the engagement of the main clutch are provided to close the motor circuit for the driving motor 420 (Fig. 29). Referring to Fig. 32, a bail 475 is pivoted on the frame pin 471 and overlies an ear 1433a of the main clutch control lever 433 whereby when the latter is rocked to engage the clutch the bail will raise a link 477 connected to a switch control lever 478 pivoted at 480 and urged counter-clockwise by a spring 481. An ear 483 on the switch lever overlies the plunger of a switch generally indicated at 485 suitably fastened to the frame of the machine. The switch is located in the power circuit for the motor 420 and may be of any well known construction in which the spring 481 is normally capable of causing the switch to open the motor circuit. The switch illustrated is commercially available under the trade name "Micro Switch" disclosed and claimed in Patent No. 1,960,020, issued to P. K. McGall on May 22, 1934. Thus, as the main clutch control lever 433 is rocked to cause engagement of the clutch, the switch control lever 478 will be rocked clockwise against the action of spring 481 to allow the switch 485 to close the motor circuit.

The clutch lever 433 is capable of arresting operation of the main clutch 7 at the end of the half cycle of the first phase thereof but during addition operations this is prevented and the main clutch will remain in operation for a complete cycle. For this purpose, a camming lever 492 is pivoted on the shaft 471 and is urged clockwise into its position illustrated in Fig. 30 by a spring 493 tensioned between the frame stud 474 and the lever, the stud forming a limit stop for the lever. A slot 494 is formed in the lever 492 to guide a pin 495 carried on a link 496 which, during addition operations, is allowed to remain in its rearmost illustrated position. The link 496 (Fig. 34) is pivotally supported on bellcrank 497 fulcrumed at 498 and normally held in a counter-clockwise illustrated poistion by a spring 499 tensioned between the latter and the frame stud 453. During addition, the position of the link 496 is unaltered, thereby causing the pin 495 to remain in its position illustrated in Fig. 30 wherein it overlies a tail 433a of the clutch control lever 433.

Shortly before the mid-cycle position of the clutch is reached, a camming member 4910 keyed on the main shaft 8, will carry an ear 5010 thereof against a camming edge 502 on the lever 492, thereby rocking the latter counter-clockwise to force the pin 495 against the tail of the clutch control lever 433. The latter will be rocked outward away from the clutch disc 431 just as the clutch passes through its mid-cycle position whereby the clutch control lever will be ineffective to arrest the clutch at this point. Thus, the clutch will continue through the second half of its cycle.

As will be described in detail hereinafter, the add bar 15 (as well as the other motor control bars) when depressed is latched in a depressed position until just prior to the completion of the main clutch cycle. Therefore, the link 467 is likewise held forward. However, means are provided to allow the clutch control lever 433 to move toward clutch disengaging position relative to the link in the early portion of the cycle. The purpose of this action is to insure that the clutch control lever is permitted sufficient time to move into engagement with the periphery of the clutch preparatory to disengaging the same and also to permit the control lever to disengage the clutch at the mid-cycle position during multiplication operations even though the link 467 is held in a forward position. For this purpose the link, which is normally held with its notch in engagement with the ear 470 of the clutch control lever by a tension spring 488, is provided with an extension 489. Normally the extension is out of the path of two ears 490 and 503 on a member 491, keyed on the main shaft 8, but when the link is moved forward to cause engagement of the clutch the extension will be located in the position illustrated by the dot and dash lines 489a (Fig. 30). During the early part of the cycle the ear 490 will strike this extension, raising the link 467 so as to release the notch 468 therein from engagement with the ear of the clutch control lever, so that the latter can be actuated by its spring 472.

Toward the end of the main cycle the second ear 503 on the member 491 (Fig. 30) will strike the extension 489 of the link 467, rocking the latter upward to disengage the link from the clutch control lever, whereby the latter is allowed to again ride on the periphery of the clutch until the latter reaches its full cycle position.

The above mentioned breaking of the connection between the control link 467 and the clutch control lever 433 enables the clutch to be disengaged at the end of the cycle even though the add bar is held depressed by the operator during and after the clutch cycle and thus automatically limits the operation to a single cycle.

12. *Superseding of automatic accumulator selection during addition*

As described hereinbefore, the automatic selection of the main accumulator 36 (Fig. 2) during addition operations may be superseded and amounts, instead, entered into either or both of the storage accumulators 3 and 4 by depressing either or both of the accumulator control keys 22 and 23, respectively, before or during depression of the add bar.

Figure 35:
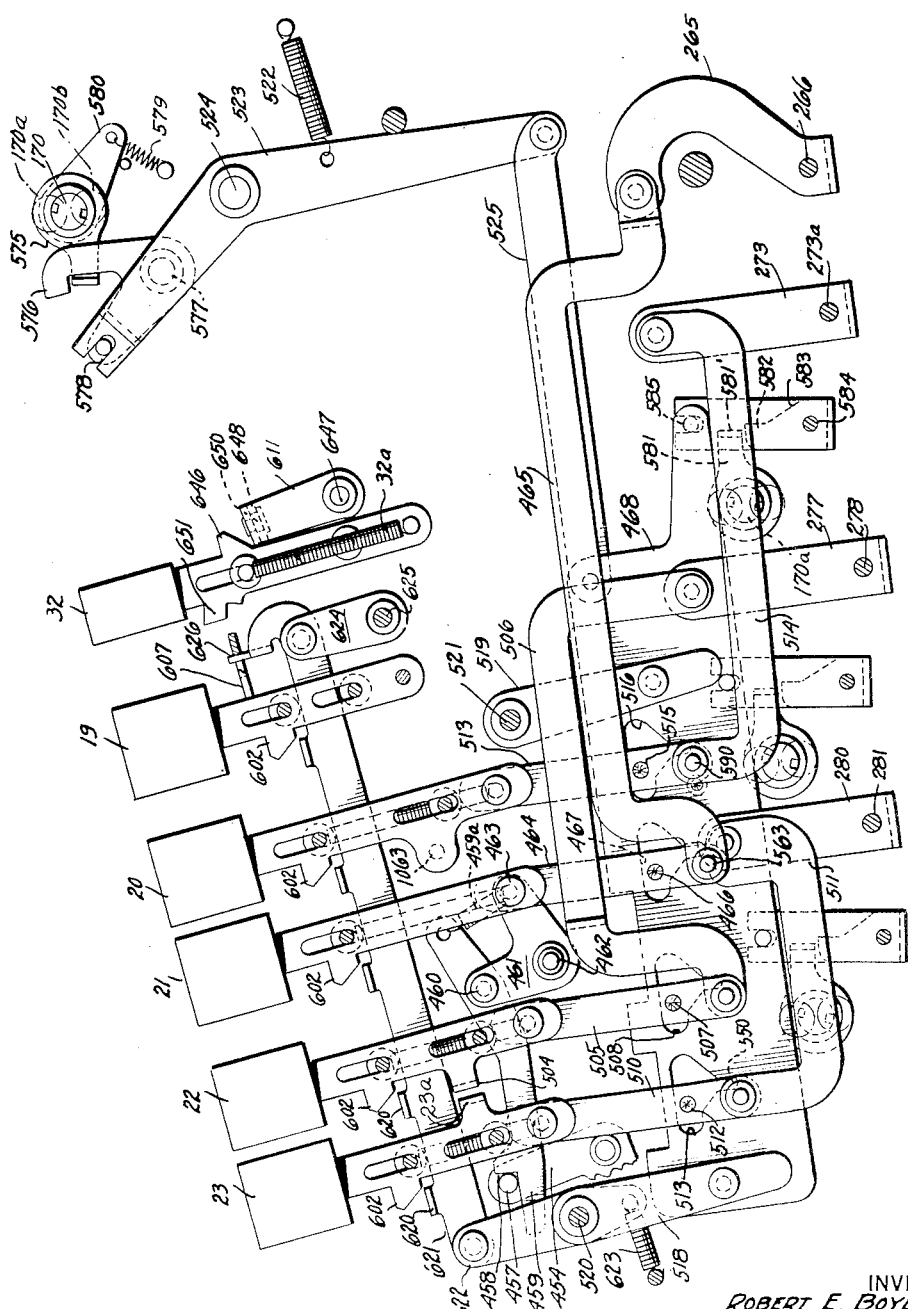
Fig. 35 is a side elevation illustrating the controls for selecting and entering values into various accumulators.

Referring to Fig. 35, the "add to accumulator #3" key 22 is provided with an ear 504 which, upon depression of the key rocks the interponent 459 counter-clockwise to remove its shoulder 459 from behind the pin 457 and thus disconnects the train of linkage intermediate the add bar and the main accumulator control bail 265.

The key 22 is connected to the hereinbefore described control bail 277 for effecting selection of the storage accumulator 3 (Fig. 2) in a manner similar to that of the "add to product total" key 21. That is, the stem of key 22 is entrained with interconnected links 505 and 506, the latter being pivotally connected to the control bail 277. A pin 507 on the link is located within a second triangle aperture 508 in the aforementioned cam plate 468 and thus, as the key 22 is depressed, the pin will move along the forward inclined edge of the aperture, moving the link 506 rearward to rock the bail 277 clockwise and thus condition the controls for the accumulator 3 to mesh the latter with the racks 35 so that values will be entered additively therein.

The key 23 is likewise entrained with the selection control bail 280 for the accumulator 4 through interconnected links 510 and 511. A pin 512 on the link 510 is located within a triangular aperture 513 in the cam plate 468 for the purpose of forcing the link 511 rearward during depression of the key to thus rock the accumulator control bail 280 clockwise so as to condition the controls for the accumulator 4 to mesh the latter with the racks so that values will be entered additively therein. The key 23 is provided with a lug 23a overlying the interponent 459 so that depression of the key will disengage the interponent from the pin 457 in the same manner as depression of the key 22.

In addition to entry of values into either the main accumulator 36 (Fig. 2) or either or both of the two storage accumulators 3 and 4, values may be entered into the storage accumulator 38 during an addition operation. This accumulator is selected by depression of the "add to factor total" key 20 which is entrained with the selection control bail 273 (Figs. 17 and 35) for the accumulator 38 through interconnected links 513 and 514, the link 513 having a pin 515 thereon located within a triangular aperture 516 formed in the cam plate 468. Thus, depression of the key 20 will cause the pin 515 to cam along the forward edge of the triangular aperture 516 and thereby force the link 514 rearward to rock bail 273 which as described hereinbefore conditions the controls for the accumulator 38.

13. *Subtraction controls*

The machine is normally conditioned to additively enter values into the selected accumulator during an addition operation. However, problems in subtraction may be performed by first setting the subtract key 18 (Figs. 1 and 36) in depressed condition wherein it will be locked until the end of the ensuing cycle in a manner to be described later, and then depressing the add bar 15 to cause operation of the main clutch in the same manner as in addition operations.

Depression of the subtract key positions the aforementioned cam plate 468 to effect control of the various accumulator selection linkages in an opposite sense than that effective during addition operation and for this purpose the cam plate is pivotally supported by links 518 and 519 (Fig. 35) fulcrumed at 520 and 521, respectively. The cam plate is normally held in the rearward position illustrated in Figs. 35 and 36 by a latch 527 (Fig. 36) fulcrumed at 528 and urged by a spring 530 to latching position in front of a stud 531 mounted on the cam plate 468. As the subtract key 18 is depressed against the action of its spring 532 it rocks a bellcrank 533 about a frame stud 534 to carry a pin 535 on the lower end thereof leftward (as viewed in Fig. 36) to the position indicated by the dot and dash lines 535a. During its leftward travel the pin 535 strikes the inclined surface of a latch release plate 537 pivotally supported by a pair of identical bellcranks 538 fulcrumed at 540 and 541. The lower ends of the two bellcranks are connected together by a link 542 thus forming a parallel arrangement whereby the piece 537 may be lowered in a parallel motion under the action of pin 535 and against the action of a spring 543 tensioned between a frame stud and the lower end of the rearmost bellcrank 538. The rear end of the piece 537 overlies the latch 527 and when the piece is lowered by the pin 535 it will rock the latch to release the cam plate for forward movement. As the pin 535 continues to the left it will strike a shoulder 536 on the cam plate 468, forcing the latter to the left to a position wherein the rear inclined edges of the various triangular apertures 516, etc. (Fig. 35) of the cam plate 468 will underlie their respective pins 515, etc. Now, upon depression of any of the accumulator control keys, i. e. link 514, etc. will be cammed forwardly to rock their associated accumulator selection control bails 273, etc., counter-clockwise and thus condition the accumulator controls to mesh the selected accumulator or accumulators with the racks 35 in a manner to subtractively enter values therein.

It will be noted that as the pin 535 reaches its foremost position 535a it will pass beyond the plate 537, allowing the latter to spring back to its illustrated position and thereby hold the pin and consequently the cam plate 468 in their forward positions until the end of the main cycle is reached at which time the member 537 will be lowered under power as will be described later. The subtract key, upon being released from depressed position toward the end of the cycle, will rise, permitting the plate 468 to be returned to its illustrated position by a spring 522 (Fig. 35). The latter is tensioned between a frame stud and a lever 523 pivotally supported at 524 and connected to the plate 468 through a link 525.

14. *Non-add controls*

Non-add operations may be effected by depressing and latching down the non-add key 17 (Figs. 1 and 36), prior to or during depression of the add bar.

The key 17 is normally held in a raised position by its spring 544 but when depressed rocks a bellcrank 545 about its fulcrum 546 to carry a pin 547 on the lower end thereof against a second inclined shoulder on the latch release plate 537, thereby depressing the plate in the same manner as described in the preceding section in connection with subtract operations so as to release the latch 527 from restraining the cam plate 468. As the pin 547 moves leftwardly it strikes a second shoulder 548 on the plate 468 to move the plate leftwardly as viewed in Figs. 35 and 36. It will be noted that the shoulder 548 is located a greater distance from the pin 547 than shoulder 536 is from the initial position of the pin 535. Since the strokes of the pins 535 and 547 are the same, the plate 468 will be moved to a position midway between its addition and subtraction positions wherein a notch, such as indicated at 550, located at the bottom or apex of each of the triangular apertures 516, etc., in the camming plate is located directly below the various camming pins 515, etc. Thus, although any of the various accumulator conditioning keys 20 to 23, inclusive, may be depressed, their respective control linkages will remain unaffected and therefore the associated accumulators will be allowed to remain in their neutral positions during the subsequent operation of the machine.

15. *Totaling controls*

Figure 39:
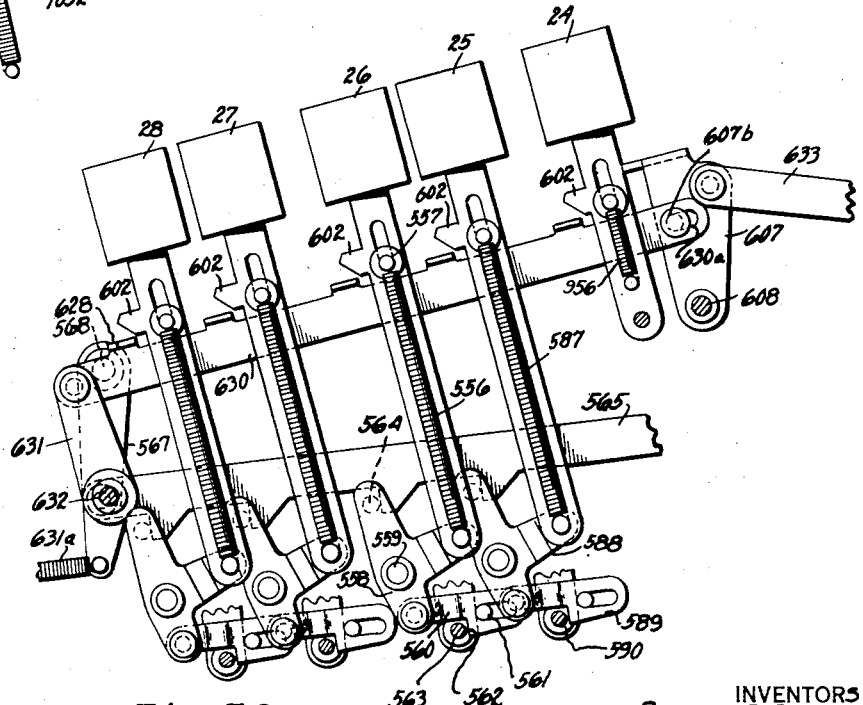
Fig. 39 is a side elevation of the part of the controls for totaling the various accumulators.

Any of the accumulators 36, 38, 3 and 4 (Fig. 2) may be totaled out by depressing their respective total bars 26, 25, 27 and 28, respectively (Figs. 1 and 39). During such totaling operations the selected accumulator is driven in a subtractive direction to zero during the first portion of a main cycle during which the racks 35 (Fig. 2) are driven forwardly. Thereafter, the accumulator is returned to neutral position and remains therein during return of the racks.

Referring in particular to Figs. 12 and 13, the main accumulator 36 includes a series of ordinally spaced zero stop levers 551 keyed on the shaft 170. The zero stop levers are rocked counter-clockwise by the shaft 170 during a totaling operation to locate blocking noses 552 thereon in blocking relation with ears 553 integral with the accumulator gears 160. Thus, when the gears 160 are rotated subtractively in a counter-clockwise direction by the drive racks they will return to their zero positions at which time the zero locating ear 553 of each gear will strike the upper edge of the nose 552 of the associated zero stop lever. Therefore, the lever will block rotation of the gear and forward movement of the associated rack.

Describing now the means for determining the proper direction of rotation of the selected accumulator during totaling operations, reference is had to Figs. 35 and 39. The total bar 26 which controls totaling of the main accumulator is normally held in a raised position by a spring 556 extending between the bottom of the stem of said bar and a frame pin 557. The lower end of said stem is connected to a bellcrank 558 fulcrumed at 559 and pivotally connected to a link 560. The latter has an elongated slot therein guided over a frame pin 561 and is provided with a shoulder 562 which, upon depression of bar 26, engages the pivot pin 563 which interconnects the links 464 and 465 of the main accumulator positioning control linkage, thereby moving the link 465 forwardly to rock the bail 265 (see also Fig. 17) and thus condition the main accumulator for subtractive operation.

In order to enable the total bar 26 to cause engagement of the main clutch and operation of the machine, a pin 564 is mounted on the bellcrank 558 and lies in front of a shoulder on a clutch control link 565 (see also Fig. 40). The latter is supported at its forward end by a link 567 fulcrumed at 568 and at its rearward end by a bellcrank 570 pivoted on a stationary rod 571 and provided with a pin 572 overlying an arm 573 fixed to the aforementioned rockable clutch control shaft 465 (see also Fig. 34). Thus, rearward movement of the link 565 initiated by depression of the bar 26 or by any of the other total bars will act through the bellcrank 570 and arm 573 to rock shaft 465 and thereby cause engagement of the main clutch and operation of the machine. An ear 570a on the bellcrank 570 underlies bail 119 which is pivotally mounted at 571 and supports the upper end of link 118. Thus, upon depression of any of the total bars and consequent actuation of link 565, the bail 119 will be rocked clockwise to raise links 118 and 117 to release the latter from its connection with the rack stop bar control linkage including arm 121 and pin 120. In view of this the rack stops 100 (Fig. 2) will not be raised during totaling operations.

Describing now the means for rocking the shaft 170 of the main accumulator (Figs. 2, 12 and 35) for the purpose of blocking the various accumulator gears 160 when the latter reach zero position, it will be recalled that during addition operations the accumulator and thus the shaft 170 is lowered to a position indicated by dot and dash lines 170b whereas in subtraction and totaling operations the shaft is raised to its alternate dot and dash line position indicated at 170a. Keyed to the shaft 170 is an arm 575 having an ear thereon normally underlying a lug on a lever 576 fulcrumed at 577 and connected by a pin and slot connection 578 to the aforementioned lever 523.

Now, during all operations of the machine except subtract and non-add operations, the cam plate 468 is allowed to remain in its position illustrated in Fig. 35. Consequently, the arm 576 will be located in its illustrated position wherein it overlies the ear of arm 575. During addition operations the shaft 170 will be lowered along with the rest of the accumulator and therefore the lever 576 will be ineffective to rock the arm 575 and the shaft 170. During subtraction operations when the accumulator and the shaft 170 are raised the cam plate 468 will be moved forwardly as described hereinbefore, and through the link 525 and lever 523 will rock the lever 576 clockwise to remove the lug thereon from a position overlying the ear of arm 575. However, during totaling operations the lever 576 is allowed to remain in its illustrated positions since the position of the cam plate 468 is unaffected at this time. Therefore, as the main accumulator is raised the ear of arm 575 will be engaged by the upper end of the lever 576, rocking the shaft 170 counter-clockwise against the action of a spring 579, tensioned between a frame stud and an arm 580 keyed on the shaft 170, to position the various zero stop levers 551 in blocking positions relative to the zero stop ears 553 on the various accumulator gears 160.

The remaining accumulators 3, 4 and 38 (Fig. 2) are controlled in a manner similar to that of the main accumulator during total operations thereof and since these controls are substantially identical with each other it is deemed necessary to describe the operation of one only. It will be recalled that the latter accumulators are raised into mesh with the gear rack sections 165 of the drive racks 35 during additive entry of amounts therein and are lowered into mesh with the lower gear sections 166 during subtractive and totaling operations. Therefore, the direction of rotation of the three lower accumulators will be opposite to that of the main accumulator during totaling operations. Thus, during totaling of any of the lower accumulators, their accumulator gears 160 will be rotated clockwise and the zero stop ears 553 thereof will block against the outer or upper edges of the blocking noses of the zero stop levers 552 instead of the inner edges as is the case with the main accumulator. However, the thickness of the blocking nose of each lever 552 is such that the gear 160 is blocked in a digital position which in the main accumulator 36 represents the value "nine" whereas in any lower accumulator this position will represent zero.

Describing the means for setting the zero stop levers for the rearmost lower accumulator 38, the shaft 170a of the latter has an arm 581 (Fig. 35) keyed thereon, an ear 581' of which normally overlies the leg 582 of a bail 583 pivotally supported on a stationary rod 584 and pivotally connected at 585 by another leg thereof to the cam plate 468. Although during both subtraction and totaling operations the shaft 170a of this accumulator is lowered, the cam plate 468 will be held in a forward position during subtraction operations, thus holding the bail 583 in a counter-clockwise position wherein the ear 581' of arm 581 will miss the leg 582 of the bail as the accumulator is lowered. However, during totaling operations, the cam plate 468 will be allowed to remain in its position illustrated in Fig. 35 so that the ear 581' of the arm 581 will strike the top of leg 582 as the accumulator is lowered, rocking the shaft 170a to locate the zero stop levers in blocking position relative to the zero stop ears on the accumulator gears.

Initiation of a totaling operation for the accumulator 38 is effected in a manner similar to that in which a totaling operation for the main accumulator is effected. Referring to Fig. 39, the total bar 25 for controlling totaling of the accumulator 38 is normally held in a raised position by spring 587 and when depressed rocks a bellcrank 588, identical in structure to the bellcrank 558. The bellcrank 588 has a pin thereon which when bar 25 is depressed, actuates the clutch control linkage, including link 565, to cause engagement of the main clutch. The bellcrank 588, through link 589, similar to link 569, moves pivot pin 590 (see also Fig. 35), interconnecting links 513 and 514 in the accumulator selection control linkage for the accumulator 38, whereby the latter is conditioned to be actuated in a subtractive manner by the racks.

16. Sub-total controls

Sub-totaling of a selected accumulator is effected by first depressing and latching the sub-total key 16 (Figs. 1 and 36) and then depressing the total bar for the selected accumulator. During such sub-totaling operation the machine operation is similar to a totaling operation except that the selected accumulator is maintained in mesh with the drive racks 35 throughout both their forward and return strokes so as to re-enter the amounts which are removed therefrom during the first part of the cycle. For this purpose, the sub-total key 16, when depressed, rocks a bellcrank 592 against the action of a spring 594 and about a pivot stud 593 to force a sub-total control link 595 (see also Fig. 18)

rearward. The latter link has a pin 596 thereon which normally (when the sub-total key is in raised position) lies in the forward portion of an elongated slot 597 in the aforementioned bail 245, which it will be recalled transmits movement to the accumulator raising and lowering linkage. The bail 245, therefore, is normally controlled solely by the cam 251, which it will be recalled has a rise over only substantially one half of its periphery. However, when the sub-total key is depressed the pin 596 will be forced rearward into a shorter slot 600 formed in the aforementioned bellcrank 115 (see also Fig. 40), the latter being under control of the cam 113 which has a rise over the major portion of its periphery. Therefore, the bail 245 will be brought under control of the cam 113 so as to hold the selected accumulator in mesh with the racks until the latter are returned to their home positions so as to reenter therein values which were totaled out therefrom during the early part of the cycle.

17. *Control key locks*

As mentioned hereinbefore, each of the various control keys and bars when depressed is latched down and is either automatically released during the operation of the machine or is released by depression of certain of the other control keys or bars.

Figure 41:
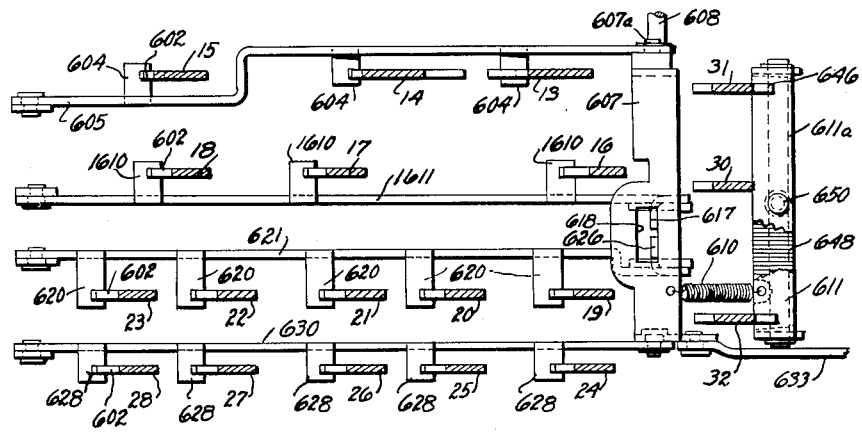
Fig. 41 is a sectional plan view illustrating the locking mechanism for the various machine control bars and keys.

Referring to Figs. 34 and 41, the stem of each of the motor bars 13, 14 and 15 is provided with a latching projection 602 which comprises parallel top and bottom edges joined by an inclined edge 603. When the bar is depressed the inclined edge strikes an associated latching ear 604 on a latch bar 605, camming the latter forwardly. The bar 605 is pivotally supported at its forward end by a lever 606 pivoted at 462 and urged clockwise to yieldably hold the bar in its illustrated position by a spring 606a. The rear end of the bar 605 is provided with a slot 605a fitted over a pin 607a on a bail 607 pivotally supported on a stationary rod 608 and urged clockwise by a spring 610 (Fig. 41) tensioned between the bail and a second latching bail 611 to be described presently. The bar 605 will therefore be cammed forwardly against the action of the spring 606a until the top edge of the latching projection 602 on the stem of the depressed bar passes below the ear 604 at which time the bar 605 will be allowed to retract rearwardly, latching the control bar in depressed position. During this motion of bar 605 the bail 607 will remain unmoved by virtue of the lost motion connection formed by slot 605a and pin 607a.

Figure 36:
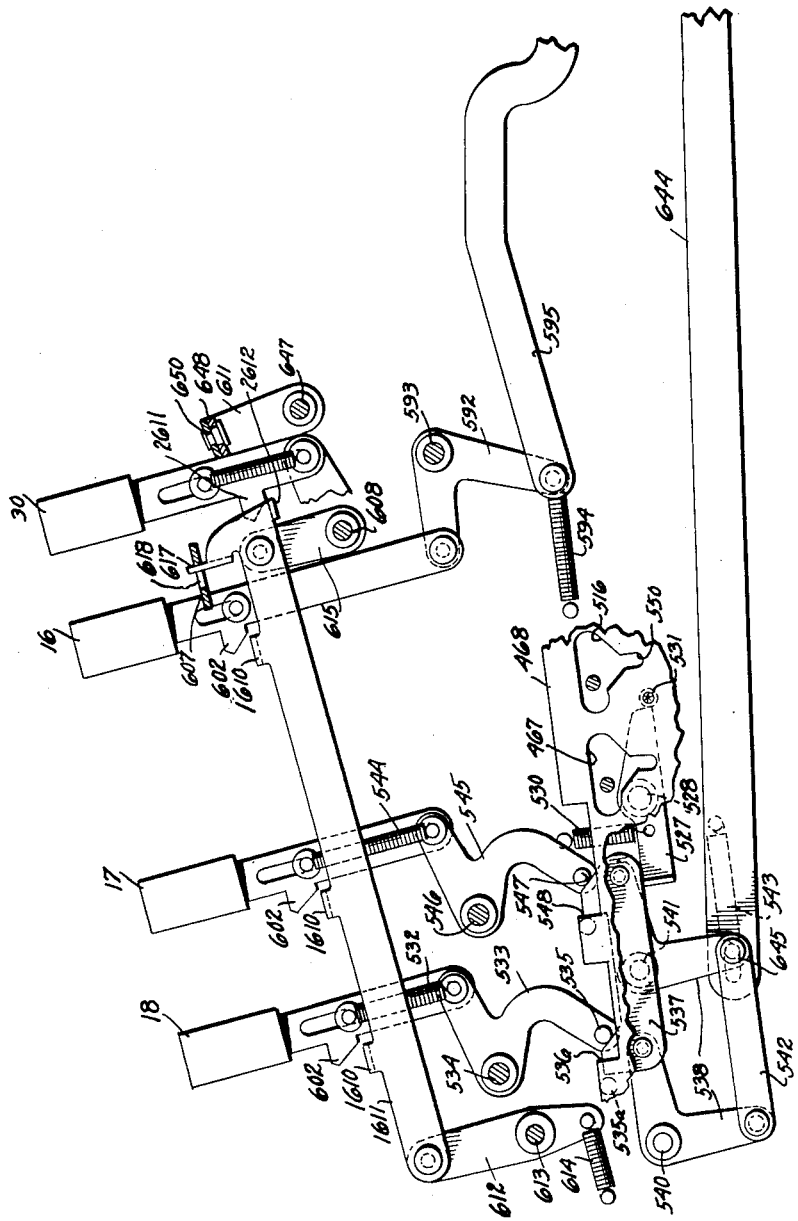
Fig. 36 is a side elevation illustrating the controls for conditioning the machine for subtraction, non-add and sub-total operations.

Referring to Figs. 36 and 41, each of the aligned control keys 16, 17 and 18 is also provided with a latching projection 602 arranged in latching relationship with an ear 1610 formed on a latch bar 1611. The latter is pivotally supported at its forward end by a lever 612 pivoted at 613 and urged clockwise by a spring 614 whereby to yieldably hold the latch bar in its rearward illustrated position. The rear end of the bar 1611 is supported by a link 615 pivoted on the rod 608. The bar 1611 has an ear 617 thereon which projects through a rectangular aperture 618 in the aforementioned bail 607 whereby to permit a limited relative movement between the bar and the bail, the purpose of which will appear presently.

As shown in Figs. 35 and 41, the various keys 19 to 23, inclusive, are also each provided with a latching projection 602 arranged in latching relationship with an ear 620 formed on a latch bar 621 supported at its forward end by a lever 622 pivoted on the frame pin 520. The lever 622 is urged clockwise by a spring 623 to yieldably hold the bar in its rearward illustrated position. The rear end of the bar is supported by a link 624 pivotally supported at 625. The bar 621 is provided with an ear 626 which also extends through the aperture 618 in the bail 607 and thus is permitted a limited amount of movement relative to the bail.

Referring now to Figs. 39 and 41, each of the motor control bars 24 to 28, inclusive, is also provided with a latching projection 602 arranged in latching relationship to an ear 628 formed on a latch bar 630 which is supported at its forward end by a lever 631 pivotally supported at 632 and urged clockwise by a spring 631a. The rear end of the bar 630 is provided with a slot 630a fitted over a pin 607b on the aforementioned latching bail 607 whereby the latch bar may move relative to the bail in latching any of the control bars.

From the above it will be seen that any one of the machine conditioning keys 16 to 23, inclusive, may be depressed and latched down by its respective latch bar, the aperture 618 in the bail 607 being of such width that any one of these keys may be depressed, moving its respective latch bar for this purpose, without moving any of the three remaining latch bars. However, if anyone of the keys 16, 17 and 18 is already latched depressed it will be released by depression of either of the remaining two. On the other hand, if any one of the keys 19 to 23 is latched depressed it will be released by depression of any other key in this group.

Figure 42:
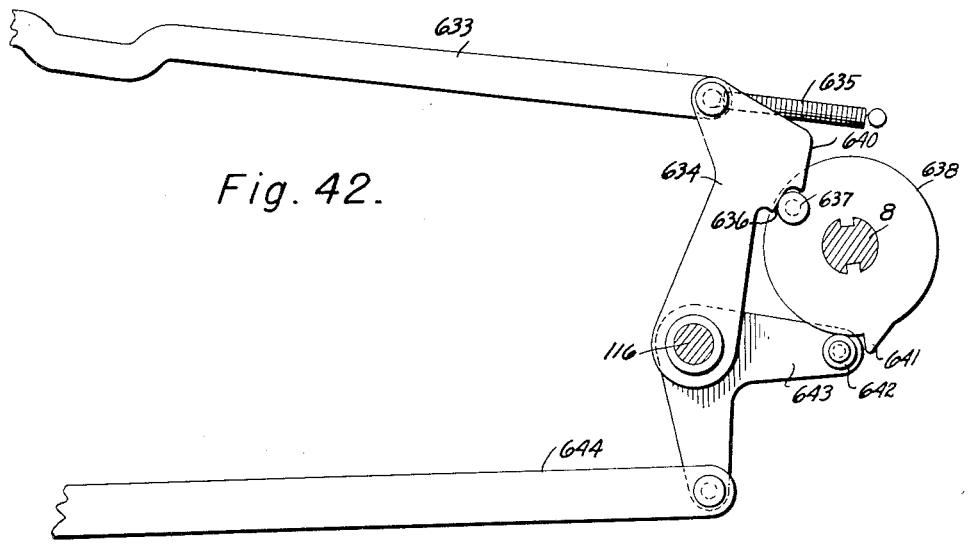
Fig. 42 is a side elevation illustrating the operating means for the control key and bar lock mechanism of Fig. 41.

Referring to Figs. 39 and 42 the latching bail 607 is connected by a link 633 to a lever 634 pivotally supported on the stationary rod 116 and urged rearward by a spring 635. In the full cycle position of the main shaft 8 as illustrated in Fig. 42 a shoulder 636 on the lever 634 rests against a stud 637 on a disc 638 keyed to the main shaft to thus maintain the various bars 605, 1611, 621 and 630 in positions such that they may latch their associated keys and bars when the latter are depressed. However, at the start of the main cycle, the stud 637 is carried counter-clockwise below the shoulder 636, allowing the spring 635 to move the link 633 and bail 607 rearward. Therefore, the latching bars will be allowed to be moved rearward by their respective springs to cause the various latching ears 604, etc., on the different latch bars to move under the bottom edges of the latching projections 602 of the associated keys or bars which have been allowed to remain raised, thereby preventing depression of any of these keys during operation of the machine. As the main clutch approaches the end of its cycle, the stud 637 engages an inclined camming edge 640 on the lever 634, rocking the same forwardly and thereby forcing all of the latch bars 605, 1611, 621 and 630 forwardly an amount sufficient to completely release the latching projections 602 of all control keys or bars.

The disc 638 is provided with a rise 641 which, toward the end of a machine cycle, engages a roller 642 on a bellcrank 643 to rock the latter and force a link 644 (see also Fig. 36) forwardly. The latter is connected by a pin and slot connection 645 to one of the aforementioned bellcranks 538 connected to the latch release plate 537 whereby to release either of the bellcranks 533 or 545 when the latter have been rocked clockwise to move the cam plate 468 to a subtract or non-add position.

Each of the settable keys 31 and 32 (see Figs. 1, 34 and 35), when depressed is latched down but is not automatically released as is the case of the remaining control keys and bars but may be retained in a depressed position indefinitely. For this purpose, the stem of each of the keys is provided with a latching projection 646, similar to the latching projections 602 of the other control keys and bars. The latter projections are adapted to cam against the upper cross leg of the locking bail 611, the latter being pivoted on a stationary rod 647 and urged counter-clockwise by the above mentioned spring 610 (Fig. 41).

When one of the keys 31 and 32 is depressed the projection 646 on the key stem thereof will cam the bail 611 outwardly until the projection passes below the cross leg 611a. Each key is so limited in its stroke that its latching projection 646 will not pass appreciably below the lower edge of the leg 611a of the locking bail and therefore, when the upper surface of the projection passes below the leg, the bail will be spring pressed forwardly but an interponent 648 pivoted at 650 to the under surface of the leg 611a of the bail at a point midway between the stems of the keys 31 and 32 will be forced against the tip of the latching projection and will therefore rock relative to the bail while the opposite end thereof will be pressed against the key stem of the opposite key. Thus, the bail cannot completely return to its illustrated position but will nevertheless return sufficiently to latch the depressed key.

A depressed one of either of the keys 31 and 32 may be released by depressing the other key or both keys may be caused to assume their raised positions by simultaneously pressing downward on both keys. In this case, the latching projections 646 of the two keys will realign the interponent with the cross leg 611a of the latching bail so that the latter will be ineffective to move over the tops of the projections 646. It will thus be seen that both keys cannot be concomittantly latched in depressed condition because of the presence of the interponent.

It will be noted on reference to Fig. 36 that the central "clear first factor" bar 30 does not have a camming projection for cooperating with the latching bail 611 but has a camming projection 2611 which cooperates with a latching ear 2612 on the aforementioned latching bar 1611.

In addition to the camming projections 646 on the two keys 31 and 32, the stems of these keys are provided with locking projections 651 which permit the upper leg of the latching bail 607 to pass thereunder when the respective keys or bar are in raised position or to pass thereover when either of the keys are in depressed position. Since the latching bail 607 is rocked rearward during a machine cycle as was described hereinbefore, it will be seen that the keys 31 and 32 will be locked in either their upper or their depressed positions during a machine operation.

18. *Multiplication control mechanism (general arrangement and operation)*

The multiplication control mechanism will be described in detail in the following sections, however, it is believed that a preceding general description of the mechanism will facilitate understanding of the mechanism as a whole.

The multiplicand or first factor of a multiplication is entered into the machine by setting this factor in the keyboard and depressing the first factor bar 13 which, when depressed, causes the machine, through the main racks 35, to transfer this factor from the keyboard to the aforementioned racks 40 (Fig. 2) which are vertically adjustable to positions representing the numerical values of the different digits of the multiplicand. Thus, the racks 40 form a multiplicand receiving and storing device.

The multiplier or second factor of a multiplication is thereafter entered into the machine by setting this factor in the keyboard and depressing the second factor bar 14 which causes the main racks 35 to assume positions numerically representing the different digits of the multiplier. These racks remain in said positions throughout the ensuing multiplication operation. Thus, the racks 35 form a multiplier receiving and storing device. The second factor bar also initiates the multiplication operation by conditioning the multiplying clutch 9 (Fig. 29) to operate as an incident to operation of the main clutch. The latter multiplier clutch causes sequential sensing and selection of various ones of the racks 35, starting with the rack in the order of lowest denominational value containing a significant multiplier digit to control multiplication in accordance with the value of said digit.

Figure 10:
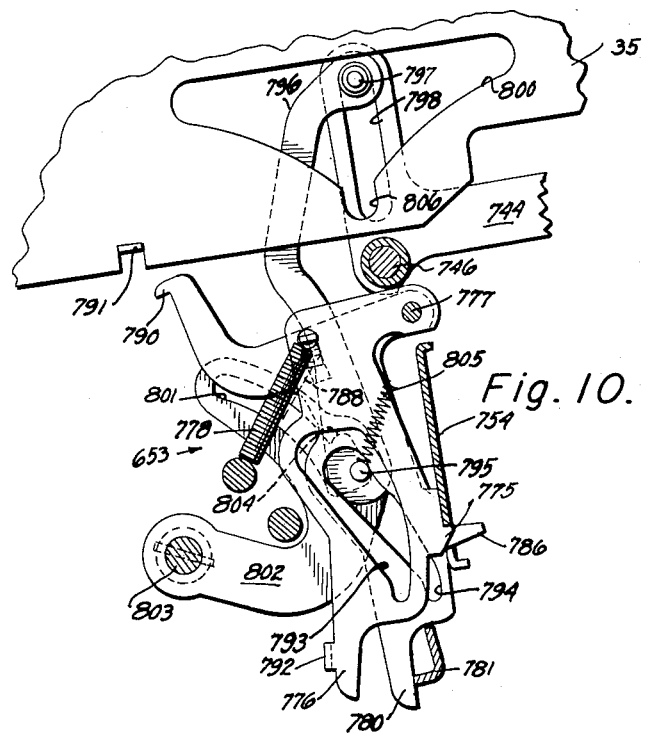
Fig. 10 is a detailed side elevation illustrating the multiplier digit selecting mechanism in an operative condition.

The sequential selection of the different racks 35 is accomplished by a selector device generally indicated at 653 (Figs. 2 and 10). The latter, in conjunction with the various multiplicand racks 40, coordinately adjust a plurality of ordinally arranged contact elements 654 (Fig. 3) to condition certain of a plurality of partial product circuits located in each order of the machine, depending upon the combined multiplicand factor digit for that particular order and the selected multiplier factor digit.

The partial product circuits in each order are divided into two groups, one to control registration of the units component of a partial product and the other to control registration of the tens component of the same partial product. These two groups are mounted on separate plates located on opposite sides of the contact elements 654.

Each of the various circuits in any one group of partial product circuits includes one of a series of coordinately arranged terminals 655U or 655T (Figs. 2 and 3) which are connected to different terminal strips 656U or 656T in accordance with the respective units or tens components of the multiplication tables as will be described in detail hereinafter. Thus, these circuits are selected by the coordinate adjustment of the above mentioned contact elements 654.

The partial product circuits control entry of product values determined thereby into the partial products accumulator generally indicated at 6 (Fig. 3). The latter is driven by a constant excursion drive mechanism generally indicated at 659 through differentially movable units and tens actuating devices generally indicated at 657 and 658, respectively. The latter jointly and simultaneously differentially drive the accumulator 6 and are so arranged relative to the partial product circuits that a tens component actuator under control of a tens component partial product circuit in any one main rack order and the units component actuator under control of the units component partial product circuits in the next higher main rack order jointly control a particular order of the partial products accumulator so that the units and tens partial products of a multiplication may be simultaneously and properly entered into the accumulator.

The actuators 657 and 658 in each accumulator order are differentially controlled by electromagnetic devices 660 and 661, respectively, which are connected to the different selected ones of the units and tens partial products circuits. The latter circuits are closed by contact rollers 662 and 663 (Fig. 2) movable along the terminal strips for the units and tens partial product circuits, respectively, by the constant excursion device 659. Thus, when a roller 662 or 663 completes a conditioned partial product circuit an electro-magnetic device 660 or 661, respectively, connected in said circuit is energized to arrest the respective units or tens accumulator actuator 657 or 658.

A denominational shift device generally indicated at 664 (Fig. 2) is provided to successively enter the various partial products of a multiplication into successively higher orders of the accumulator 6 as the multiplication progresses, in accordance with the well known laws of multiplication. This device is under control of the multiplier digit selecting device 653 so that after the partial product representing the multiplication of all of the multiplicand digits by, for example, the lowest order digit of the multiplier has been entered into the accumulator 6 the connections between the partial product circuits and the electro-magnetic devices are shifted so that the next partial product representing the multiplication of all of the multiplicand digits by the next higher order digit of the multiplier will be entered into the next higher orders, in echelon, of the accumulator. If such next higher order digit in the multiplier factor should happen to be a zero the selecting device 653 would sense this condition and transfer control to the next higher order main rack while at the same time causing the connections between the partial product circuits and the electro-magnetic devices to be further shifted so that the next partial product will be entered into the second higher echelon of orders of the accumulators.

Provision is made for totaling out the accumulator 6 through the racks 35. These amounts will be printed on the paper tape and also may be transferred into any of the aforementioned accumulators 36, 39, 3 and 4 (Fig. 2) or may be reentered as a first factor in the multiplicand racks.

19. *Multiplicand entering means*

Depression of the "first factor" bar 13 (Figs. 1, 34 and 52) against the action of its spring 667 rocks a bellcrank 668 about its pivot 670 to carry forward a pin 671 on the lower end thereof, which pin is located within a notch in the aforementioned clutch control link 461, so as to cause engagement of the clutch in the same manner as does the add bar 15.

In addition to causing engagement of the main clutch and operation of the machine, the bar 13 conditions the racks 40 (Fig. 2) to be driven by the main racks 35 whereby to set the former in positions mechanically representing the multiplicand values. An upwardly extending tail 668a on the bellcrank 668 lies in front of a pin 672 on the forward end of a link 673, the pin being guided in an arcuate slot 1674 formed in a lever 674 which for the present purpose may be considered as held stationary in the position illustrated in Fig. 52. Thus, depression of the bar 13 forces the link 673 rearward to carry therewith a cam bar 675 (Figs. 43, 47 and 49) pivotally connected thereto. The latter bar is provided with elongated slots which are guided on stationary pins 676 and 677. The cam bar is normally held by a spring 678 in its illustrated position wherein a cam lobe 1689 thereon upholds a roller 680 mounted on a hook 681 pivoted at 683 to a link 684 and normally urged downward by a spring 685 extending between the hook and the link. Thus, the lobe 1689, upon being removed from under the roller 680, allows a nose 688 on the hook 681 to engage a notch 686 in an aligned link 687 guided for longitudinal movement by the pins 676 and 677. The link 684 is also guided for longitudinal movement by the pins 676 and 677. The link 687 is reciprocated once during each main cycle and for this purpose the link is connected by a pin and slot connection 690 to a cam follower 691 (Figs. 43 and 44) pivoted on a frame stud 692 and provided with rollers 693 and 694 engaging the periphery of complementary drive cams 695 and 696, respectively.

When, due to depression of the bar 13, the cam link 675 is moved rearward to drop the hook 681 into engagement with the notch 686 in link 687 the two links 684 and 687 will be coupled together so that during the insuing main clutch cycle the cams 695 and 696 will reciprocate both links. Link 684 is connected through a pin and slot connection 697 (Fig. 43) to a cam plate 698. The latter is fastened to one end of a shaft 699 rockably mounted in suitable bearings (not shown) in the machine side frames. A second cam plate similar to plate 698 but not shown is fastened to the other end of the shaft 699. The cam plates and link 684 are urged rearward by a spring 1677. Each of the cam plates has a cam slot 700 formed therein and embracing a roller 701 mounted on opposite ends of a shaft 702 (see also Fig. 46) whereby to raise and lower the shaft. The shaft is also guided in vertically extending slots 704 in the hereinbefore mentioned spaced machine side frames 143 so that as the cam plates are rocked clockwise the cam slots will lower the shaft along the slots 704. A plurality of ordinally arranged gears 703 are rotatably mounted on the shaft 702 and are in continuous mesh with gear sections 40a on the racks 40.

Each of the main racks 35 is provided with a rack gear section 705 which is in continuous mesh with an associated idler pinion 706 rotatably mounted on a stationary rod 707 and located in juxtaposition with the associated multiplicand rack 40. The diametral pitch of the pinions 706 and the rack gear sections 705 are the same and the disposition of the gear teeth thereon is such that when these parts are in their illustrated home positions, the teeth of both the pinions 706 and the teeth 40a of the racks 40 will be aligned vertically. Therefore, as the shaft 702 moves downward to its alternate dot and dash line position 702a (Fig. 2), the various pinions 703 thereon roll downwardly along the teeth of the multiplicand racks until they move into mesh with the idlers 706, thereby constituting an operative connection between the main racks 35 and the multiplicand racks 40.

It will be noted on reference to the timing chart (Fig. 74) that the above described meshing operation will take place during the second half of the main clutch cycle, after the various main racks 35 have been differentially advanced forwardly. Therefore, it is during the return movement of the racks 35 that the multiplicand racks 40 will be coupled thereto and accordingly positioned vertically from their upper illustrated home positions amounts corresponding to the values of the different multiplicand digits. Each of the racks 40 is provided with a vertical slot 1100 which is guided over stationary rods 1101 and 1102 extending across the machine and supported in a suitable manner (not shown) in the machine side frames.

Figure 43:
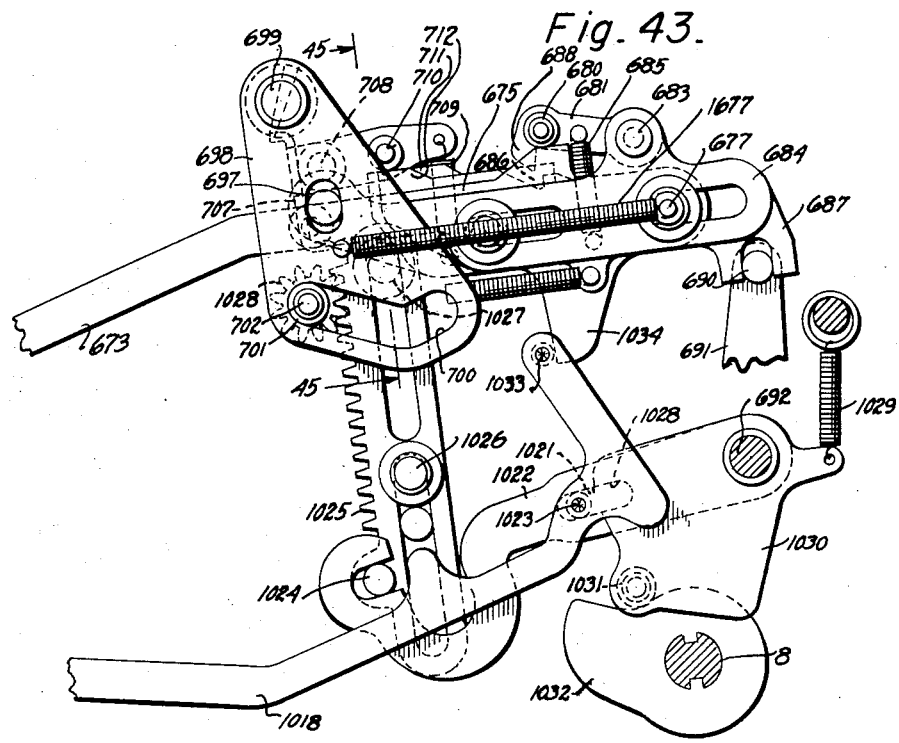
Fig. 43 is a side elevation of the mechanism for entering and clearing multiplicand factors in and from the machine.
Figure 44:
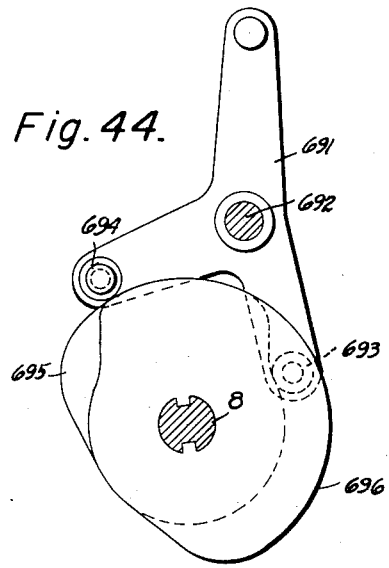
Fig. 44 is a detailed view of the cam drive for operating the multiplicand factor entry controls.
Figure 45:
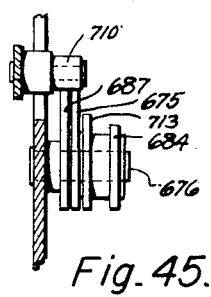
Fig. 45 is a transverse sectional view taken along the line 45—45 of Fig. 43.
Figure 46:
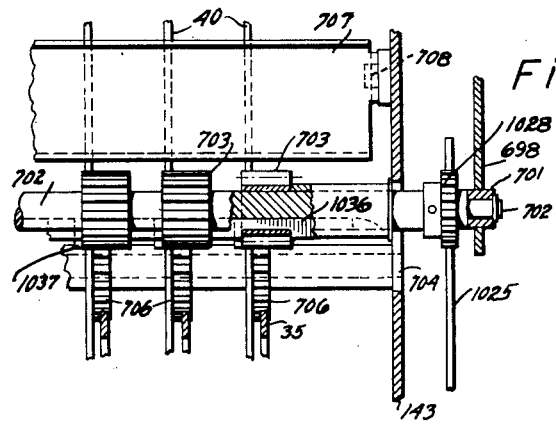
Fig. 46 is a front view, partly in section and partly broken away, illustrating the mechanism for coupling the main racks to the multiplicand racks for entering multiplicand factors into the latter.

Means are provided for locking the various multiplicand racks 40 in their home positions illustrated in Fig. 2 or any other positions to which they may be adjusted. Referring to Figs. 2, 43 and 46, a rack lock bail 707 is pivotally supported on trunnion bearing 708 mounted on the machine side frames 143. The bail is urged clockwise toward a position out of engagement with the various multiplicand racks 40 by a spring 709 but is provided with a roller 710 which normally rests on cam lobes 711 and 712 formed on the previously described link 687 and a second link 713, respectively, both being guided for longitudinal movement by the stationary pins 676 and 677. The link 713 is urged toward the front of the machine by a spring 714 against a stud 715 mounted on the aforementioned link 675 (Fig. 47). Therefore, at the start of a first factor entry operation the rearward movement of the link 675 caused by depression of the bar 13 will, through stud 715, force the link 713 rearward to remove the cam lobe 712 from below the roller 710 on the lock bail, leaving the same to be supported solely by the link 687. During the second half of the main cycle, the link 687 is moved forward, forcing the lobe 711 out from under the roller 710 on the lock bail so that the bail may move out of locking engagement with the racks 40 just as the latter are entrained with the main racks 35. The lock bail will remain out of engagement with the racks 40 until near the end of the cycle at which time the link 687 will be returned rearward, causing its cam lobe to force the bail into locking position.

20. *Multiplier entering means*

The entry of the multiplier or second factor into the various racks 35 which form the multiplier receiving device is accomplished by depression of the "second factor" bar 14 (Figs. 1, 34 and 35). This bar also initiates the multiplication operation by conditioning the main clutch to effect engagement of the multiplier clutch so as to drive the multiplying instrumentalities of the machine.

The stem of the bar 14 is connected to the hereinbefore mentioned bellcrank 497 through a pin and slot connection 716 and upon depression of the bar against the action of its spring 719 to its latched position, it will rock the bellcrank to draw the link 496 (see also Fig. 30) forward so as to move the pin 495 thereon to a position within the slot 494 of lever 492 wherein it overlies the tail of a bellcrank 717 (see also Fig. 29) which is pivoted on the frame stud 471 and urged clockwise into its illustrated position by a tension spring 718 extending between the bellcrank and the frame stud 474. Since the bar 14 is held depressed throughout the multiplication operation the pin 495 will be retained over the tail of bellcrank 717 until the end of the operation.

It will be noted on reference to Fig. 34 that the pivot pin 720 which connects the link 496 to the bellcrank 497 extends into a notch in the clutch control bar 461 so that as the second factor bar 14 is depressed this pin will draw the clutch control bar 461 forward causing engagement of the main clutch and operation of the motor in the same manner as described in connection with the add and first factor entry operations.

Operation of the main clutch, through the rack drive means hereinbefore described, causes the main racks 35 to differentially advance to positions controlled by depressed ones of the amount keys during the first phase of the clutch, so as to mechanically represent the values of the multiplier factor set up in the keyboard. However, since the clutch is arrested at the end of its first phase or 180 degrees of movement in the manner to be described presently the racks will be retained in their advanced positions throughout the succeeding multiplication operation by the lock bail 149 (Fig. 3).

During a multiplication operation the motor 420 (Fig. 29) is maintained in constant operation and for this purpose means are provided for holding the motor switch 485 (Fig. 32) closed until the main clutch returns to its home or 360° position. As shown in Fig. 32 a cam 1476 is keyed on the main shaft 8 and is engaged by a roller 1477 on the aforementioned bail 475. The cam 1476 is so shaped that when the main clutch is in its half cycle position the cam will hold the bail 475 rocked counter-clockwise to maintain the switch 485 closed.

21. *Engagement of multiplier clutch*

In multiplication operations the multiplier clutch 9 (Fig. 29) is automatically engaged as the main clutch 7 nears the end of its first phase or 180 degree position. Thereafter, the multiplier clutch cycles until completion of the multiplication operation, the number of cycles thereof depending on the number of significant digits in the multiplier factor. Thereafter, the multiplier clutch is disengaged and the main clutch is reengaged to complete its second phase of 180 degrees of motion so as to return to its full cycle position.

Toward the end of the first 180 degrees of movement of the main clutch, the ear 5010 (Fig. 30) of member 4910 will cam the lever 492 counter-clockwise causing the pin 495 which is now located over the tail of bellcrank 717 to rock the latter, which, through link 721 (Fig. 29) connected between the bellcrank and an ear 722 of the multiplier clutch control lever 723, will rock the latter against the action of its spring 725 so as to cause engagement of the multiplier clutch 9.

A lever 726, similar to the lever 492, is pivoted on frame stud 724 and is urged clockwise by a spring 736 to limit against a frame stud 726a. The lever is provided with an elongated slot which guides a pin 727 carried by a link 728 which is pivotally connected to a bellcrank 729. The bellcrank is fulcrumed at 731 and is urged clockwise by spring 732 so as to normally hold the pin 727 in its rearward illustrated position wherein it overlies the tail of the clutch control lever 723.

Keyed on the multiplier shaft 10 is a member 733 having an ear 734 which will cam the lever 726 counter-clockwise just prior to the end of a multiplier clutch cycle, thereby causing the pin 727 to hold the clutch lever 723 away from the periphery of the clutch disc as the indentation therein moves past to thereby reinitiate a new clutch cycle. This recycling of the multiplier clutch will continue until the multiplicand has been multiplied by each significant digit of the multiplier at which time the bellcrank 729 is rocked counter-clockwise as will be described hereinafter to position the pin 727 in the forward end of the slot in the lever 726 and in a position overlying the tail of a bellcrank 735. The latter is normally held in the position shown wherein it limits against the stud 726a by spring 1736 and is connected by a link 738 to a bail 740 pivoted on the rod 471. Now, as the clutch approaches the end of its final cycle the member 733 on shaft 10 will again rock the lever 726 but since the clutch lever 723 is not held away from the periphery of the clutch at this time the clutch will be automatically disengaged. On the other hand, the bellcrank 735 will be rocked by pin 727, forcing a bent over projection 738a on the link 738 to engage the ear 470 of the main clutch control lever 433 to reengage the latter clutch for its second 180 degrees of operation.

22. Contact carriage

As described hereinbefore, the ordinally arranged partial product circuit selecting contact elements 654 (Fig. 3) are adjusted coordinately, in a vertical direction in accordance with multiplicand values and in a horizontal direction in accordance with multiplier values. For this purpose, the contact elements are movable along horizontally extending slots 742 in the racks 40 and along vertical slots 743 in ordinally arranged plates 744 juxtaposed the racks 40.

The various plates 744 are fixed in spaced relation to each other on rods 745 and 746 (Figs. 2 and 3), the assembly thus formed constituting what will hereinafter be termed a contact carriage. The rods 745 and 746 are guided fore and aft in elongated slots 747 and 748, respectively, formed in the machine side frames 143 whereby the carriage may be moved horizontally to concomitantly carry the contact elements 654 into alignment with different ones of vertical rows of partial product circuit terminals 655U and 655T. Suitable means, i. e. insulated rollers (not shown) carried by the rods and movable in the slots 747 and 748, are provided to electrically insulate the contact carriage from the frame of the machine.

Referring to Fig. 56, each contact element 654 comprises a flanged sleeve 749 slidably fitted within the slot 743 of the associated carriage plate 744 whereby to vertically guide the element. A circular spring element 750 of thin springy material is fixed to the sleeve and presses against the side of the plate 744 whereby to insure an electrical contact between the plate and the sleeve. An annular grooved spool 751 of insulating material is mounted on the sleeve 749 and is slidably fitted within the slot 742 of the associated rack 40 whereby to guide element along the slot 742 while electrically insulating the same from the rack. Located within the sleeve 747 are a pair of metallic balls 752 pressed outward by springs 753 to insure intimate electrical contact with aligned ones of the various partial product circuit terminal contacts 655u and 655t. The assembly thus formed, forms an electrical circuit between the carriage assembly plates 744 and aligned ones of the contacts 655u and 655t.

23. Means for sequentially setting contact carriage in accordance with different multiplier digits As previously described, multiplication is performed by successively multiplying all digits of the multiplicand by the successive digits of the multiplier, i. e. by one multiplier digit at a time, and consequently means are provided for sequentially causing successive ones of the racks 35 to control fore and aft positioning of the contact carriage. When a rack 35 is retained in a position representing a multiplier digit of zero, the control means will not shift the contact carriage in accordance therewith but will transfer control to the next higher order rack 35 and no idle multiplier cycle will occur in accordance with said zero multiplier digit.

Referring to Figs. 2 and 58, a vertically shiftable control plate 754 extends across the machine and is mounted on rollers 755 on one side and 756 on the other, said rollers being guided within vertically extending slots 757I (see also Fig. 62) formed in the machine side frame 143.

The plate 754 is guided vertically in parallel movement by yoked arms 757 and 758 (Figs. 34 and 8, respectively) on opposite sides of the machine and embracing the upper ones of the rollers 755 and 756, respectively. The arms are both secured to a rockable shaft 760 to which is also secured an arm 761 urged clockwise by a spring 762 tensioned between the arm and the pivot stud 134a connecting the cam follower 134 with the link 135 whereby to urge the plate 754 downwardly.

Two separate devices are provided to normally hold the plate 754 in its raised position illustrated in the drawings. As shown in Fig. 8, a yoked arm 763 is pivoted to one arm of the cam follower 134 and embraces a roller 764 on the arm 761. The arm 763 and follower 134 form a toggle which, when the main clutch is in full cycle position holds the yoked arm against the roller 764 to maintain the plate in its raised position, but during a main cycle, the cam follower rocks counter-clockwise moving the arm 763 to the position illustrated by the dot and dash lines 763a. During operation of the multiplication instrumentalities of the machine the main shaft 8 will be held in half cycle position and thus will retain the arm 763 in its lowered position so as to allow the plate 754 to be moved downward if not otherwise restrained.

A second device is provided to prevent downward movement of the plate 754 except during multiplication. As shown in Fig. 34, a latch 765 is pivoted on stud 766 and is connected to the second factor key operated bellcrank 491 by a link 770. The latter is pivotally connected by a pin 772 to the latch. Upon depression of the second factor bar 14 the link 770 will be drawn forwardly, rocking the latch to release the arm 757 to permit the plate 754 to move downwardly when the main shaft is rotated sufficiently to cause the cam follower 134 to permit this action.

Referring to Fig. 58, it will be noted that the plate 754 is provided with a series of ordinally arranged L-shaped notches 774, the notches being arranged in echelon, progressing upwardly from the right or lowermost decimal order. The path of movement of the vertical leg of each notch is located in alignment with the nose 775 of an advance sensing lever 776 (Figs. 2 and 10) pivoted at 777 and urged counter-clockwise by a spring 778.

The advance sensing levers 776 as well as selection control levers 780, also pivoted at 777 in juxtaposition with the levers 776 and urged counter-clockwise by spring 788, are normally held outward in the positions illustrated in Fig. 2 by a bail 781 pivotally supported on the machine side frames by trunnion bearings, one of which is shown at 782 in Fig. 8. The bail is connected by a link 783 (Figs. 8 and 18) to a bellcrank 784 pivotally supported on a frame pin 1785. A roller 1786 on the bellcrank rides on the periphery of the cam 113. Upon movement of the main shaft 8 to its half cycle position, a spring 785 connected to the bellcrank 784 is allowed to rock the bail 781 rearward until the latter reaches the rearward position illustrated in Fig. 10. The levers 776 and 780 in each order are thus allowed to be moved rearward by their respective springs unless otherwise prevented from doing so as will appear presently.

If all the sensing levers 776 are allowed to move rearward the nose 775 of one only thereof will be able to locate within a notch 774 in the control plate 754 while the remaining noses will merely move into engagement with the surface of the plate either above or below the associated notch, depending on the vertical position of the plate at that time.

Each of the selecting levers 780 also has a nose 786 thereon adapted to move into the horizontally extending portion of the aligned notch 774 in the plate 754 after the associated advance sensing lever has moved inward to block the downward movement of the plate.

Means are provided for preventing a pair of levers 776 and 780 from blocking downward movement of the plate 754 if the associated rack is located in its zero or home position. For this purpose, an ear 791 on each rack is adapted to underlie a nose 790 on the associated lever 780 when the rack is located in zero position. Thus, the selecting lever 780 is held outward against the action of its spring 789, while the latter, in turn, will hold the associated sensing lever 776 out by virtue of an ear 792 thereon overlying the lever 780. In this condition, the notch 774 in plate 754 aligned therewith will not be engaged and the plate 754 will be permitted to be moved downward, until another notch 774 therein will be engaged by a pair of levers 776 and 780 in a higher decimal order. However, if the associated rack 35 is moved to a position representing the value of one or any other significant digit, the ear 791 thereon will be removed from under the nose 790 of the associated selecting lever 780 and when the bail 781 is rocked counter-clockwise, this lever as well as its associated sensing lever will be allowed to be moved inwardly into potential or actual blocking position.

The plate 754, in conjunction with the various ordinally arranged sets of levers 776 and 780, form the means for sequentially causing the different racks, starting from the lower or right hand decimal order to control the multiplication operation. For this purpose, the levers 776 and 780 are provided with pear shaped slots 793 and 794, respectively, therein, through both of which extends a pin 795 mounted on the lower end of a cam link 796. The upper end of the link carries a pin 797 which is electrically insulated therefrom in any suitable manner. The pin 797 is slidable along a vertical slot 798 in the associated contact carriage plate 744 and extends into a triangular camming aperture 800 in the associated rack 35.

The pin 795 in the lower end of each link 796 also extends through an arcuate slot 801 formed in a juxtaposed lever 802 which is securely fastened to a rockable shaft 803, there being a lever in each order of the machine. The slot 801 is provided with a shoulder 804 under which the pin 795 is urged by a spring 805 which also normally maintains a link 796 in its raised position illustrated in Fig. 2. However, the slot 794 in the lever 780 normally prevents the pin 795 from moving to a position under the shoulder 804 unless the two levers 776 and 780 are allowed to rock into their blocking relationship with the plate 754 as shown in Fig. 10.

The shaft 803 and the various arms 802 secured thereto are oscillated clockwise from and to the position illustrated in Figs. 2 and 10 once during each multiplying cycle. Therefore, when any set of levers 776 and 780 have moved counter-clockwise into actual blocking positions relative to the plate 754, the associated pin 795 will have been positioned below the shoulder 804 of the associated lever 802 and during the ensuing oscillation of the shaft 803 the shoulder 804 of the associated lever will engage the pin 795 to draw the link 796 downwardly.

If the contact carriage is in a position numerically corresponding to the numerical position of the rack 35 which is in control, the slot 798 in the associate carriage plate 744 will be aligned with a short vertical notch 806 located at the apex of the triangular aperture 800 and consequently as the pin 797 is drawn downwardly it will move into said notch and the contact carriage will not be moved. However, if the multiplier carriage is in position other than that corresponding to the position of the main rack which is in control, the pin 797 will, during its downward movement strike the inclined edge of the triangular aperture and will cam along said edge, thereby moving the contact carriage fore and aft until the pin moves into the notch 806, whereupon the contact carriage will have located the various contact elements 654 in alignment with vertical rows of contacts 655U and 655T corresponding to the numerical position of the controlling rack.

From the foregoing it will be seen that only one rack can be in control at any one time and that since the levers 776 and 780 of the lowest decimal order are in condition to first move into blocking relation with the plate 754, the lowermost order rack will be conditioned to first control the position of the contact carriage. However, if the lowest order rack is retained in its zero position, its ear 791 will prevent the associated levers from rocking into blocking relation with the control plate 754 and consequently the associated link 796 will not be actuated to set the contact carriage. In such case, the plate will move downward until it is arrested by the next highest order set of sensing and selecting levers whose associated rack 35 has been moved out of its home or zero position. Consequently, during the ensuing multiplier cycle, the link 796 of that order will be drawn downward by the associated lever 802 to move the contact carriage to a position corresponding to the rack position.

It should be noted at this point that the purpose of the two levers 776 and 780 in each order is to insure proper blocking of the plate 754 in the event that it has been enabled to gain an excessive amount of speed due to the holding of a number of adjacent sets of sensing and selecting levers from moving to blocking positions. That is, the advance sensing lever 776 is assured of moving into blocking relation with an associated notch in the plate 754 since the nose thereof is allowed considerable time to move into the vertical portion of the slot 774. Also, the sensing lever need travel only a slight distance to assume its blocking position. Thereafter, the lever 780 may move through its comparatively longer stroke to position its nose 786 in the horizontal portion of the aligned notch 774 and to locate the pin 795 under the shoulder 804 of the associated lever 802.

Toward the end of the downward stroke of a lever 802 which is driving an associated link 796, the pin 795 of the link will cam along the forward edges of, first, the slot 794 (Fig. 10) and thereafter the slot 793 in the levers 780 and 776, respectively, drawing the levers out of their blocking positions relative to the plate 754 so that the latter will be free to move downward until blocked by the sensing and selecting levers of the next higher order which contains a significant multiplier digit. As the levers 802 return to their illustrated positions the noses of the levers 776 and 780 which were retracted will now be allowed to again ride on the surface of the plate but will be ineffective thereafter from locking the same since they will be located above their aligned notch 774.

Describing now the means for oscillating the shaft 803, reference is had to Fig. 8, in which it will be seen that the shaft 803 has secured thereto an arm 810 connected by a link 811 to a cam follower 812 pivoted at 813 and urged counterclockwise by a spring 814 to hold a roller 815 thereon against the periphery of a cam 816 keyed on the multiplier shaft 10.

Means are provided for locking the contact carriage in any of the various positions to which it may be moved by the above described positioning mechanism. Referring to Fig. 67 a ratchet bar 1150 is suitably fixed to the bars 745 and 746 of the contact carriage and has formed therein a series of detents 1151, the spacings of which are equal to the spacings of the numerical positions of the main racks 35 and the contact carriage. One of said detents, depending on the position to which the contact carriage is adjusted, is engaged by a tooth 1152 on a centralizer lever 1153 pivotally supported at 1154 and urged clockwise by a spring 1155 to hold a roller thereon in engagement with the periphery of a lock cam 1157.

24. *Partial products electrical system*

Previous sections have described the manner in which the various contact elements 654 (Figs. 2 and 56) in the different orders are individually moved vertically in accordance with the values of the different digits of a multiplicand factor and fore and aft in unison in accordance with the values of a multiplier digit. The arrangement and construction of the partial product circuits which are selectively conditioned by such contact elements will now be described.

In each order are located two parallel plates 820 and 821 (Figs. 55 to 57) of insulating material, termed the units and tens plates, respectively. Both plates include, as described hereinbefore, coordinately arranged contacts 655U and 655T, respectively, forming terminals for the partial products circuits. These contacts are arranged in nine vertical rows and are arranged in such a manner that when the contact carriage is adjusted to a corresponding main rack position of "1" the associated contact element 654 will be aligned with the rearmost rows of contacts 655U and 655T whereas when the contact carriage is adjusted to a "9" position the contact element 654 will be aligned with the foremost vertical rows of contacts.

On the other hand, the contacts are arranged in ten horizontal rows so arranged that when a multiplicand rack 40 is adjusted to represent "0" the associated contact element 654 is aligned with the top row of contacts whereas when the rack is adjusted to represent "9" the corresponding contact element is aligned with the bottom row. This arrangement is graphically indicated in the diagrammatic views of Figs. 63 and 64.

Describing now the construction of the units partial product plate 820, reference is had to Figs. 2, 54, 56 and 57 in particular wherein it will be noted that the head of each contact 655U is square. The shank of each contact extends through aligned apertures in a plurality of plates comprising alternately arranged metal plates 822 and insulating plates 823 of suitable insulating material.

There are nine metal plates representing the units partial product digits of zero to eight, inclusive, counting from the left of Fig. 56, and these plates are electrically connected to the shanks of different contacts 655U in accordance with the units components of the partial products of the multiplication tables. This is accomplished by forming the apertures which are to be electrically connected to certain of the contacts 655U in such manner that each plate must be forced over the shanks of such contacts so as to provide an electrical connection between the same. This is indicated at 824 (Figs. 54 and 56), while those apertures which are not to be electrically connected to the associated contacts are enlarged as shown at 825. In this manner any combination of connections may be made as desired while the shanks of all of the contacts 655 may be made of uniform lengths.

Fig. 54 illustrates the "2" partial product plate in which the plate is connected to twelve of the contacts 655U representing twelve combinations of multiplier and multiplicand digits whose partial products include a unit component of "2." This plate is also diagramatically indicated at 826 in Fig. 64 in which are also diagramatically illustrated in the upper row thereof the other plates of the units component partial product plate assembly. The manner in which the different plates are connected to the different contacts are indicated by black dots, and the coordinate positions of the various contacts are indicated by numerals at the left of the series of illustrations (representative of the values of multiplicand digits) and at the top of the illustrations (representative of the values of multiplier digits). For example, if a contact element 654 has been set in accordance with a "4" multiplier digit and "3" multiplicand digit it would be aligned with a contact indicated at 655a (Fig. 64) which is electrically connected to the "2" digits plate 826 representing the units component of the partial product of "12." In this respect the numerical value of the different plates illustrated in Fig. 64 are indicated above the plates.

The different plates 822 are electrically connected to different ones of the aforementioned terminal strips 656 also mounted on the plate 820 through rivets 827 in a manner similar to the connections between the plates 822 and the shanks of the contacts 655U. Such a connection is shown at 828 in Figs. 54 and 56.

It should be noted that the plates are connected in proper sequence to the various terminal strips 656. That is, the zero digit or outer plate 822 (indicated at the right of Fig. 64) is connected to the rearmost or "zero" terminal strip 656a (Fig. 57) while the "8" digit plate (indicated at the left of Fig. 64) is connected to the "8" terminal strip, etc. The "nine" terminal strip 656c is not connected to any of the plates but is instead directly connected through conductor 819 (see also Fig. 63) to one side of the secondary winding of a transformer 836, the primary winding of which is located in the power circuit 837 for the machine.

Describing now the tens component partial products plates reference is had to Figs. 55 and 56. The plates 821 of suitable insulating material are also provided with coordinately arranged contacts 655T axially aligned with the contacts 655U of the units partial products plate assemblies.

The contacts 655T are attached at the rear of the plate 821 to different ones of a series of metal plates 830, all located in the same plane. The plates 830 are so shaped as to cover the different contacts 655T in accordance with the tens components of the multiplication tables and are electrically insulated from each other.

The manner in which the different plates are connected to the different contacts are shown in Fig. 64 below the diagrammatic representation of the units partial products plates. The connections between the contacts 655T and the various plates is indicated by black dots and the coordinate positions of the various contacts are indicated by numerals at the left of the series of illustrations (representative of the values of multiplicand digits) and at the top of the diagrammatic illustrations of the units plates (representative of the values of multiplier digits). For example, if a contact element 654 has been set in accordance with the above example comprising a "three" multiplicand digit and "four" multiplier digit it will be aligned with a tens contact indicated at 655b which is connected to the "one" digit plate.

The different plates 830 are electrically connected to different ones of the terminal strips 834 for the tens component plate through rivets 835, progressing toward the front. For example, the "zero" digit plate 830b (see also Fig. 64) is connected to the rearmost or zero strip 834a (Fig. 55) while the "eight" digit plate 834d is connected to the foremost or "eight" terminal strip 834b. Although there is no "nine" tens component of a partial product the strip 834b is formed by double width to merely form a track for the associated roller 663 as it rolls over the various strips, it being understood that a circuit will in any event be completed through a tens partial product circuit before the roller reaches its "nine" position.

Also mounted on the plate 821 is a metallic feeder strip 838 attached thereto by rivets 840 insulated from each of the plates 830. This strip is formed as shown in Fig. 56 and is continuously engaged by the contact roller 662 as it moves fore and aft along the terminal strips 656 of the units partial product plate assembly during actuation of the partial product accumulator as will appear later. The roller thus presses against both the feeder strip 838 and the different ones of the terminal strips 656 and thus sequentially connects the different terminal strips to the feeder strip. Likewise, a feeder strip 839 is provided for the terminal of each tens partial product plate assembly strips 834 and is mounted on the units plate 820 by rivets 841. The construction of the terminal strips 834 and feeder strips 839 is the same as that of the strips 656 and feeder strip 838 so that as the contact roller 663 moves therealong it sequentially and electrically connects the various terminal strips 839 to the feeder strip 834.

25. *Denomination shift switch*

Since the differernt partial products of a multiplication problem must be sequentially entered into successively higher orders of the partial product accumulator 6 (Fig. 3), means are provided for shifting the connections between the partial product circuits and the control means for the various orders of the partial products accumulator.

It should be noted at this point that the feeder strips 839 (Figs. 56 and 57) are connected in a manner to be described later to certain of the electromagnetic control devices 660 (Fig. 3) while the feeder strips 838 (Figs. 55 and 56) are similarly connected to certain of the electromagnetic control devices 661 to energize such devices when their associated orders of the partial product accumulator 6 have registered the proper partial products values, and it is these connections which must be shifted to accomplish the above result.

Referring to Figs. 2 and 59 there is attached across the forward edges of the partial product plates 820 and 821 a plate 832 of insulating material to which are attached a series of diagonally extending conducting bars 833 (see also Fig. 60). These bars are located in the rear of the plate and have tabs 1834 extending therefrom through apertures in the plate. The tabs are bent over the forward face of the plate to form contact terminals. It will be noted by following any conductor bar 833 that the tabs thereon are alternately bent in opposite directions so as to firmly hold the bar in position. Also, it will be noted that the tabs on any one bar are ordinarily spaced and the tabs of two adjacent conductor bars are located in side by side relation in each order, thereby forming two groups of tabs in each order.

The different conductor bars 833 are connected to different ones of the feeder strips 838 and 839 of the various units and tens partial product plate assemblies, the different bars, counting from the bottom, being alternately connected to the units and tens feeder strips 838 and 839, respectively, of the different partial product assemblies from the lowermost or "cents" order. This arrangement is illustrated diagrammatically in Fig. 63 wherein it will be noted that the lowermost diagonal bar is permanently connected by a conductor 842 to the units feeder strip 838 for the lowermost "cents" order partial product plate circuit assembly (not shown in Fig. 63). The next higher diagonal bar is connected by a conductor 842a to the tens feeder strip 839, also for the lowermost "cents" partial product plate circuit assembly. Likewise, the next higher conductor bar 833 is connected by a conductor 843 to the feeder strip 838 for the units partial product plate assembly of the "dimes" order, the latter plate assembly being illustrated at the top of the partial product plate assemblies shown in Fig. 63. Also, the next higher conductor bar is connected by a conductor 844 to the feeder strip 839 for the tens partial product plate assembly of the "dimes" order, the latter plate assembly being illustrated next to the uppermost partial product plate assembly shown in Fig. 63. This arrangement of connections is similar for the sequentially higher conductor bars 833 and the higher orders of partial product plate assemblies.

Attached to the plate 832 above and below the conductor bars 833 are two triangular metal plates 1800 and 1801, respectively, insulated from the conductor bars. The two plates are electrically connected together by a conductor 1803 and are electrically connected by conductor 1268 to the contact elements 654.

Parallel to the plate 832 (Fig. 2) is a second plate 845 also of insulating material stationarily mounted in the machine. Fixed to the plate are a plurality of vertically extending metallic conductor strips 846 which are aligned with the different ones of the vertically extending groups of conductors tabs 1834 as shown by the dotted lines in the diagrammatic view of Fig. 63. One strip 846 in each order is connected by a conductor 847 to a terminal of a units control electromagnetic device 660 while the second strip in each order is connected by a conductor 847a to a terminal of a tens electromagnetic control device 661 in the corresponding order of the accumulator.

Intermediate the plates 832 and 846 is a denomination shift switch in the form of a bar 848 (Figs. 2 and 59). This bar is formed of insulating material and is guided in a vertical direction in a manner similar to that of the control plate 754 (Fig. 58). For this purpose, the plate is provided with a pair of rollers 850 on each end thereof (Figs. 9 and 62). The latter rollers are guided in vertical slots 851 formed in the machine side frames 143, the latter extending parallel to the aforementioned slots 757 for the plate 754.

Means are provided to maintain parallel movement of the bar in its up and down travel and comprises yoked arms 852 (Figs. 9 and 62) at opposite ends thereof. The arms are fastened to opposite ends of a rockable shaft 853 and embrace at their outer ends the lower ones of the rollers 850.

The switch bar 848 is normally caused to follow the multiplier digit selecting plate 754 in its downward movement and for this purpose there is provided an arm 854 fixed to the shaft 853 and urged clockwise by a spring 855 tensioned between the arm and the pivot pin 134a connecting link 135 and cam follower 134. The downward movement of the switch bar is limited and controlled by a stop 856 fixed on the bearing studs for the rollers 755 for guiding the plate 754. The bar 856 has a foot 857 underlying one of the rollers 850 whereby the shift bar 848 will tend to follow the plate 754. However, as will be explained hereinafter, there are times in which the selector plate will advance ahead of the switch bar. In general, it will be seen that as the plate 754 is successively lowered to select successively higher order racks 35 which represent significant digits, the switch bar 848 will be lowered therewith to successively transfer the partial product accumulator control to successively higher orders in echelon of the accumulator.

The switch bar 848 (Figs. 2 and 59) has a series of grooves 859 therein, two for each order in which are fitted spring clips 861 which press outwardly so as to engage on one side thereof aligned ones of the tabs 1834 and on the other side aligned ones of the vertical strips 846 thereby forming electrical conductors between the strips and different ones of the diagonal bars 832. This arrangement is schematically illustrated in Fig. 63.

Means are provided for locking the switch bar 848 in any of its vertically adjusted positions throughout the major portion of each multiplier cycle even though the control plate 754 is allowed to advance to its next lower position during such portion of the cycle. For this purpose a detent bar 1060 (Fig. 62) is secured to the bearing studs for the rollers 850 and has a plurality of detents therein, any of which is adapted to be engaged by a lock pawl 1061 pivotally supported at 1062 and urged out of engagement with the bar by a spring 1063 and connected by a pin and slot connection 1064 to a cam follower 1065 fulcrumed at 1066 and provided with a roller 1067 which rides on the periphery of a lock cam 1068 keyed on the multiplier shaft 10.

26. Actuator for partial product accumulator

The accumulator generally indicated at 6 (Fig. 3) for summing the various partial products of a multiplication is differentially driven during each multiplication cycle in accordance with the units and tens components of the partial product values obtained by multiplying all of the digits of a multiplicand factor by successively selected digits of the multiplier factor.

Referring to Fig. 3 the accumulator 6, which will be described in detail hereinafter, comprises a plurality of ordinally located accumulator gears 861, each of which meshes with a compound idler comprising integrally attached gears 862 and 863 rotatably mounted on a rod 864. The gear 863 meshes with a drive rack 1864 which is provided with a slot 865 guided over a rod 866, the latter being movable up and down to mesh or demesh the racks with the gear 863 as will be described later.

Rotatably mounted on each rack 864 is a pinion 867 which meshes with rack gear sections on both of the aforementioned upper units component actuator 657 and lower tens component actuator 858. Each of these actuators is provided with an elongated slot 868 movable over spaced stationary grooved guide rods 870 to guide the actuators longitudinally.

A pin 871 on each of the upper actuators 857 is adapted to be engaged by a hook 872 for the purpose of driving the actuator. The hook is pivoted at 873 to a juxtaposed T-shaped plate 874 of a constant excursion drive carriage forming the drive means 659. A second hook 875 in each order is also pivoted on the juxtaposed plate 874 for the purpose of driving the lower actuator 858. Both hooks are pressed outward against the pins 871 carried on the actuators by a spring 876.

The constant excursion carriage 659 comprises spaced rods 877 and 878 on which the T-shaped plates 874 are fixedly mounted. The rods extend across the machine and are guided in a fore and aft movement by slots in the machine side frame, as shown in the dot and dash lines 880 of Fig. 68. The rods 877 and 878 are held in spaced relation to each other on opposite ends thereof by links, one of which is shown at 881. Each link is partially split transversely at 882 whereby the length of the link may be adjusted to vary the spacing between the rods.

The carriage 659 is reciprocated once during each multiplier cycle by cams, one of which is shown at 883 in Fig. 68, keyed on the multiplier cam shaft 10 and operating against cam followers 884 pivoted at 885 and provided with tails located behind the carriage rod 878. The cams 883 normally hold the carriage in its forward illustrated position when the multiplier clutch is in full cycle position. During a multiplication cycle the cams first allow the carriage to be drawn rearward by springs, one of which is shown at 896, thereby moving the ordinally located hooks 872 and 875 rearward to positions wherein notches 887 therein are adapted to embrace the pins 871 on the respective actuators 657 and 658 and thus constitute an operative connection between the constant excursion carriage and the actuators.

The carriage 659 also drives the various ordinally arranged contact rollers 662 and 663 (Figs. 2 and 56) along their associated terminal and feeder strips described in a preceding section and for this purpose the rollers are mounted on arms 888 and 890, respectively, of insulating material and pivotally supported on the rod 877 of the carriage and spring pressed outward by a wire spring 891, the ends of which extend between studs 888a and 890a on the respective arms. Therefore, the rollers 662 and 663 are moved along their terminal and feeder strips in timed relation to the movement of the actuators 657 and 658 although the rollers will be moved through a continuous excursion notwithstanding the fact that the actuators may be disconnected at any time during their travel.

Describing now the means for breaking the connection between the hooks 872 and 875 and their respective actuators, declutching arms 891 and 892 are located in each order adjacent the actuators 657 and 658, respectively, and are loosely keyed to rockable shafts 893 and 894. The declutching arms 891 and 892 are similar in construction and urged toward each other by a spring 895 extending between diagonally arranged ears 896 formed on the arms. The upper arm 891 is adapted to be held in an ineffective position (shown in Fig. 3) relative to its associated actuator by either its shaft 893 or a hook 897 fulcrumed at 898 on a U-shaped channel 901 and forming an armature which is controlled by an aligned electromagnet 902 mounted in the frame 901. The armature is urged toward latching engagement with the tail of the associated declutching arm 891 by a spring 900 and is retracted to release the arm when the electro-magnet is energized.

The lower arm 892 and its associated electromagnetic device 661 in each order are constructed in a manner similar to that of the upper arm and electromagnetic control device 660.

When the machine is at rest and during an appreciable portion of a multiplier cycle the declutching arms 891 and 892 are held in their outer ineffective positions through their shafts 893 and 894, respectively, by complementary cams 903 and 904 (Fig. 69) keyed on the multiplier control shaft 10. The cams 903 and 904 are engaged by rollers 905 and 906, respectively, on a cam follower 907 which is keyed to the upper shaft 893. The timing of cams 903 and 904 in their operation of cam follower 907 is shown in the timing diagram of Fig. 75. The cam follower is connected to the lower shaft 894 by an arm 908 keyed on the latter and connected to the cam follower by means of a pin 1910. The pin is mounted on the follower 907 and extends through an angular slot on the arm 908. Therefore, during the latter half of a multiplier cycle the shafts 893 and 894 are rocked toward each other under control of the cams 903 and 904, allowing the arms 891 and 892 to be held outward solely by the armatures 897 of the electromagnetic devices. At this time the carriage 659 (which moved to its rearmost position during the first half of the multiplier cycle wherein the hooks 872 and 875 are coupled to their respective actuators) will now be ready to commence its forward travel.

At this time the power circuit 837 (Fig. 63) will be applied to the contact elements 654 by a multiplying circuit control switch 1070 (Figs. 33 and 63) to be described later. Consequently, with the contact rollers 662 and 663 in their rearward positions in contact with the "zero" terminal strips 656, all of those partial product circuits which are conditioned by the contact elements 654 and whose units or tens components equal "zero" will complete the circuit to the units control or tens control electromagnet 902 in the corresponding actuator order and thus cause the armature thereof to release the associated declutching arm 891 or 892. The arm will then move under the urge of spring 895 and the ear 896 thereof will strike the tail of the associated hook 872 or 875, rocking the latter to disengage the notch 887 therein from the pin on the associated actuator. At the same time, the ear 896 on the declutching arm will move into the first of the plurality of detents 910 formed in the associated actuator thereby locking the latter in position until near the end of the multiplier cycle at which time the declutching arms are returned by the cams 903 and 904 to their outer positions.

As the carriage 659 moves forward, the hooks 872 and 875 will drive all of those associated actuators which are to impart a digitizing movement to the associated orders of the accumulator 6.

Due to the joint control of each accumulator drive rack 1864 by the associated units and tens actuators through the pinion 867, the actuators may both simultaneously drive the associated accumulator element. Also, the relationship of the gearing between the actuators 657 and 658 and the associated orders of the accumulator is such that movement of one of the actuators a distance equal to the spacing between adjacent vertical rows of the contacts 655U will advance the associated accumulator gear 861 one digital increment whereas simultaneous movement of the units and tens actuators in each order a distance equal to said spacing will advance the associated accumulator gear two digital increments.

Now, as a conditioned units or tens component partial product circuit is completed by a respective contact roller 662 or 663, the associated electromagnet 902 will be energized to arrest operation of the associated actuator 657 or 658 after the associaed order of the accumulator has been advanced a number of digital increments equal to the value of the digit of the partial product which is located in that order of the accumulator.

It will be noted on reference to Fig. 63 that the highermost denominational order of the accumulator is controlled solely in response to the tens component of a partial product (through the conductor 847a') the units component of which effects control of the next lower order. Therefore, only the lower electromagnet 902 (see Fig. 3) of such highermost order is effective to control the associated actuator rack 658 and the upper actuator rack 657 is locked in place. For this purpose, the upper electromagent in said highermost order is omitted and the associated pawl 891 is enabled to permanently lock its actuator 657 in place regardless of the rocking movement of the shaft 893. This is preferably accomplished by removing the key in said pawl (in a manner not shown) so that there will be no operative connection between the pawl and the shaft.

Means are provided for locking the different orders of the accumulator 6 except during entry of the values therein or during totaling therefrom. For this purpose, a locking bail 911 (Figs. 3 and 69) is provided which is adapted to engage between adjacent teeth of the idlers 862, the latter being in continual mesh with the accumulator gears 861. The bail 911 extends across the machine and is supported at opposite ends adjacent its forward edge by links, one of which is shown at 912 pivotally supported at 913. The rear edge of the link is supported at opposite ends by bellcranks one of which is illustrated at 915 pivoted at 916. The links 912 and bellcranks 915 form substantially parallel linkage for supporting the bail for movement toward and away from the idlers. The bail 911 is normally held in mesh with the idlers by a spring 917 attached to the bellcrank 915 but is moved out of detenting position by cam levers, one of which is illustrated at 918. Each cam lever is pivotally supported at 920 and provided with a camming surface 921 which engages a roller 922 mounted on a stud forming the pivotal connection between the link 912 and the bail 911. The forward end of the lever 918 is provided with a slot 923 which embraces the pin 919 on the cam follower 907 so that during rocking movement of the latter to release the declutching arms 891 and 892 (Fig. 3) the lever 918 will be rocked counter-clockwise to cause the camming surface 921 to cam the gate 911 out of detenting position.

The levers 918 also control the position of the aforementioned rod 866 (see also Fig. 3) which raises and lowers the various drive racks 1864 into and out of mesh with the pinions 863. For this purpose the levers 918 overlie the rod 866 and, when the machine is at rest, the levers 918 will be held in a clockwise rocked position shown to hold the rod 866 in a lowered position against the action of springs 924. The rod 866 is guided in vertically extending guide slots 825 formed in the machine side frames 143, thereby holding the racks 1864 in a lowered position.

The rod 866 also controls the multiplying circuit switch 1070 (Figs. 33 and 63). For this purpose the rod underlies a lever 1071 pivoted at 1072 and urged counter-clockwise by a spring 1073. An ear 1074 on the lever overlies a plunger of the switch 1070, the latter being of the normally closed type, similar to that of 435 (Fig. 32) which, when its plunger is allowed to raise by virtue of the upward movement of rod 866 will close the power circuit for the multiplying instrumentalities.

27. *Partial products accumulator*

The accumulator, generally indicated at 6 (Fig. 3), for accumulating the various partial products of a multiplication operation is of the duplexing type in which the digitizing and transfer operations may be simultaneously carried out, thereby obviating the necessity of providing separate times for digitizing and tens transfer operations.

The accumulator is disclosed in detail in Figs. 70 to 73, inclusive, and comprises the aforementioned ordinally arranged gears 861 forming part of gear assemblies rotatably mounted on a rod 926 which extends across the machine and is mounted in a plurality of ordinally arranged brace plates 927. The latter plates are held in spaced relation by spacing combs of well known construction, indicated at 928 (Fig. 3) retained in position by retaining and supporting rods 929. Also extending through the various brace plates 927 are support rods 931 and 932, and the assembly thus formed is secured in a suitable manner (not shown) to the machine side frames.

Each ordinal accumulator unit, of which the gear 861 is the driving element, comprises a planetary gear hub 933 on which the gear 861 is suitably secured. The latter gear 861 and hub 933 are rotatably mounted on the hub of a sun gear 935, which in turn, is rotatably mounted on the hub 947 of a gear segment 948 to be described later. The hub 933 carries a pair of diametrically opposed pins 934 on which are rotatably mounted planetary gears 935 (see also Fig. 72). The latter mesh with the sun gear 936 and with an internal gear 937 fixed to a cup shaped support plate 938. The gear 937 forms part of what we will term an output gear assembly; the latter comprising, in addition to the gear 937, an output gear 940, a snail cam 941 (see also Fig. 71) and a sun gear 942. These elements are secured in correct angular relation to each other by a pin 943 which extends through apertures in the plate 938, gear 940, snail cam 941 and has a reduced portion which extends intermediate adjacent ones of two of the teeth of the sun gear 942. The output gear assembly is rotatably mounted on the support rod 926 and forms the means from which values can be totaled out of the accumulator and whereby tens units may be transferred from one order to the next higher order.

The output gear 940 is in continual mesh with an idler 944 (see also Fig. 3) rotatably mounted on the support rod 932, while the sun gear 942 meshes with a planetary gear 945 (see also Fig. 71) the hub of which is rotatably mounted in a bearing carried by the above mentioned gear segment 948 (see also Fig. 73) located in the next higher order (the different orders being defined by the brace plates 927).

The planetary gear 945 is fixed to a second planetary gear 945a which meshes with a second internal gear 946 fixed to a cup shaped plate 950. The latter is integrally secured to the hub of the above mentioned sun gear 936.

An operative connection is provided between snail cam 941 located in one order and the gear segment 948 located in the next higher order in order to control the transfer of tens between said orders. This arrangement is illustrated in Figs. 70, 71 and 73, and comprises a cam follower arm 2948, the hub of which is pivoted on the shaft 932, and is provided with a roller 949 which rides on the periphery of the snail cam. The follower 2948 is engaged by an ear 950 carried on a segment lever 951 located in the next higher order. The latter is also pivoted on the rod 932 and urged counter-clockwise by a spring 952 to hold the cam follower against the snail cam. The segment lever 951 is provided with teeth on the lower end thereof which mesh with the teeth of the gear segment 948 and thus the gear segment is adapted to position the planetary gears 945—945a about the pivot rod 926 by amounts controlled by the snail cam 941 in the next lower order.

The various orders of the accumulator are identical to each other. However, in the lowermost order (as indicated at the right of Fig. 70) the ring gear 1946 is always held stationary by a projection 953 suitably secured thereto and extending from the right hand machine side frame (not shown). Also, in the leftmost or highest order (as indicated at the left of Fig. 70) the snail cam follower 2948a is not operatively connected to a next higher order segment lever but is directly urged counter-clockwise by a spring 959 so as to hold its roller against the associated snail cam.

In operation, each accumulator gear 861 is driven by the associated actuator rack 1864 through the compound idlers 862 and 863 and revolves the planetary gears 935 about the support rod 926 as a center. In those orders, for example, the lowermost order, wherein the assembly comprising the sun gear 936 and its integrally attached internal gear 1948 is held fixed, the revolution of the planetary gears 935 will cause them to rotate in mesh with the sun gear 936 and transmit rotation to the ring gear 937 in the same direction that the accumulator gear 861 is driven. The output gear 940, integral with the ring gear 937, is provided with ten teeth and the ratio of the gearing between the gear 940 and the associated rack 1864 is such that for each increment of movement of the rack from one digital position to the next, the gear 940 will be advanced one tooth, provided no tens transfer has been made from the next lower order. Thus the gear 944 is also advanced one tooth for each digital increment. However, this gear has twenty teeth thereon and will therefore make one half revolution during a complete rotation of the output gear 940.

When any given amount is entered into one order of the accumulator, the sun gear 942 in that order will be turned to enter one tenth of this amount into the output assembly of the next higher order through the train of gears comprising planetary gears 945 and 945a, ring gear 1948, sun gear 936 and planetary gear 935. However, this movement will be neutralized or compensated by the snail cam 941 of such lower order and its operative connection to said next higher order gear segment 948 until the lower order has received ten units of digitation (from zero registration) at which time the snail cam will enable a whole digit to be transmitted to the next higher order as will now be described.

Referring to Figs. 71 and 73, the snail cam 941 is illustrated in the position in which it is shown when its associated output gear 940 registers "zero." Now, during entry of a value into the order of the machine in which the snail cam is illustrated the output gear assembly in that order will be advanced and the sun gear 942 will rotate the planetary gears 945 and 945a in an attempt to rotate the ring gear 1948 in the next higher order, represented in Fig. 73, in the same direction. However, as the snail cam, forming part of the output gear assembly, is rotated from its zero position in the direction of the arrow A, it will rock the follower 2948 and the segment lever 951 to rock the gear segment 948 counter-clockwise so as to carry the planetary gears 945 and 945a in a direction opposite to that in which these gears are attempting to drive the ring gear 1948. These movements will neutralize each other so that no movement will be applied to the latter ring gear.

As the output gear assembly passes from "nine" to "zero" registration after being advanced ten increments, the tip 954 of the snail cam passes the roller 949 of the cam follower 2948, allowing the spring 952 to rock the segment lever 951 and, therefore, the gear segment 948 in an opposite direction to that which it was previously rocked and thus drive the planetary gears 945 and 945a about sun gear 942 to transmit one increment of movement through ring gear 1948, sun gear 936 and planetary gears 935 to the output gear assembly of the next higher order.

28. *Entry of new factor during multiplication*

Means are provided for enabling a factor of a new multiplication problem to be entered in the keyboard while a present multiplication problem is being carried out so as to obviate any necessity of waiting until completion of a problem before setting up a new problem in the machine. Referring to Figs. 30 and 40, a lever 1007 is pivoted on the frame stud 724 and is connected to a bellcrank 995 by a link 1008. The bellcrank is pivoted at 571 and has an ear 996 which underlies one arm of a bail 119, the other arm of which supports the link 118.

At the start of a main clutch operation it will be recalled that the cam 113 will cause the cam follower 115 to force the link 117 forward against the action of a spring 115a, whereby, through arm 121 and the linkage shown in Fig. 11, to raise the rack stop bars 109 (Fig. 2) into effective position. Thus when the main clutch is arrested in half cycle position the cam 113 will continue to hold the rack stop control link forward. However, at the start of a multiplier clutch operation, the ear 734 on the member 733 (Fig. 30) will rock lever 1007 to likewise rock bellcrank 995 against the action of a spring 995a so as to raise the link 118, and thus carry the notch in link 117 out of cooperative relation with the rack stop control arm 121. This willy permit the rack stops to move to ineffective positions.

29. *Operation of multiplication control mechanism*

Although the multiplication control mechanism has been described generally and in detail it is believed that a clearer understanding of this mechanism and its operation may be obtained by following a typical problem. For example, in working out a problem of 2.70 × 4.00, the multiplicand or first factor which, for example, may be taken as 4.00 is set up on the keyboard in proper relation to the "cents" or right hand key row. The first factor bar 13 is then depressed which causes the operation of the main racks to register the multiplicand value and also causes the printing mechanism to print this factor. During the return stroke of the rack drive the main racks are coupled to the multiplicand racks 40 (Fig. 2) by the pinions 703 and consequently the rack 40 in the dollars order will be lowered to carry its associated contact element 654 (Figs. 2 and 63) into alignment with the #4 horizontal row of partial product circuit contacts 655U and 655T of the units and tens component partial product plate assemblies. The contact elements 654 of the remaining orders will remain in alignment with the upper #0 horizontal rows of their associated partial product circuit contacts.

The multiplier or second factor of 2.70 is then set up on the keyboard, also in proper relation to the cents row of keys, and the second factor bar 14 is depressed. As the main clutch operates through its first phase of 180 degrees, the cams 130 and 131 (Fig. 8) cause the rack drive means to advance the dimes and dollars main racks to their #7 and #2 positions, respectively. The main clutch will now be arrested in half cycle position with the racks locked in positions registering the multiplier factor.

During the above depression of the bar 14 the latch 765 (Fig. 34) will have released the arm 757 forming part of the control mechanism for the multiplier digit selection plate 754 (Fig. 58). Therefore, as the cams 130 and 131 (Fig. 8) rock the toggle device comprising cam follower 134 and yoked arm 763, during the first phase of the main clutch cycle, the latter will allow the selection plate 754 to be spring pressed downward and the denomination switch bar 843 (Fig. 59) will follow.

The lowermost order or "mills" rack 35 (see Fig. 23) has no multiplier selection control mechanism operatively associated therewith, nor is it associated with any multiplicand rack 43, any row of value keys, or accumulator other than the lowermost order of the partial products accumulator to which it is connected. Therefore, the next higher or "cents" order main rack 35 may be considered the lowermost order rack as far as entry of the multiplicand or multiplier factors is concerned.

Since, in the present example, the "cents" main rack is retained in zero position during the multiplication operation, its ear 791 (Fig. 2) will retain the associated multiplier selection control levers 779 and 789 out of blocking relation with the selection plate 754. Thus, the selection plate is allowed to move downward until blocked by the dimes order multiplier selection control levers.

This one step downward movement of plate 754 will allow the denomination switch bar 843 to follow, moving one step from its normal position shown in dotted lines in Fig. 63 to a position wherein its contacts are located on a line 1265. The black dots in the schematic showing of the diagonal bar assembly in Fig. 63 indicate the tabs 834 (Fig. 59) of the conductor bars 833 and thus it will be seen that the various contacts on the switch bar 843 will have moved downward to contact the next lower tabs located on the second lower conductor bars.

The above described movement of the multiplier digit selecting bar and the denomination switch bar takes place during the first phase of operation of the main clutch and during the ensuing multiplier clutch cycle the cam 818 (Fig. 8) will cause oscillation of the various operating levers 802. Since the selection control levers 779 and 789 of the dimes order are in control at this time they enable the associated link 795 to be drawn downwardly whereupon the pin 797 thereon will cam along the underlying inclined edge of the opening 803 in the associated rack to move the contact carriage comprising plates 744, etc. (Fig. 3) from any position in which it was originally located to a position wherein all of the contact elements 654 are located in alignment with the seventh vertical row of contacts 655U and 655T, counting from the rear. This condition is indicated in Fig. 63 wherein the contact element 654 in the dimes order will be located in contact with the partial product circuit terminal contacts indicated at 1267 and 1267a while the contact element in the dollars order will be located in contact with the terminal contacts indicated at 1268 and 1268a.

During such selecting and conditioning of the various partial product circuits, the partial product actuator control cams 868 (Fig. 68) will cause the drive carriage 859 to move to its rearmost position in which the contact rollers 662 and 663 (Fig. 2) contact the rearmost or "zero" terminals. At this time the cams 903 and 904 (Fig. 69) will condition the declutching arms 891 and 892 (Fig. 3) to operate and will cause the bar 886 to operatively connect the actuator racks 864 to the partial product accumulator. Also, the bar will cause the switch 1076 (Figs. 33 and 63) to close the circuit through the secondary winding of the transformer 858 and thereby cause a current to flow through a conductor 1268 which is electrically connected to the contact carriage and thereby to the different contact elements 654. The conductor 1268 is also connected to conductor 819 which is directly connected to the "nine" terminal strips associated with the units partial product circuit plate assemblies.

Referring to Fig. 64 it will be seen that the location of a contact element in the "four" multiplicand position and a "seven" multiplier position will condition a circuit through the "eight" units component terminal strip and the "two" tens component terminal strip. With the above in mind, it will be noted that in all partial product plate orders, except the "dollars" order, the contact elements 654 will remain in alignment with the upper row of terminal contacts whereby (as shown in connection with the "zero" units and tens component plates of Fig. 64), as the switch 1076 is closed, circuits will be completed through conductor 1268, contact elements 654, except that in the dollars order, the corresponding zero partial product plates and feeder strips 838 and 839, and their connected diagonal bars 833, through the denomination switch bar 843, to aligned contact strips 845 and through conductors 847 and 847a, through the electromagnets 862 to a common return conductor 2399 and thence to the opposite terminal of the transformer. Thus, the actuators 657 and 658 of the partial product accumulator orders associated with the above noted partial product plate orders will be released without driving the respective accumulator orders.

However, circuits will not at this time be completed through the units electromagnet 862 of the dimes order of the accumulator 6 or the tens electromagnet of the dollars order of the accumulator. Thus the units actuator 657 of the dimes order and the tens actuator 658 of the dollars order will drive their respective accumulator orders until the contact rollers 662 and 663 operatively associated therewith contact the terminal strips of the conditioned partial product circuits thereby energizing the electromagnets at which time the value 28.00 will be registered by the accumulator.

During the mid-portion of the above multiplier cycle, the cam 818 (Fig. 8) will have caused the selection control levers 779 and 789 (Fig. 2) of the dimes row to retract from blocking relation with the selection control plate 754 so that the latter will drop until blocked by the levers in the dollars row. The denomination switch bar 843 will continue to be held, however, by its cam 1063 (Fig. 62) until near the end of the current multiplier cycle at which time it will likewise drop one step which in effect connects the feeder strips 838 and 839 of the various partial product plate assemblies with the electromagnets 862 associated with the next higher orders of the accumulator 6.

It will be seen from the above described operation that the second partial product of 8 will be registered by the accumulator in the following relation to the previous product:

2800
80
—— leaving a sum of 10.600 registered on the accumulator it being understood that the various values are entered or figured about a fixed decimal point.

During the second multiplier cycle, the multiplier selection control levers 776 and 780 (Fig. 2) will be retracted from the plate 754 and, since the remaining higher order selection control levers are all blocked by their associated main racks which are standing at zero, the plate will move to the bottom of its travel, causing the parallel arms 758 (Fig. 8) to rock shaft 760. An arm 1080 (Fig. 30) on the shaft will, as the plate 754 reaches the lower limit of its travel, strike and rock the bellcrank 729 to cause link 728 to locate its pin 727 in position over the tail of bellcrank 735 so that the piece 733 on the shaft 10 rocks the lever 726, rocking lever 735 and consequently the main clutch control lever to reinitiate operation of the main clutch so that it will complete its second half cycle.

At the start of the operation of the second cycle of the main clutch and before the racks 35 are returned to their home positions the cam 319 (Fig. 21) will cause the printing mechanism to print the multiplier factor on the paper tape. Thereafter, the main clutch will return the operating units of the machine to normal.

30. *Partial product accumulator totaling controls*

At the conclusion of a multiplication operation, and assuming that the automatic product controls to be described later are not effective, the product of the multiplication will be registered on the various gears 944 (Figs. 3 and 70) meshing with the output gear assemblies of the partial product accumulator 6. In order to total out this accumulator and to print the product on the paper tape, the "product" bar 24 (Figs. 1, 39 and 40) is depressed.

The product bar is normally held in raised position by a spring 956 and when depressed rocks a bellcrank 957 pivoted at 958 to cause a pin 960 thereon to force the aforementioned clutch control bar 565 rearward and thereby engage the main clutch to cause operation of the machine as described hereinbefore. At the same time, the pin 961 forming the pivotal connection between the stem of the bar 24 and the bellcrank 957 rocks a second bellcrank 959 about its pivot 962 against the action of a spring 963. The bell crank 959 is connected by a link 964 to one leg of a bail 965 pivotally supported at 966. A pin 967 (Fig. 18) on the bail is fitted in an angular slot formed in a link 968 connected to a lever 970 pivotally supported at 971 and connected, in turn, by a link 972 to an arm 973, the latter being fixed to the aforementioned shaft 95 (see also Fig. 3) and urged in a clockwise direction by spring 974.

As the bail 965 is rocked clockwise upon depression of the product bar 24, the pin 967 will cam the link 968 downward to locate the vertical leg of an L shaped slot 975 over a pin 976 mounted on the upper leg of the aforementioned bellcrank 245 (Figs. 18 and 19). During operation of the machine under control of the product bar 24, the pin 596 is allowed to remain in its forward position illustrated in Fig. 18. Therefore, the bellcrank 245 will be controlled solely by the cam 251 and will be rocked clockwise thereby at the start of the main clutch cycle and returned at approximately mid-cycle. Through the entrained linkage described above, the bellcrank 245 will rock the shaft 95 (Figs. 3, 18 and 69) counter-clockwise. The latter shaft has flattened sections 976 thereon overlying the arms of the bellcranks 915 described hereinbefore so that upon rocking the shaft the latter will rock the bellcranks to retract the bail 911 from engagement with the various idlers 882 to permit rotation of the partial product accumulator during the totaling operation thereof.

The shaft 95 also has ordinally arranged flattened sections 977a (Figs. 3 and 71), each of which overlies the lower edge of a slot provided in a rack gear section 977 connected by pin and slot connections 978 and 979 to the associated rack 35. The latter gear section 977 is normally held in its illustrated elevated position by a spring 981 extending between a pin on the rack section and a pin 982 on the rack. However, as the shaft 95 is rocked counter-clockwise the flattened section 977a thereon will cam the rack section 977 downward to mesh the teeth thereof with the idler 944, thereby operatively connecting the rack 35 with the associated order of the partial product accumulator.

The flattened portions 977a of the shaft 95 are also aligned with zero stops 983 (Figs. 3 and 71), each pivoted on the rod 931 and urged counter-clockwise by a spring 984. Each zero stop has a shoulder 985 thereon adapted to be positioned in blocking relation with one of a pair of diametrically opposed pins 986 mounted on the associated idler 944. Thus, as the shaft 95 is rocked the flattened portions 977a move into alignment with the associated zero stops, enabling the latter to rock counter-clockwise under the action of their springs and thus position the shoulder 985 of each thereof in the path of one of the pins 986. Consequently, during the ensuing forward movement of the racks 35, during which time they return the accumulator elements to zero registration, the racks will move forward until arrested by virtue of the pins 986 being blocked in zero position by the zero stop levers 983.

It will be recalled that each of the gears 944 has twenty teeth thereon and is rotated one half revolution during entry of ten units of digitation therein. Therefore, the accumulator will be arrested in zero registering position, regardless of which of the two pins 986 on each idler 944 is blocked by the associated zero stop lever.

It will be noted that a product totaling operation involves a continuous and complete main clutch cycle. Therefore, while the racks 35 are held in advanced positions, registering the total cleared from the partial product accumulator, the printer mechanism will be operated to print this total on the paper tape.

31. *Automatic product controls*

As mentioned hereinbefore, the product registered on the partial product accumulator 6 (Fig. 2) may be automatically totaled out and printed at the end of a multiplication operation by pre-depressing the automatic product key 32 (Figs. 1, 35 and 40) which, when depressed is latched in depressed position until manually released at any desired time.

Referring to Fig. 40, a pin 987 on the stem of key 32 underlies one arm of a bellcrank 988 pivoted at 989 and connected by a link 991 to a second bellcrank 992 pivotally supported on the aforementioned rod 116. Normally, when the automatic product key is held in its illustrated raised position by its spring 32a (Fig. 35) the pin 987 will hold the bellcrank 988 in a position wherein a retaining shoulder 993 thereon will be out of the path of a pin 994 on the aforementioned bellcrank 995.

The bellcrank 988 is connected by a pin and slot connection 997 to a link 998, which, in turn, is connected to the outer arm of the aforementioned bail 740 (see also Fig. 30).

If it is desired to automatically total out the partial product accumulator after multiplication, the automatic product key 32 is depressed and latched down, whereupon the pin 987 on the key stem thereof recedes from the bellcrank 998. The link 998 and the bellcrank 988 will be now lowered until an ear 1000 on the link engages the upper end of bail 1001 pivoted on the parallel shaft 760 which, it will be recalled, is operatively connected to the multiplier digit selecting plate 754 (Fig. 58). The bail is urged clockwise by a spring 1003 to yieldably hold an arm 1004 thereof, against an arm 1005 fixed to the shaft 760.

As a multiplication operation ensues as a result of depressing the second factor bar 14 (Fig. 1) the multiplier selection plate 754 will, as before stated, move downward to sequentially select different racks 35 (Fig. 2) to control the multiplication. Consequently, the arm 1005 will rock clockwise, permitting the spring 1003 to carry the vertically extending arm of the bail 1001 rearward and out from under the ear 1000 until it strikes a frame stud 1006. The link 998 will now drop until the forwardly extending arm of the bellcrank 988 rests on the pin 994. Now, as the multiplier clutch cycles during the multiplying operation, the ear 734 (Fig. 30) on the piece 733 will engage and rock lever 1007 which, through link 1008 (Fig. 40), rocks bellcrank 995 until its pin 994 moves past the retaining shoulder 993 so as to allow the bellcrank 988 to latch the same in its clockwise rocked position. The bellcrank 995 will therefore, through its ear 996, hold the bail 119 elevated to retain the notch in the link 117 above the pin 120 so that thereafter the rack stop bars 100 (Fig. 2) will be allowed to remain in their lower illustrated positions wherein they will be ineffective to interfere with the setting up of a new factor in the keyboard while multiplication or totaling of the product is proceeding.

During the second phase of a main clutch cycle following completion of the cycling of the multiplier clutch in a multiplication operation, the mechanism illustrated in Fig. 8 will return the multiplier selection plate 754 to its upper home position, rocking the arm 1005 counter-clockwise. Toward the end of the cycle the arm will engage and rock bail 1001 in a like manner to force the link 998 forward. The latter will now be so located that its forward end lies directly behind a pin 1010 forming the pivot between the bellcrank 959 and the link 964. Consequently, leftward movement of the link 998 will likewise draw the link 964 leftward, rocking bail 965 (see also Fig. 18) to cause the pin 967 thereon to lower the link 968 so as to couple the link 968 to the bellcrank 245 whereby to enable the cam 231 to operatively connect the main racks with the partial product accumulator in the manner described in the preceding section and to position the zero stops 923 (Fig. 3) in zero blocking relation to the partial product accumulator as also described previously. Also, the leftward movement of the link 998 will rock the bail 748 (see also Fig. 30) causing the link 732 to reengage the lug 470 of the main clutch control lever 433 (see also Fig. 29) to cause reengagement of the main clutch and operation of the machine to cause the totaling operation.

At the start of the automatic totaling operation the ear 591 of the member 491 (Fig. 40) rocks the bellcrank 992 which through link 991 retracts the bellcrank 988 so as to release the bellcrank 995, permitting the parts to assume their normal positions.

32. *Automatic clearance of first factor*

The multiplicand racks 49 (Fig. 2) which are set to represent the multiplicand or first factor during entry of the multiplicand into the machine in response to the depression of the first factor bar 13 (Figs. 1 and 34) are normally automatically cleared or returned to their upper positions during the second phase of the main clutch operation in a multiplication operation.

Referring to Fig. 53, a lever 1012 is pivotally supported on the pivot stud 488 and is rocked by the aforementioned bellcrank 487 upon depression of the second factor bar 14. This lever is connected to one end of a link 1014 having a slot therein guided over a pin 1015 mounted on a lever 1016 which, for present purposes, may be considered as being fixed in the position illustrated in Fig. 53. In such position of the lever 1016, the right end of link 1014 lies in front of a pin 1017 mounted on a link 1018. The latter is guided at its forward end on a frame stud 1020 and at its rear end by a slot 1021 (Fig. 43) in a lever 1022, in which slot a stud 1023 on the link is mounted. The lever 1022 is pivoted on the frame stud 362 and is connected by pin and slot connection 1024 to a vertically movable rack gear 1025 (see also Fig. 46). The latter has a slot therein guided over frame studs 1026 and 1027 and has a gear rack section thereon in continual mesh with a gear 1028 (see also Fig. 46) fixed on the pinion support shaft 762.

Upon depression of the second factor bar 14, the link 1018 will, through the aforementioned link 1014 be moved rearward, positioning the pin 1023, which normally lies solely in the slot 1021, within a second shorter slot 1028 in a cam follower 1030. The latter is also pivoted on the frame stud 692 and is urged counter-clockwise by a spring 1029 to hold a roller 1031 thereon against the periphery of a cam 1032 keyed on the main shaft 8.

Also, during the rearward movement of link 1018, a pin 1033 thereon engages a shoulder 1034 on the link 713 (see also Fig. 50) to move the latter rearward so as to retract its cam lobe 712 from under the roller 710 (Fig. 43) of the lock bail 707, leaving the lobe 711 of the link 697 (Fig. 51) to hold the latter roller in raised position and bail 707 in detenting relation to the multiplicand racks 49.

Now, during the second phase of the main clutch cycle in a multiplication operation, the cams 695 and 696 (Fig. 44) will rock the cam follower 691 to retract the slide 687, permitting the spring 709 (Fig. 43) to retract the lock bail 707. Shortly thereafter, the cam 1032 will rock the cam follower 1030, and since the latter is coupled to the lever 1022 through pin 1023, the lever will raise the rack 1025 to rotate the gear 1028 (Fig. 46) and shaft 762 counter-clockwise, it being recalled that the shaft is now located in its upper position illustrated in Figs. 2 and 43, and is retained in that location except during entry of the multiplicand factor.

The shaft 762 is provided with a long key 1036 fitted in a longitudinally extending keyway therein. The key has ordinally arranged drive sections and intermediate sections, the outer surfaces of which lie coextensive with the periphery of the shaft. The various pinions 763 are guided between such drive sections and each thereof has a tooth 1037 on one side, which, when the associated rack 49 is in an upper home position, rests in contact with an adjacent drive portion of the key 1036.

During the entry of the first factor the pinions 703 will have been rotated by the main racks 35 relative to the shaft 702, causing the teeth 1037 to recede from the key 1036 so that during the major portion of the multiplication operation the teeth 1037 will be located at different angular positions clockwise of the key depending on the values of the different multiplicand digits.

Now, during the latter half of the second phase of the main clutch at the completion of a multiplication operation, the shaft 702 will be rotated counter-clockwise as viewed in Figs. 2 and 43 by the rack gear 1025 and the key 1036 will pick up the various pinions 703 by their teeth and return the latter and their respective racks 40 to home position.

Upon return of the cam follower 691 (Fig. 44) the latter will draw the link 687 (Figs. 43 and 51) rearward to cause the cam lobe 711 to relock bail 707 in its detenting position. Thereafter, the cam 1032 will permit the spring 1029 to lower the rack 1025 through the elements 1030 and 1022 whereupon the key 1036 will be rotated away from the teeth 1037.

33. *Constant first factor control means*

It is frequently desired to use the same multiplicand or first factor for a series of multiplication operations as for example in interest and tax computation or the like, and in order to obviate the necessity of having the operator set the constant multiplicand in the keyboard for each new multiplication, means are provided to render the automatic first factor clearing mechanism as described in the preceding section ineffective. This means is controlled by the "constant first factor" key 31 (Figs. 1, 34 and 53) which, it will be recalled may be depressed and held latched in depressed position until manually released at any desired time by depression of the "automatic product" key 32. Also, it will be recalled that depression of the constant first factor key 31 will release the automatic product key.

Referring in particular to Figs. 34, and 53, the key 31, is normally retained in its raised position by spring 1038. The stem of this key is connected to the aforementioned lever 1016, pivoted at 1040, and upon depression of the key the lever will locate the link 1014 in a position wherein it will be ineffective to force the link 1018 rearward upon depression of the second factor bar 14. Therefore, the multiplicand racks 40 will not be automatically returned to their home positions at the completion of a succeeding multiplication.

34. *Manually controlled clear first factor mechanism*

Means are provided to enable the operator to clear the multiplicand or first factor from the machine at any desired time in the event it has been retained as a constant or in the event of an erroneous entry of a multiplicand preparatory to a multiplication operation. For this purpose the "clear first factor" bar 30 (Figs. 1 and 53) is provided, which when depressed causes a main clutch operation to return the various first factor racks 40 (Fig. 2) to their upper home position.

Referring to Fig. 53, the bar 30 is normally held in a raised position by spring 1040a, and the stem thereof is connected by a bellcrank 1042, pivoted at 1040, to a link 1043. The forward end of the link is connected by a pin and slot connection 1044 to the clutch control lever 1012 so that upon depression of the bar 30, the lever 1012 will be rocked to actuate the clutch control bar 461 (see also Fig. 34) and thereby initiate a main clutch cycle. Also, providing the "constant first factor" bar 31 is in its raised position, the link 1014 will be operated by the lever 1012 to actuate the link 1018 and effect restoration of the first factor racks in the same manner as such restoration is effected by depression of the second factor bar 14.

Since the "clear first factor" bar 30 is ineffective to control entry of values into any of the accumulators, the main racks 35 (Fig. 2) will merely move idly through their strokes.

35. *Storage of first or second factors*

Means are provided for selectively and automatically storing either the first (multiplicand) or the second (multiplier) factor of a series of multiplications into the rearmost storage accumulator 38 (Fig. 2).

Figure 37:
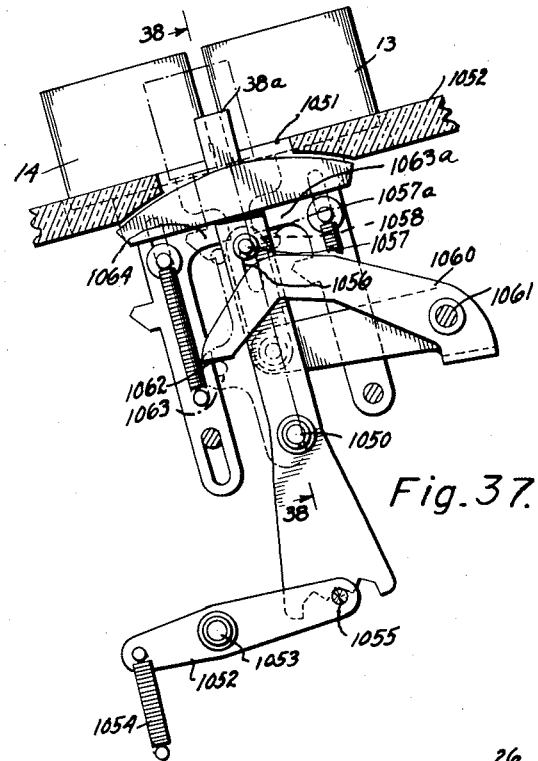
Fig. 37 is a detailed view illustrating the controls automatically storing either the first or the second factors of a series of multiplication.
Figure 38:
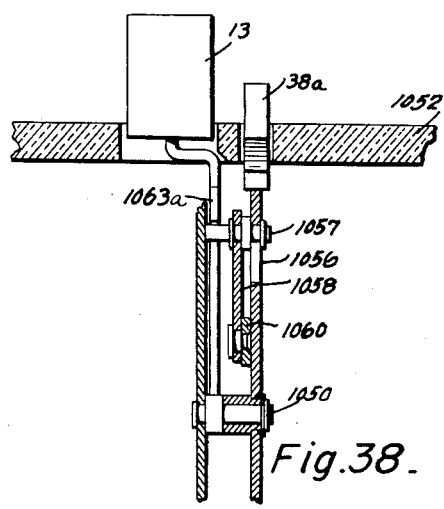
Fig. 38 is a transverse view taken along the line 38—38 of Fig. 37.

Referring to Figs. 37 and 38, the aforementioned selecting lever 38a is pivoted on a frame stud 1050 and extends through an opening 1051 in a keyboard top plate 1052 through which the various control keys and bars extend. The lever 38a is movable into either of three positions, i. e. forward, rearward or central positions and is yieldably detented in any of these positions by a centralizer 1052 pivoted at 1053 and yieldably urged counter-clockwise by a spring 1054 to force a pin 1055 into any of three detents formed on the lower end of the lever 38a. A slot 1056 on the lever 38a guides a pin 1057 mounted on the upper end of a link 1058, the lower end of which is connected to a bail 1060 pivoted on a frame stud 1061 and provided with a foot 1062 which overlies a pin 1063 (see also Fig. 35) mounted on the stem of the aforementioned "add to factor" key 20 which, it will be recalled, causes entry of values into the accumulator 38.

The stems of the first factor bar 13 and the second factor bar 14 have feet 1063a and 1064, respectively, extending therefrom either one of which is adapted to overlie the pin 1057 when the lever 38a is set into either of its two extreme positions. That is, when the lever is set in its illustrated neutral position, both feet 1063a and 1064 will be ineffective when their respective bars are depressed to strike the pin 1057. However, when the bar 38a is set in a rearward position along the side of the first factor bar 13, the pin 1057 will be positioned in its dot and dash lines position 1057a wherein it will underlie the foot 1063a of the first factor bar. Thus, during depression of the bar 13 to enter a first factor into the racks 40 (Fig. 2) the foot 1063a thereof will depress the pin 1057, rocking the bail 1060 so that the foot 1062 of the latter will, through the pin 1063, depress the "add to factor" key 20. Therefore, during the ensuing cycle the first factor will be entered into the storage accumulator 38.

On the other hand, when the lever 38a is set in its forward position in juxtaposition with the second factor bar 14, the pin 1057 will be positioned under the foot 1064. Upon depression of the second factor bar, the "add to factor" key 20 will likewise be depressed, so that during the forward stroke of the racks 35 to register the multiplier factor, the same will be entered into the storage accumulator 38.

36. *Reset first factor mechanism*

It is often desirable, as in performing chain multiplication and like computations, to use a product registered by the partial product accumulator 6 (Fig. 3) or a value registered in any of the other accumulators 36, 38, 3 and 4 (Fig. 2) as the multiplicand or first factor of a succeeding multiplication operation. In order to obviate the necessity of setting this factor in the keyboard and transferring the same to the multiplicand racks in the usual manner, the value may be directly transferred to these racks from the selected accumulator by first setting the "reset as factor" key 19 (Figs. 1, 35 and 52) and thereafter depressing the appropriate total bar. Also, the amount may be subtotalled out of any of the accumulators 3, 4, 36 and 38 (Fig. 2) during transfer of the amounts to the multiplicand racks by pre-setting the subtotal key 16 and the "reset as factor" key 19 and then depressing the appropriate total bar.

Referring to Fig. 52 the stem of key 19 is connected by a pin and slot connection 1045 to a bail 1046 pivoted at 1047 and urged clockwise by a spring 1048 to normally hold the bar in its illustrated elevated position. The latter is connected by a pin and slot connection 1050 to the aforementioned lever 674 which, upon depression of the key, will rock clockwise and through the pin 672 will carry with it the aforementioned link 673. The latter as it moves rearward, conditions the first factor mechanism to couple the first factor racks 40 to the main racks during the latter half of an ensuing main clutch operation as is described in a preceding section. Now, upon depression of any of the totaling bars 24 to 28, inclusive, the main racks 35 will move forward to total out the accumulator associated with the depressed total bar and during the return of the main racks, the racks 40, being coupled thereto, will be set to correspond to the numerical value which the selected accumulator registered before the totaling operation. Obviously, amounts automatically totaled out of the partial product accumulator under control of the automatic product totaling mechanism may also be reentered as a first factor by means of the above described mechanism.

Certain of the mechanisms disclosed but not claimed herein are claimed in the following co-pending applications: S. N. 79,954, filed March 7, 1949, by R. E. Boyden and E. P. Drake; S. N. 83,904, filed March 28, 1949, by R. E. Boyden and E. P. Drake; S. N. 108,843, filed August 5, 1949, by E. P. Drake; S. N. 116,253, filed September 17, 1949, by R. E. Boyden.

Although we have described our invention in detail in its preferred embodiment and therefore have utilized certain specific terms and language herein, it is to be understood that the present disclosure is illustrative, rather than restrictive, and that changes and modifications may be resorted to without departing from the spirit or the scope of the claims appended hereto.

Having thus described the invention, what we desire to secure by United States Letters Patent is:

1. In a calculating machine, the combination of a plurality of digit entering devices comprising a plurality of denominational racks arranged in side-by-side relation and movable endwise in parallel planes to different positions representing the values of different digits, respectively; each of said racks having a camming surface thereon, a digit receiving device movable along a path extending parallel to said planes to different positions representing the values of different digits, respectively; a plurality of cam followers operatively connected with said receiving device and selectively movable along the camming surfaces of respective ones of said racks for moving said receiving device from any of said positions thereof to a position corresponding to a position of a selected one of said racks.

2. In a calculating machine the combination of a multiplying unit, means for entering the first factor of a multiplication into said unit, means for entering the second factor of a multiplication into said unit comprising a second factor receiving device movable to different positions representing the values of different digits, respectively; a plurality of denominational digit entering devices movable to different positions representing the values of different digits, respectively; a plurality of camming mechanisms for operatively associating said factor receiving device with respective ones of said digit entering devices, each of said camming mechanisms being effective upon operation thereof to move said receiving device from any of said positions thereof to a position corresponding to the position of the respective one of said digit entering devices, operating means for selectively operating selected ones of said camming mechanisms, selecting means responsive to operation of said multiplying unit for causing said operating means to operate the said camming mechanism associated with the next higher denominational order digit entering device, and means responsive to any one of said digit entering devices when the latter is in a position representing a zero value for rendering said selecting means ineffective to cause said operating means to operate the said associated camming mechanism.

3. In a calculating machine, a multiplying unit, means for entering the first factor of a multiplication into said unit, means for entering the second factor of a multiplication into said unit comprising, a plurality of ordinally arranged second factor receiving devices movable to different positions representing the values of different digits, respectively; a plurality of ordinal digit entering devices movable to different positions representing the values of different digits, respectively, power devices operatively associated with respective ones of said digit entering devices and each operable to move all of said receiving devices to positions corresponding to the position of the associated one of said digit entering devices, a selecting device sequentially cooperable with successively higher denominational order ones of said power devices for sequentially rendering said power devices effective, and control devices actuated by respective ones of said power devices and each effective during operation of its respective power device for causing said selecting device to cooperate with a successively higher denominational one of said power devices.

4. In a calculating machine, a multiplying unit, means for entering the first factor of a multiplication into said unit, means for entering the second factor of a multiplication into said unit comprising, a plurality of ordinal second factor receiving devices movable to different positions representing the values of different digits, respectively, a plurality of ordinal digit entering devices movable to different positions representing the values of different digits, respectively; power devices operatively associated with respective ones of said digit entering devices and each operable to move all of said receiving devices to positions corresponding to the position of the associated one of said digit entering devices, means for causing said multiplying unit to multiply in accordance with the positioning of said receiving devices, a selecting device sequentially cooperable with successively higher denominational order ones of said power devices for sequentially rendering said power devices effective, and control devices actuated by respective ones of said power devices and each effective during operation of said multiplying unit for causing said selecting device to cooperate with a successively higher denominational order one of said power devices.

5. In a calculating machine, the combination of multi-order means for setting up a representation of the digits of the first factor of a multiplication, multi-order means for setting up a representation of the digits of the second factor of a multiplication, mechanism for successively multiplying all of the digits of the first factor by successive digits of the second factor including a device operable independently of said two multi-order means, said device having a definite excursion, means responsive to multiplication of the first factor by a digit of the second factor for causing said device to advance through an increment of said excursion to control multiplication by a successive digit of said second factor, an accumulator operatively associated with said multiplying mechanism for registering the products of said multiplication, a denomination control device movable through successive increments of movement for causing said multiplying mechanism to enter products into successively higher denominational orders of said accumulator, spring means for urging said denomination control device to advance through said increments of movement thereof concomitantly with said selection control device, a restraining device for said denomination control device, and means operable in time with said multiplying mechanism for causing said restraining device to release said denomination control device upon completion of a multiplication operation.

6. In a calculating machine, the combination of a plurality of multiplying circuits having stationary contacts positioned to represent partial products and other stationary contacts positioned to coordinately represent first and second factors of a multiplication, a contact element movable along said other contacts whereby the condition selected ones of said circuits, a device for positioning said contact element in accordance with a digit of the first factor of a multiplication, a device for positioning said contact element in accordance with a digit of the second factor of a multiplication, an accumulator, actuating mechanism for said accumulator, contact means movable along said product representing contacts in timed relation to said actuating mechanism, and electromagnetic means responsive to closing of a conditioned one of said circuits by said contact means and the product representing contact of said conditioned circuit for arresting actuation of said accumulator by said actuating mechanism.

7. In a calculating machine, the combination of a plurality of multiplying circuits having stationary contacts positioned to represent products and other stationary contacts positioned to coordinately represent first and second factors of a multiplication, a contact element movable along said other contacts whereby to condition selected ones of said circuits, a device for positioning said contact element in accordance with a digit of the first factor of a multiplication, a device for positioning said contact element in accordance with a digit of the second factor of a multiplication, an accumulator, actuating mechanism therefor, drive mechanism, coupling devices for operatively connecting said drive mechanism to said actuating mechanism, contact means movable along said product representing contacts in timed relation to said actuating mechanism, and electromagnetic means responsive to closing of a conditioned one of said circuits by said contact means and the product representing contacts of said conditioned circuit for disconnecting said one of said coupling devices.

8. In a calculating machine, multiplication mechanism comprising the combination of first factor entering means including ordinally arranged plates, each of said plates having a slot extending in one direction, second factor entering means including ordinally arranged plates, each of said last mentioned plates having a slot extending in another direction, said last mentioned plates being arranged in side-by-side relation to said first mentioned plates means for moving said plates endwise in directions at right angles to the lengths of their respective slots in accordance with the values of said factors, ordinally arranged plates forming slots extending in both of the slots in said two plates in each order and adjustable coordinately by said two plates, and multiplier circuits selectively conditioned by said control elements in accordance with the positioning thereof for determining the product of a multiplication.

9. In an electric calculating machine, a multiplication mechanism comprising the combination of first factor entering means including ordinally arranged plates, each of said last mentioned plates forming a slot extending in one direction, second factor entering means including ordinally arranged plates forming slots extending to another direction, said last mentioned plates being arranged in side-by-side relation to said first mentioned plates, means for moving said plates endwise in directions at right angles to the lengths of their respective slots in accordance with the values of said factors, means comprising a series of multiplying circuits in each order including contacts coordinately arranged in accordance with the values of the digits of the factors of a multiplication, ordinally arranged control elements slidable within both of the slots in said two plates in each order and adjustable coordinately thereby to contact associated ones of said contacts, and means for transmitting electrical power to said elements.

10. In an electric calculating machine, a multiplication mechanism comprising the combination of first factor entering means including ordinally arranged devices forming slots extending in one direction, second factor entering means including ordinally arranged devices forming slots extending in another direction, means for moving said devices in accordance with the values of said factors, means comprising a series of multiplying circuits in each order including contacts coordinately arranged in accordance with the values of the digits of a multiplication, ordinally arranged control elements slidable within the slots in said two devices in each order and adjustable coordinately by said two devices to contact an associated one of said contacts, and means comprising the slidable connection between each of said control elements and one of said devices in each order for transmitting electrical power to said control elements.

11. In an electric multiplying machine the combination with a plurality of spaced elements, means comprising multiplying circuits supported thereby including contacts positioned to represent factors of a multiplication and other contacts positioned to represent products; brush elements movable relative to said factor contacts in accordance with the factors of a multiplication, a multi-order accumulator, and actuating mechanism for said accumulator comprising an electromagnetic device for each order of said accumulator; of a plurality of electrical conducting members arranged in a diagonal pattern and supported integrally with said spaced elements, contact elements in circuit with respective ones of said conducting members and movable along said product contacts in timed relation to said actuating mechanism, denominationally arranged brush elements in circuit with said electromagnetic devices, and means for shifting said last mentioned brush elements relative to said conductor members to vary the decimal relation between said accumulator and said circuits.

12. In an electric multiplying machine, the combination with a plurality of spaced elements, means comprising multiplying circuits supported thereby including contacts positioned to represent products; means for conditioning certain of said circuits in accordance with the factors of a multiplication, a multi-order accumulator, and actuating mechanism for said accumulator comprising an electromagnetic device for each order of said accumulator; of a plurality of electrical conducting members arranged in a diagonal pattern and supported integrally with said spaced elements, contact elements in circuit with respective ones of said conducting members and movable along said product contacts in timed relation to said actuating mechanism, denominationally arranged brush elements in circuit with said electromagnetic devices, and a device supporting said brush elements for concomitant movement relative to said conductor members whereby to vary the decimal relation between said accumulator and said circuits.

13. In an electric calculating machine, multiplying mechanism including multiplicand and multiplier factor entering means, units and tens component multiplying circuits adapted to be conditioned thereby, said multiplying circuits including contacts positioned to represent respective units or tens partial products components, a multi-order accumulator, multi-order actuating mechanism therefor, each order of said actuating mechanism including a units actuator and a tens actuator, said actuators being adapted to jointly and additively actuate their respective orders of said accumulators, drive means for said actuators, means comprising electro-magnetic devices individual to respective ones of said actuators for arresting the drive thereof by said drive means, contact elements in circuit with respective ones of said electro-magnetic devices and movable along said contacts in timed relation to said actuating mechanism, and means for shifting the denominational relationship between said circuits and said electro-magnetic devices.

14. In a calculating machine, the combination of a multiplying unit, means for entering the first factor of a multiplication into said unit, means for entering the second factor of a multiplication into said unit comprising a plurality of ordinally arranged second factor receiving devices movable to different positions representing the values of different digits, respectively; a plurality of ordinal digit entering devices movable to different positions representing the values of different digits, respectively; means selectively cooperable with any of said digit entering devices for moving all of said receiving devices to positions corresponding to the position of a selected one of said digit entering devices, a multi-order accumulator, reciprocating drive elements for actuating said accumulator, drive means for advancing said drive elements, means under control of said multiplying unit for differentially controlling said drive elements during advancement thereof, means for retracting said drive elements, and means operable by said drive means during retraction of said drive elements for causing said selectively cooperable means to cooperate with a higher denominational order digit entering device.

15. In a calculating machine, a multiplication mechanism comprising the combination of first factor entering means including ordinally arranged plates, each of said plates forming a slot extending in one direction, second factor entering means including ordinally arranged plates extending in parallel relation to said first mentioned plates, each of said second mentioned plates forming a slot extending in another direction, said last mentioned plates being arranged in side-by-side relation to said first mentioned plates, means for moving said plates endwise in directions at right angles to the lengths of their respective slots in accordance with the values of said factors, means comprising a series of multiplying circuits in each order including contacts coordinately arranged in accordance with the values of the digits of the factors of a multiplication, said contacts being arranged in two groups in each order on opposite sides of the plates in said order, and elements slidable within both of the slots in the two plates in each order and adjustable coordinately thereby, brush elements carried by said slidable elements on opposite sides thereof, each of said brush elements being aligned with one of said contacts opposite the intersection of the slots in the respective ones of said plates, and spring means for maintaining said brush elements in contact with said contacts.

16. In a calculating machine, a multiplication mechanism comprising the combination of first factor entering means including ordinally arranged plates, each of said plates forming a slot extending in one direction, second factor entering means including ordinally arranged plates extending in parallel relation to said first mentioned plates, each of said second mentioned plates forming a slot extending in another direction, said last mentioned plates being arranged in side-by-side relation to said first mentioned plates, means for moving said plates endwise in directions opposite to the lengths of their respective slots in accordance with the values of said factors, means comprising a series of multiplying circuits in each order including contacts coordinately arranged in accordance with the values of the digits of the factors of a multiplication, said contacts being arranged in two groups in each order on opposite sides of the plates in said order, and elements slidable within both of the slots in the two plates in each order and adjustable coordinately thereby, means electrically insulating each of said slidable elements from one of said plates in the respective order, brush elements carried by said slidable elements on opposite sides thereof, each of said brush elements being aligned with one of said contacts opposite the intersection of the slots in the respective ones of said plates, spring means carried by said slidable elements for pressing the associated ones of said brush elements against aligned ones of said contacts, and spring contact means carried by said slidable element and engaging the other of said plates in the respective order for electrically connecting said associated brush elements to said last mentioned plate.

17. In a calculating machine, the combination of multi-order means for setting up a representation of the digits of the first factor of a multiplication, multi-order means for setting up a representation of the digits of the second factor of a multiplication, mechanism for successively multiplying all digits of the first factor by successive digits of the second factor including means for selecting successive digits of said second factor, said selecting means including a selection control device, means responsive to selection of a digit by said selecting means for causing said selection control device to advance through an increment of movement to select the next successive digit, a multi-order accumulator, a denomination control device movable through successive increments of movement for causing said multiplication mechanism to enter products into successively higher denominational orders of said accumulator, means for normally causing said denomination control device to move in timed relation to said selection control device, and means operable in time with said multiplication mechanism for retarding movement of said denomination control device until completion of a multiplication operation.

18. In a calculating machine, the combination of a register, differentially operable actuating mechanism therefor, a calculating unit, means operable by said actuating mechanism for entering a first factor of a calculation into said unit, means operable by said actuating mechanism for entering the second factor of a calculation into said unit, control means including a depressible key for causing said actuating mechanism to operate said first factor entering means, control means including a second depressible key for causing said actuating mechanism to operate said second factor entering means, a control mechanism operable to cause said actuating mechanism to enter an amount into said register, and a device selectively settable into either of two positions and effective to cause either of said keys, respectively, to actuate said control mechanism, said device being also selectively settable into a third position to render both of said keys ineffective to actuate said control mechanism.

19. In a calculating machine, the combination of a plurality of multiplying circuits having stationary contacts positioned to represent partial products and other stationary contacts positioned to coordinately represent first and second factors of a multiplication, a contact element movable along said other contacts whereby to condition selected ones of said circuits, a device for positioning said contact element in accordance with a digit of the first factor of a multiplication, a device for positioning said contact element in accordance with a digit of the second factor of a multiplication, an accumulator, actuating mechanism for said accumulator, drive means for said actuating mechanism movable through a constant excursion, contact means operatively connected to said drive means and movable thereby through a constant excursion and along said product representing contacts in timed relation to said actuating mechanism, and electro-magnetic means in circuit with said contact means and responsive to closing of a conditioned one of said circuits by said contact means and the product representing contact of said conditioned circuit for rendering said drive means ineffective to drive said actuating mechanism.

20. In a calculating machine, the combination of a plurality of multiplying circuits having stationary contacts positioned to represent products and other stationary contacts positioned to coordinately represent first and second factors of a multiplication, a contact element movable along said other contacts whereby to condition selected ones of said circuits, a device for positioning said contact element in accordance with a digit of the first factor of a multiplication, a device for positioning said contact element in accordance with a digit of the second factor of a multiplication, an accumulator, actuating mechanism for said accumulator, drive mechanism movable through a constant excursion, coupling devices for operatively connecting said drive mechanism to said actuating mechanism, contact means operatively connected to said drive means and movable thereby through a constant excursion and along said product representing contacts in timed relation to said actuating mechanism, and electro-magnetic means in circuit with said contact means, said electro-magnetic means being responsive to closing of a conditioned one of said circuits by said contact means and the product representing contact of said conditioned circuit for disconnecting the respective one of said coupling devices.

21. In a calculating machine, the combination of a plurality of multiplying circuits having stationary contacts positioned to represent products and other stationary contacts positioned to coordinately represent first and second factors of a multiplication, a contact element movable along said other contacts whereby to condition selected ones of said circuits, a device for positioning said contact element in accordance with a digit of the first factor of a multiplication, a device for positioning said contact element in accordance with a digit of the second factor of a multiplication, an accumulator, actuating mechanism therefor, drive mechanism, coupling devices for operatively connecting said drive mechanism to said actuating mechanism, contact means operatively connected to said drive means and movable thereby along said product representing contacts in timed relation to said actuating mechanism, electro-magnetic devices in circuit with said contact means, said electro-magnetic devices being responsive to closing of a conditioned one of said circuits by said contact means and the product representing contact of said conditioned circuit for disconnecting the respective ones of said coupling devices, and means for connecting said electro-magnetic devices in circuit with successively higher orders of said contact means whereby to vary the denominational relation between said accumulator and said circuits.

22. In a calculating machine, the combination of a set of multiplying circuits including a set of stationary contacts positioned to coordinately represent first and second factors of a multiplication and a set of contacts positioned to represent the units components of partial products of said multiplication; a second set of multiplying circuits including a set of stationary contacts positioned to coordinately represent first and second factors of a multiplication and a set of contacts positioned to represent the tens components of partial products of said multiplication; a contact element movable along said two sets of factor representing contacts whereby to concomitantly condition selected ones of said two sets of circuits, a device for positioning said contact element in accordance with a digit of the first factor of said multiplication, a device for positioning said contact element in accordance with a digit of the second factor of said multiplication, an accumulator, actuating mechanism for said accumulator comprising a units component actuator and a tens component actuator; contact means movable along said units component product representing contacts and thereby effective to close a conditioned one of said first mentioned set of circuits, contact means movable along said tens component product representing contacts and thereby effective to close a conditioned one of said second mentioned set of circuits, drive means for concomitantly moving said two contact means in timed relation to said actuators, an electromagnetic device in circuit with said first mentioned contact means and responsive to closing of a conditioned circuit thereby for arresting actuation of said accumulator by said units component actuator, and an electro-magnetic device in circuit with said second mentioned contact means and responsive to closing of a conditioned circuit thereby for arresting actuation of said accumulator by said tens component actuator.

23. In a calculating machine, a multiplication mechanism comprising the combination of first factor entering means including ordinally arranged devices forming slots extending in one direction, second factor entering means including ordinally arranged devices forming slots extending in another direction, means for moving said devices in directions perpendicular to the lengths of their respective slots in accordance with the values of said factors, means comprising a series of multiplying circuits in each order, said circuits comprising two sets of contacts coordinately arranged on opposite sides of said two devices in each order in accordance with the values of the digits of the factors of a multiplication, ordinally arranged brush elements slidable within the slots of said two devices in each order and located intermediate said sets of contacts whereby to contact aligned ones of said contacts, and means comprising the slidable connections between each of said brush elements and one of said devices in each order for transmitting electrical power to said brush elements.

24. In a calculating machine, the combination of a plurality of digit entering devices comprising a plurality of denominational racks arranged in side by side relation and movable endwise in parallel planes to different positions representing the values of different digits, respectively; each of said racks having a pair of converging camming surfaces thereon, a digit receiving device movable along a path extending parallel to said planes to different positions representing the values of different digits, respectively; said receiving device having a plurality of guide slots therein, cam follower devices movable along respective ones of said guide slots, said cam follower devices being selectively movable along the respective ones of said pairs of converging camming surfaces for moving said digit receiving device from any of said positions thereof to a position corresponding to the position of a selected one of said racks.

25. In a calculating machine, the combination of a multiplying unit, means for entering the first factor of a multiplication into said unit, means for entering the second factor of a multiplication into said unit comprising a second factor receiving device movable into different positions representing the values of different digits, respectively; a plurality of denominational digit entering devices movable to different positions representing the values of different digits, respectively; a plurality of camming mechanisms operatively associating said second factor receiving device with respective ones of said digit entering devices, each of said camming mechanisms being effective upon operation thereof to move said digit receiving device from any of said positions thereof to a position corresponding to the position of the respective one of said digit entering devices, and operating means for operating any selected one of said camming mechanisms.

26. In a calculating machine, the combination of a multiplying unit, means for entering the first factor of a multiplication into said unit, means for entering the second factor of a multiplication into said unit comprising a second factor receiving device movable to different positions representing the values of different digits, respectively; a plurality of denominational digit entering devices movable to different positions representing the values of different digits, respectively; a plurality of camming mechanisms operatively associating said second factor receiving device with respective ones of said digit entering devices, each of said camming mechanisms being effective upon operation thereof to move said digit receiving device from any of said positions thereof to a position corresponding to the position of the respective one of said digit entering devices, operating means for operating any selected one of said camming mechanisms, and selecting means responsive to operation of said multiplying unit for causing said operating means to operate another of said camming mechanisms.

ROBERT E. BOYDEN.
EDWARD P. DRAKE.

REFERENCES CITED

The following references are of record in the file of this patent:

UNITED STATES PATENTS

| Number | Name | Date |
|---|---|---|
| 1,332,543 | Cluley | Mar. 2, 1920 |
| 2,088,634 | Breitling et al. | Aug. 3, 1937 |
| 2,141,269 | Ewald et al. | Dec. 27, 1938 |
| 2,225,410 | Engst | Dec. 17, 1940 |
| 2,226,919 | Gubelman | Dec. 31, 1940 |
| 2,303,692 | Hellgren | Dec. 1, 1942 |
| 2,333,234 | Boyden | Nov. 2, 1943 |
| 2,339,154 | Crosman | Jan. 11, 1944 |
| 2,342,529 | Chase | Feb. 22, 1944 |
| 2,377,065 | Avery | May 29, 1945 |
| 2,403,480 | Clary et al. | July 9, 1946 |

Certificate of Correction

Patent No. 2,515,692                                   July 18, 1950

ROBERT E. BOYDEN ET AL.

It is hereby certified that error appears in the printed specification of the above numbered patent requiring correction as follows:

Column 15, line 62, for "tooth 197" read *tooth 1971*; line 67, for "197'" read *1971*; column 18, line 11, after the word "box" insert *cams*; column 19, line 7, for "counter-lockwise" read *counter-clockwise*; column 24, lines 64 and 65, strike out "the clutch dog 429 out of engagement with"; column 27, line 11, for "poistion" read *position*; column 39, line 47, for the numeral "35" read *53*; column 41, line 57, after "guide" insert *the*; column 48, line 3, for "diffeernt" read *different*; column 52, line 48, for "associaed" read *associated*; line 63, for "electromagent" read *electromagnet*; column 53, line 22, for "pin 910" read *pin 1910*; column 56, line 30, for "willy" read *will*; column 57, line 73, for "864" read *1864*; column 68, line 26, for "plates forming slots extending in" read *control elements slideable within*; line 39, for "extending to" read *extending in*; line 75, after "machine" insert a comma;

and that the said Letters Patent should be read as corrected above, so that the same may conform to the record of the case in the Patent Office.

Signed and sealed this 19th day of December, A. D. 1950.

[SEAL]

THOMAS F. MURPHY,
*Assistant Commissioner of Patents.*